(12) United States Patent
Miura et al.

(10) Patent No.: US 7,126,704 B2
(45) Date of Patent: Oct. 24, 2006

(54) NETWORK PRINT SYSTEM FOR MERGING DATA WITH TEMPLATE DATA FOR PRINTING OR DISPLAY, SUBJECT TO APPLICABLE RESTRICTIONS

(75) Inventors: Kiyotaka Miura, Kanagawa-ken (JP); Tsunehiro Tsukada, Kanagawa-ken (JP); Yasuyuki Tsukui, Kanagawa-ken (JP); Akira Ueda, Kanagawa-ken (JP); Takashi Matsushita, Kanagawa-ken (JP); Masaki Tamura, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 10/923,678

(22) Filed: Aug. 24, 2004

(65) Prior Publication Data

US 2005/0018249 A1    Jan. 27, 2005

Related U.S. Application Data

(62) Division of application No. 09/493,122, filed on Jan. 28, 2000, now Pat. No. 6,862,103.

(30) Foreign Application Priority Data

| Jan. 29, 1999 | (JP) | ................................. 11-022942 |
| Jan. 29, 1999 | (JP) | ................................. 11-022943 |
| Jan. 20, 2000 | (JP) | ............................. 2000-012126 |

(51) Int. Cl.
*G06K 15/00* (2006.01)
*G06F 3/12* (2006.01)

(52) U.S. Cl. ..................................... 358/1.14; 358/1.15
(58) Field of Classification Search ............... 358/1.15, 358/1.14, 1.13, 1.16, 1.17, 1.18, 1.1, 1.2, 358/1.6, 1.9, 1.11; 399/366; 705/57, 62
See application file for complete search history.

(56) References Cited

U.S. PATENT DOCUMENTS

| 5,287,497 | A |   | 2/1994  | Behera ..................... 707/104.1 |
| 5,371,873 | A | * | 12/1994 | Niwa .......................... 710/20 |
| 5,720,012 | A | * | 2/1998  | McVeigh et al. ........... 358/1.14 |
| 5,890,173 | A |   | 3/1999  | Yoda ........................ 725/501.1 |
| 5,963,968 | A | * | 10/1999 | Warmus et al. ............. 715/517 |
| 6,003,069 | A | * | 12/1999 | Cavill ........................ 709/205 |
| 6,144,990 | A |   | 11/2000 | Brandt et al. ............... 709/203 |
| 6,874,131 | B1|   | 3/2005  | Blumberg ................... 715/513 |

* cited by examiner

*Primary Examiner*—Dov Popovici
(74) *Attorney, Agent, or Firm*—Fitzpatrick, Cella, Harper & Scinto

(57) ABSTRACT

A network print system which aims at printing high-quality image data of a form is generated using a Web browser. In response to a request from a client to print or to display a document, a server merges an appropriate template with the variable data to produce print data or display data, as the case may be; however, based on whether certain authorization or restriction conditions are applicable to the request being processed, the server in an appropriate case inhibits generation of print data or display data, so that the print request or display request is not fulfilled.

5 Claims, 55 Drawing Sheets

FIG. 3

MONTHLY REPORT OF OVERTIME WORK — 301

YEAR n1 / MONTH n2
NAME s1

| | 1 | 2 | 3 | 4 | 5 | 6 | 7 | 8 | 9 | 10 |
|---|---|---|---|---|---|---|---|---|---|---|
| ORDINARY | n3 | n4 | n5 | n6 | n7 | n8 | n9 | n10 | n11 | n12 |
| LATE-NIGHT | | | | | | | | | | |
| | 11 | 12 | 13 | 14 | 15 | 16 | 17 | 18 | 19 | 20 |
| ORDINARY | | | | | | | | | | |
| LATE-NIGHT | | | | | | | | | | |
| ORDINARY | 21 | 22 | 23 | 24 | 25 | 26 | 27 | 28 | 29 | 30 |
| | | | | | | | | | | |
| LATE-NIGHT | | | | | | | | | | |

TOTAL OVERTIME WORK HOURS n50
TOTAL LATE-NIGHT WORK HOURS n51

| SIGN | EMPLOYEE | | MANAGER | |
|---|---|---|---|---|

| FORMAT IDENTIFIER | INDEX | SIZE | VALUE |
|---|---|---|---|
| xxxxxx | S1 | 20 | xxxxxx |
|  | n1 | 12 | 1998 |
|  | n2 | 12 | 10 |
|  | n3 | 10 | 0 |
|  | ⋮ | | |
|  | n49 | 10 | 1.5 |
|  | n50 | 12 | 30 |
|  | n51 | 12 | 7.5 |

FIG. 11

| INDEX | IDENTIFICATION ADDRESS |
|---|---|
| 1 | 111.222.33.4 |
| 2 | 111.222.33.5 |
| 3 | 111.222.33.6 |
| 4 | 111.222.33.7 |
| 99 | 2 |

FIG. 13

| INDEX | IDENTIFICATION ADDRESS | LOAD COEFFICIENT |
|---|---|---|
| 1 | 111.222.33.4 | 2 |
| 2 | 111.222.33.5 | 2 |
| 3 | 111.222.33.6 | 1 |
| 4 | 111.222.33.7 | 0 |

FIG. 17

| INDEX (4001) | IDENTIFICATION ADDRESS (4002) | STATUS (4003) | |
|---|---|---|---|
| 1 | 111.222.33.4 | OK | ~4004 |
| 2 | 111.222.33.5 | OK | ~4005 |
| 3 | 111.222.33.6 | OK | ~4006 |
| 4 | 111.222.33.7 | NG | ~4007 |

| HEADER | HEADER INFORMATION<br>   CONTENT TYPE = HTML DOCUMENT<br>      ⋮ |
|---|---|
| CONTENT | HTML DOCUMENT CONTENT<br>      ⋮<br>ACCESS PATH OF CONTENT OF GENERATED IMAGE FILE :<br>/ InetPub / wwwroot / img-dir / temp03. pdf<br>      ⋮ |

7220 — HEADER
7230 — CONTENT

FIG. 40

| | KEY | VALUE | |
|---|---|---|---|
| SESSION ID | 1121 | 18737216 | DECRYPTION KEY |
| | 4827 | 98673628 | |
| | | | |
| | | | |
| | | | |

| USER ID | PRINT AUTHORITY |
|---------|-----------------|
| ID 1    | OK              |
| ID 2    | OK              |
| ID 3    | NO              |
| ID 4    | NO              |
| ⋮       | ⋮               |

FIG. 43

| INDEX | NAME | AUTHORITY LEVEL 1 | AUTHORITY LEVEL 2 | OTHER |
|---|---|---|---|---|
| N1 | DEPARTMENT NAME | OK | OK | |
| N2 | MEMBER NO. | OK | | |
| N3 | NAME | OK | | |
| N4 | GENDER | OK | OK | OK |
| ⋮ | | | | |
| N29 | SUBTOTAL | OK | OK | |
| N30 | TOTAL | OK | OK | OK |

3801　3802　3803　3804　3805

NETWORK PRINT SYSTEM FOR MERGING DATA WITH TEMPLATE DATA FOR PRINTING OR DISPLAY, SUBJECT TO APPLICABLE RESTRICTIONS

CROSS REFERENCE TO RELATED APPLICATION

This application is a division of application Ser. No. 09/493,122, filed Jan. 28, 2000, now U.S. Pat. No. 6,862,103, issued on Mar. 1, 2005, the entire content of which is hereby incorporated herein by reference.

BACKGROUND OF THE INVENTION

The present invention relates to a network print system which allows a network system including a client and server connected via a network such as a telephone network or the like to print a certain form (preformatted print form) or the like on the basis of a request from the client, and an information processing apparatus and its control method.

With rapid spread of the Internet and increasing population of Web servers, Web conversion of task processes is promoted. The Web server is a computer or the like which supports HTTP (Hyper Text Transfer Protocol), FTP (File Transfer Protocol), and the like, and is connected to the network, and can send a document data file or the like, which is designated by a URL (Uniform Resource Locator) and is described in HTML, to a client on the network in accordance with a request.

On the other hand, a client computer such as a personal computer displays an HTML document received from the Web server using an application program called a Web browser (to be also simply referred to as a browser) having a function of displaying data (HTML document) described in HTML. The browser not only displays an HTML document but also has a function of making the user input data on the screen and sending back that data to the Web server. Note that Web conversion is to allow data exchange with a server by designating a URL from a client.

In the Web-converted task system, a client computer is installed with a browser that can display and input information, and the operator executes task processes such as display, input, and the like using the browser as a user interface. In this case, a task is executed as follows. That is, a Web server receives information input from the browser on the client, processes the received information, and sends it back to the browser. Then, the browser executes necessary operations such as display, and the like to obtain a result.

In this manner, when the server passes data such as documents, images, and the like onto the Web browser, such data files are placed on a specific directory (indicating a document route in HTTP terminology; to be referred to as a directory hereinafter) that the client can access in a file system of the Web server. When the client requests that file, the server passes the URL of that file onto the client. The client designates the URL, and the server sends the required file to the client using, e.g., FTP.

A print process indispensable for ordinary task processes bottlenecks task processes via the browser. First, it is hard to obtain a high-quality print of, e.g., a form according to a given format using the browser. The normal browser has a print function, which merely prints a hard copy of an image displayed on the screen via a printer controlled by the browser. This print scheme also suffers problems in terms of print of an image larger than a paper size, page end positions upon printing a plurality of pages, and the like, and cannot obtain a high-quality print. When displayed data includes dot image data, it is impossible to print that data with high quality.

Second, clients are distributed on the network, and when many clients issue process requests to a single server, the load on the server becomes heavier, and each client must wait for a longer period of time. In the worst case, the server may go down.

Especially, in such network system, reply data from the server in response to a client request is sent back to the client along the same route as the network route of the request data, and reply data as print data normally has a size greatly larger than the request data. For this reason, when many client requests are processed at the same time, the traffic of reply data from the server occupies the network, and client requests can hardly reach the server although the server has processing capacity margin.

Third, when the server suffers a trouble, all services stop, and such situation may result in a serious problem, i.e., suspension of task processes.

Fourth, when a printer under the control of the client prints data received from the server, if a plurality of printers are connected to the client, data to be printed cannot always be normally printed by a default printer.

Fifth, in a conventional print scheme, when data includes an image exceeding a paper size, or when a plurality of pages of data are to be printed, one image may be divided into a plurality of pages depending on the page end position. Also, since the divided position is set irrespective of the print contents, upper and lower portions of numerals may be printed on different paper sheets. As a result, a high-quality output result cannot be obtained by simple operation.

Furthermore, in this scheme, a file placed in the directory of the Web server can be accessed by every clients which can access that server, thus posing a security problem of information. Especially, when the Web server and clients are connected via a WAN (wide-area network), information to be exchanged must be secure. Especially, in case of a print process of data which is important in terms of task processes, a function of prohibiting a third party other than the user who requested the process from printing is required. On the other hand, since some data require higher processing speed rather than security, data must undergo selective security measures.

Conventionally, to warrant the security of information to be exchanged, a protocol which is not vulnerable to unauthorized access or monitoring is used. However, such protocol cannot be used unless the entire system is compatible to that protocol.

For example, when a network printer is used in such network print system, the protocol cannot be used unless that network printer itself is compatible to an encryption/decryption protocol.

In addition, when the format of a form to be printed is to be invalidated or changed after a given date, a function of restricting the use of an old format and prompting the user not to print in the old format is demanded.

Some Web browsers have a cache function based on the file names and URLs on the Web server according to their operation setups. In such case, when the user submits a data request to the server using such Web browser, if the server has updated the contents of that data without changing its file name, the Web browser may open the cached file and fail to get the latest file.

Furthermore, when print data sent from the server to a client is printed on the client side, if a printer which is to be used to print that data is busy due to a print request from another application or the like, the next print request must be enqueued until that print process ends. When the user wants to obtain a print result as quickly as possible, a distributed print process on the client side, i.e., transfer of the process to another nearby printer, is required. Also, a function of automatically selecting a printer in an optimal condition from a plurality of printers in accordance with the type of form that the user wants to print is required.

SUMMARY OF THE INVENTION

The present invention has been made in consideration of the aforementioned problems, and has as its object to provide a network print system, and an information processing apparatus and its control method, which can output a high-quality image using a Web browser.

It is another object of the present invention to provide a network print system, and an information processing apparatus and its control method, which do not force clients to wait by reducing the load on the server, and can reduce the possibility of system down.

It is still another object of the present invention to provide a network print system, and a network server and its control method, which can prevent all processes from being suspended even when some functions of the server are suspended.

It is still another object of the present invention to provide a network print system, and an information processing apparatus and its control method, which can print from a printer suitable for data received from the server.

It is still another object of the present invention to provide a network print system, and an information processing apparatus and its control method, which save a file in a location ordinary clients cannot access, and send the file to a specific client which instructed to generate that file every time the file is generated, thereby inhibiting unspecified clients from accessing data, and passing the latest file onto the specific client only.

It is still another object of the present invention to provide a network print system and its control method, which allow secure communications by providing means for encrypting a print image to be sent from the Web server to the client, and providing a decryption means to an additional program on the client side.

It is still another object of the present invention to provide a network print system and its control method, which can restrict use of form data by providing a database which holds restriction information such as a valid date of a print process, the number of printable times, and the like.

It is still another object of the present invention to provide a network print system and its control method, which can quickly obtain a print request by instructing a printer, which is selected in correspondence with the current processing states of printers equipped on the client side, to print.

It is still another object of the present invention to provide a network print system and its control method, which automatically select an optimal print condition on the basis of the print history by analyzing form data to be printed, thereby reducing the load on the user in terms of setups and preventing setup errors.

It is still another object of the present invention to provide a network print system and its control method, which can prevent client requests from waiting too long before reaching the server or from not reaching the server at all by selecting a network route for reply data of the server, which is different from that for request data.

In order to achieve the above objects, the present invention has the following arrangement. That is, there is provided a network print system which connects a server and client, the client comprising instruction means for displaying an image which is received from the server, and variable data of which is described in a display format, and instructing a print process of displayed data, and the server comprising:

storage means for storing template data;

means for reading out template data from the storage means based on an instruction from the client and data sent to the client;

generation means for generating print data by merging the readout template data and variable data displayed on the client; and output means for controlling a printer to print the print data.

A plurality of servers equivalent to the server are provided, and the system further comprises load distribution means for determining one of the plurality of servers to which a process corresponding to the instruction is assigned, upon receiving the instruction from the instruction means of the client.

The load distribution means assigns the process corresponding to the instruction to one of the plurality of servers in an order registered in advance.

The load distribution means assigns the process corresponding to the instruction to one of the plurality of servers, which has a fewest number of incomplete processes.

The load distribution means further comprises holding means for holding states of the plurality of servers, updates contents of the holding means in accordance with the states of the servers, and does not assign the process corresponding to the instruction to the server which is determined not ready to use with reference to the contents of the holding means.

When each of the servers is ready to use, the server sends a ready message to the load distribution means, and the load distribution means updates, upon receiving the message, the contents of the holding means to indicate that the server that issued the message is ready to use.

The client further comprises means for designating whether a printer of the client or the server is used as the printer together with a print instruction, and the output means prints out the generated print data from the server or sends the print data to the client in accordance with the designation.

The client further comprises means for designating whether a printer of the client or the server is used as the printer together with a print instruction, and the output means prints out the generated print data from the server or sends the print data to the client in accordance with the designation.

The client further comprises a plurality of printers for printing out data, and means for selecting one of the plurality of printers, which is suitable for the print data received from the server, and outputs received print data using the selected printer upon receiving the print data from the server.

The client further comprises display instruction means for sending a display instruction of desired data to the server, and the server further comprises means for editing the desired data into a display format and sending the edited data to the client upon receiving the display instruction.

A plurality of load distribution means equivalent to the load distribution means are provided, and the client selects a desired one of the plurality of load distribution means and issues an instruction by the instruction means.

Or the present invention comprises the following arrangement. That is, there is provided an information processing apparatus connected to a client, comprising:

an image generation unit having:

storage means for storing template data;

means for reading out template data from the storage means based on an instruction from the client and data sent to the client;

generation means for generating print data by merging the readout template data and variable data displayed on the client; and output means for controlling a printer to print the print data.

A plurality of image generation units equivalent to the image generation unit are provided, and the apparatus further comprises load distribution means for determining, upon receiving the instruction from the client, one of the plurality of image generation units to which a process corresponding to an instruction is assigned.

The load distribution means assigns the process corresponding to the instruction to one of the plurality of image generation units in an order registered in advance.

The load distribution means assigns the process corresponding to the instruction to one of the plurality of image generation units, which has a fewest number of incomplete processes.

The load distribution means further comprises holding means for holding states of the plurality of image generation units, updates contents of the holding means in accordance with the states of the image generation units, and does not assign the process corresponding to the instruction to the image generation unit which is determined not ready to use with reference to the contents of the holding means.

When each of the image generation units is ready to use, the image generation unit sends a ready message to the load distribution means, and the load distribution means updates, upon receiving the message, the contents of the holding means to indicate that the image generation unit that sent the ready message is ready to use.

In order to achieve the above objects, the present invention has the following arrangement. That is, there is provided a network print system which connects a client and a server which can send a file to the client in accordance with a name designated by the client, the client comprising request means for requesting the server to generate an image and to send the generated image, and the server comprising generation means for generating an image file based on a request from the client, and sending means for sending the generated image file to the client.

The server further comprises storage means for storing the image file generated by the generation means, and when an image corresponding to a generation request is an already requested image, the server sends the image file stored in the storage means to the client.

The sending means of the server saves the generated file at a location an unspecified client can access and informs the client of a file name of the saved file, or saves the generated image file at a location an unspecified client cannot access, and sends the image file to the client, in accordance with designation from the client.

Alternatively, the present invention has the following arrangement. That is, there is provided a network print system having a client which issues a print request of a document composed of predetermined template data and variable data to be merged with the template data using a printer connected on a network, or a display request of a document to be printed, and a server which is connected to the client to be able communicate therewith, generates print data on the basis of the print request or display data on the basis of the display request, and sends the generated data to the client, comprising:

a server having means for encrypting the print data to be sent to the client by a predetermined method, and sending the encrypted print data, and a client for decrypting and using the encrypted print data using predetermined decryption data.

Alternatively, the present invention has the following arrangement. That is, there is provided a network print system having a client which issues a print request of a document composed of predetermined template data and variable data to be merged with the template data using a printer connected on a network, or a display request of a document to be printed, and a server which is connected to the client to be able communicate therewith, generates print data on the basis of the print request or display data on the basis of the display request, and sends the generated data to the client, comprising:

a server having means for generating unique data in units of sessions with the client, means for encrypting the print data to be sent to the client on the basis of the unique data, and means for generating decryption data required for decrypting the encrypted print data on the basis of the unique data; and a client for acquiring the decryption data from the server, and decrypting and using the encrypted print data.

Alternatively, the present invention has the following arrangement. That is, there is provided a network print system having a client which issues a print request of a document composed of predetermined template data and variable data to be merged with the template data using a printer connected on a network, or a display request of a document to be printed, and a server which is connected to the client to be able communicate therewith, generates print data on the basis of the print request or display data on the basis of the display request, and sends the generated data to the client, comprising:

a server for inhibiting generation of the print data or changing contents of print data to be generated on the basis of authority data registered in advance upon executing a process based on the print request.

Alternatively, the present invention has the following arrangement. That is, there is provided a network print system having a client which issues a print request of a document composed of predetermined template data and variable data to be merged with the template data using a printer connected on a network, or a display request of a document to be printed, and a server which is connected to the client to be able communicate therewith, generates print data on the basis of the print request or display data on the basis of the display request, and sends the generated data to the client, comprising:

a server having restriction information storage means for storing restriction conditions which disable a print or display process in units of template data, and the server inhibiting a process based on the print or display request when the print or display request satisfies the restriction condition.

Alternatively, the present invention has the following arrangement. That is, there is provided a network print system having a plurality of clients each of which issues a print request of a document composed of predetermined template data and variable data to be merged with the template data using a printer connected on a network, or a display request of a document to be printed, and a server which is connected to the clients to be able communicate therewith, generates print data on the basis of the print request or display data on the basis of the display request, and sends the generated data to the client which issued the request, comprising:

a server for selectively sending the print data to one of the plurality of clients.

Alternatively, the present invention has the following arrangement. That is, there is provided a network print system having a plurality of clients each of which issues a print request of a document composed of predetermined template data and variable data to be merged with the template data using at least one of a plurality of printers connected on a network, or a display request of a document to be printed, and a server which is connected to the clients to be able communicate therewith, generates print data on the basis of the print request or display data on the basis of the display request, and sends the generated data to the client which issued the request, comprising:

a server for determining the printer which is to print the print data, in accordance with a characteristic of a document to be printed based on the print request.

Alternatively, the present invention has the following arrangement. That is, there is provided a network print system having a plurality of clients each of which issues a print request of a document composed of predetermined template data and variable data to be merged with the template data using a printer connected on a network, or a display request of a document to be printed, and a server which is connected to the clients to be able communicate therewith, generates print data on the basis of the print request or display data on the basis of the display request, and sends the generated data to the client which issued the request, comprising:

a server for sending the print data via a route different from a route of the incoming print request.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows an example of form data serving as a template of a form to be printed;

FIG. 11 shows an example of a distribution setup table in the second embodiment;

FIG. 13 shows an example of a distribution setup table in a modification of the second embodiment;

FIG. 17 shows a distribution setup table in the third embodiment;

FIG. 25 is a data block diagram for sending image data from a client to a server in the prior art;

FIG. 40 is a memory block diagram showing a decryption key holding structure according to the 12th embodiment of the present invention;

FIG. 42 shows an example of a table that shows the correspondence between the user IDs and print authority levels in the process shown in FIG. 41;

FIG. 43 shows an example of the configuration of a variable data table that shows the relationship between the user authority levels and print/display items;

FIG. 49 is a view showing the structure of a database that holds printer information and the like;

DETAILED DESCRIPTION OF THE PREFERRED EMBODIMENTS

[First Embodiment]

Figure 1:
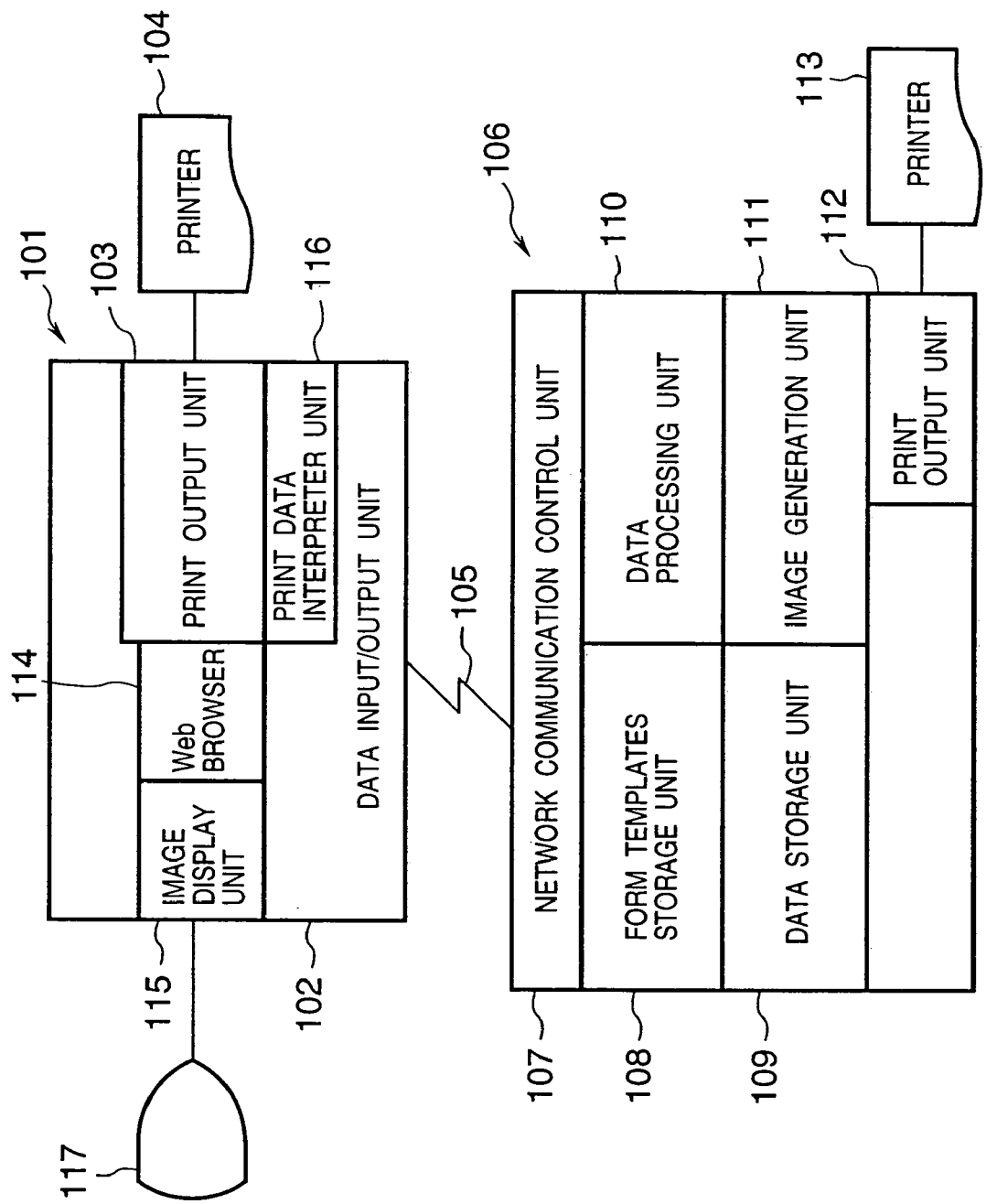
FIG. 1 is a block diagram of a network print system.

FIG. 1 is a software block diagram of a network print system according to an embodiment of the present invention. FIG. 1 shows one each of a server and client.

<Example of Network System Arrangement>

Referring to FIG. 1, a client 101 is an information processing apparatus such as a personal computer or the like. The client 101 includes a data input/output unit 102, print output unit 103, Web browser 114, image display unit 115, print data interpreter unit 116, and the like.

The data input/output unit 102 exchanges data with a server 106 via a network 105 such as a telephone network, LAN, or the like, and executes processes of protocol layers lower than HTTP. The print output unit 103 converts print data described in a predetermined format into data according to the output format of a printer 104 and outputs the converted data from the printer 104. Also, the unit 103 spools data in the output format of the printer, which is received from the server or the like, and makes the printer 104 print.

The Web browser 114 displays an HTML document received from the server via the data input/output unit 102 on a display 117 via the image display unit 115, or prints it via the print output unit 103 in accordance with operation via an input device such as a keyboard (not shown) or the like. Furthermore, when the displayed HTML document data contains a description for inputting some data on the screen, the browser 114 prompts the user to input data in fields corresponding to that description. Also, when the HTML document data includes a description for sending the input data to the server, and the user makes operation according to that description, the browser 114 sends the input data to the server. Note that these descriptions are supported by generally available, typical Web browsers. The print data interpreter unit 116 interprets print data received from the server or the like, and can check if the received data has a format to which the printer 104 connected to the client 101 is compatible.

The type of pattern of the network 105 that connects the client 101 and server 106 is not particularly limited as long as it can cope with the communication sequence of the Web environment. For example, a LAN, the Internet, a radio, and the like may be used.

The server 106 is a Web server which supports at least HTTP and FTP, and is an information processing apparatus such as a computer like the client. The server 106 includes a network communication control unit 107 which allows the server 106 to function as a Web server. The server 106 sends data to the client 101 or receives data therefrom via the network communication control unit 107.

A form template storage unit 108 stores form templates and the like used to make form print. Note that template data is set and stored in advance in correspondence with an HTML document read out from the server by the client. Hence, when the server sends an HTML document corresponding to a given form template to the client, it stores an identifier corresponding to that document. Also, a template stored in the form template storage unit is stored by appending an identifier corresponding to an HTML document thereto in units of templates.

A data storage unit 109 is a database or the like and stores task data. The data may be pre-stored or may be input from the client via the browser. A data processing unit 110 stores application programs according to individual tasks. An image generation unit 111 generates form image data in a format that a print output unit 112 can interpret by merging a form and data to be overlaid thereon. The print output unit 112 converts data generated by the image generation unit into a format that a printer 113 can output, and makes the printer output the converted data. Also, the print output unit 112 can output the generated data as a data file. The print output unit 112 is generally called a printer driver.

Figure 8:
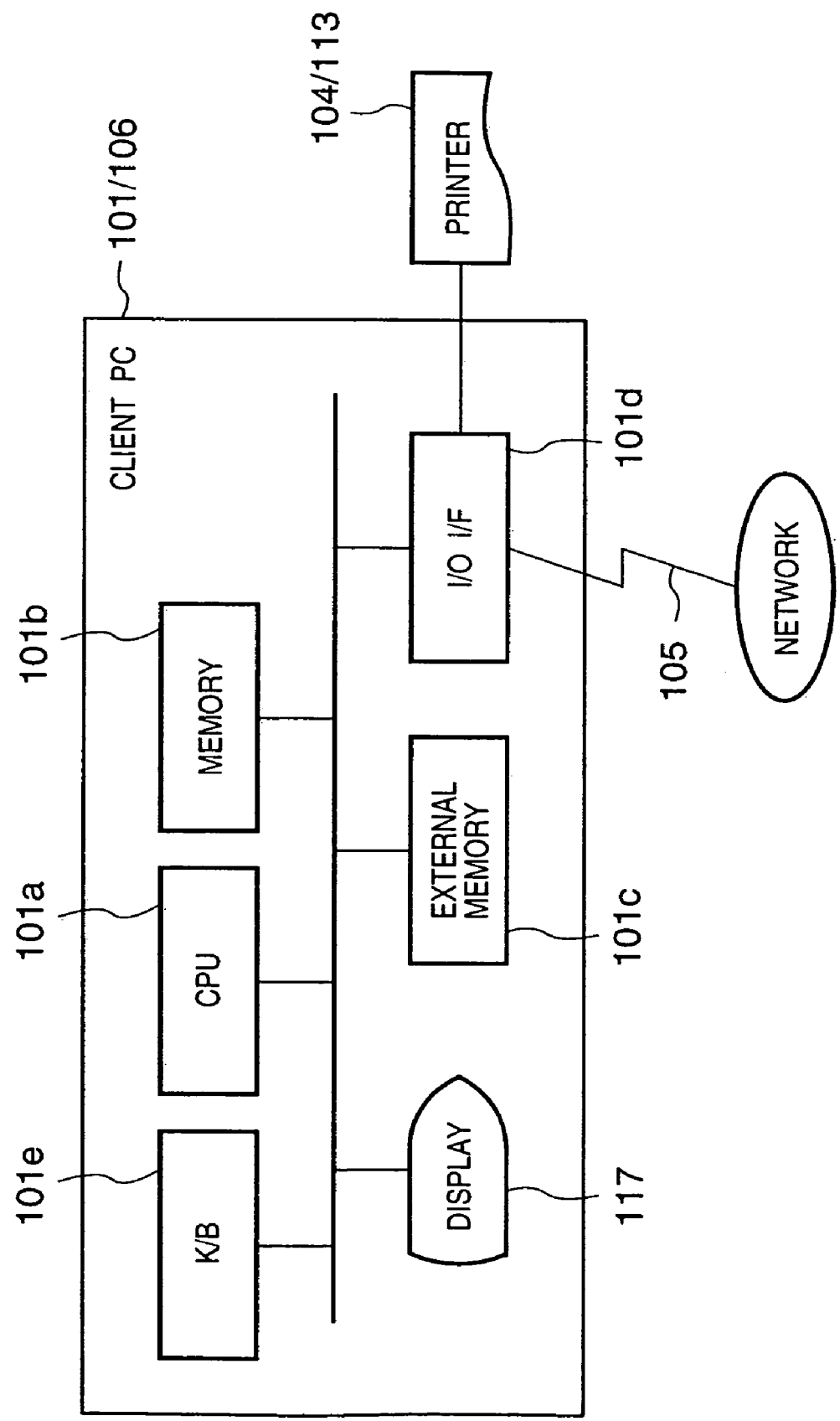
FIG. 8 is a block diagram showing the arrangement of the client/server.

FIG. 8 shows the hardware arrangement of an information processing apparatus which can be used as the client and server. The arrangements of the client 101 and server 106 shown in FIG. 1 are implemented when a CPU 101a executes programs stored in a memory 101b. The programs for implementing the arrangement shown in FIG. 1 are stored in an external memory 101c such as a hard disk or the like. The external memory 101c may use a detachable storage medium such as a floppy disk, CD-ROM, or the like. The data storage unit 109 or form template storage unit 108 can be implemented as a local area of the external memory 101c.

A display 117 (in case of the client 101) displays an image, and is connected to the network 105 and printer 104 (113) via an I/O interface 101d. The operator inputs required information using a keyboard or pointing device 101e.

<Form Print Process>

A print instruction from the browser and the process of the server executed in response to the instruction as characteristic features of the present invention will be explained below.

Normally, between the browser 114 of the client 101 and the data processing unit 110 of the server 106, processes such as reception and interpretation of data from the browser, and data search from the data storage unit 109 in accordance with the received data and reply of the search result to the browser, and so forth are done. At this time, when an HTML document has a description that prompts the user to input using a button from the browser and sends the result to the server, the browser 114 displays the button, and sends data to the server when the user of the browser has pressed that button. The server interprets received data on the basis of the HTML document sent to the client, and returns a reply to the browser if necessary.

Figure 2:
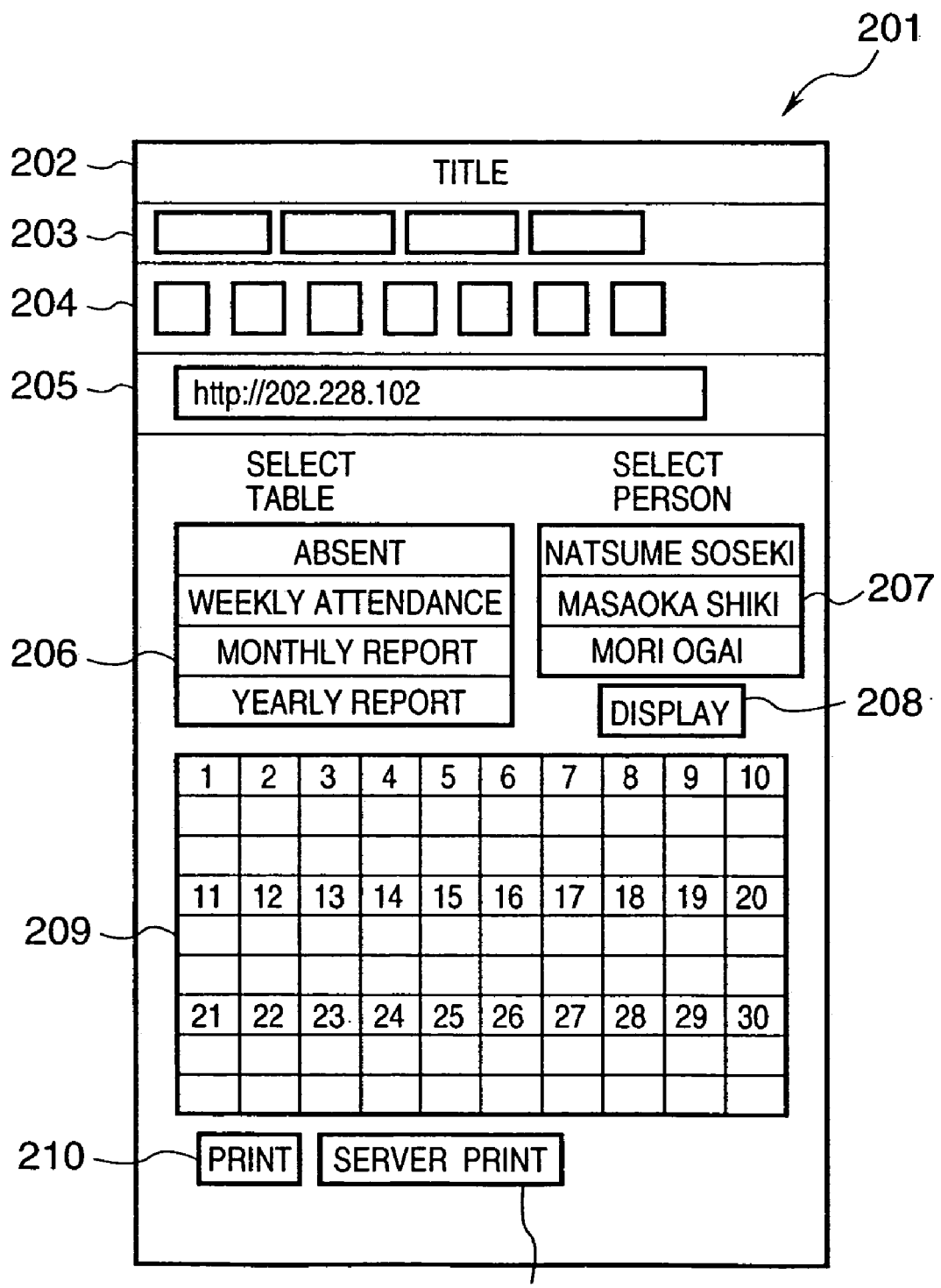
FIG. 2 shows a screen display example of a Web browser of a client.

FIG. 2 shows an example of an HTML document associated with task processes, which is displayed by the browser. Referring to FIG. 2, a window 201 corresponds to that of the browser 114 displayed on the display 117. A title area 202 displays a title assigned to the displayed document. Areas 203 and 204 display commands of the browser 114 in the form of a tool bar, buttons, and the like. A command for printing the contents displayed by the browser is normally displayed on these areas. An area 205 is a URL field for inputting/outputting the address of a Web server to be connected, a URL of a document, and the like. The HTML document is designated by a URL input here.

Selection fields 206 and 207 are those to be selected by the client user. A button 208 is a display button. A form image 209 is displayed by reading out an HTML document corresponding to the document address input in the area 205 from the server. This HTML document includes a print button 210 and server print button 211 in addition to the form image 209.

To read out a document in the server from the client 101, the user launches the browser program 114 at the client. The browser itself can be a commercial product. When the browser 114 is launched, the title area 202 to the URL field 205 are displayed, and a blank page or a document designated by a pre-set URL is displayed on the remaining area. When "http://202.228.102" is designated, as shown in FIG. 2, an HTML document including the fields 206 to 211 is read out from the server and is displayed.

When the user selects a desired value from the selection fields 206 and 207 on this window using the pointing device or keyboard, and then presses the display button 208, data to be read out is settled, and the selected person name and table type are submitted to the server. The server 106 searches the data storage unit 109 using the selected person name and table type as keys at the designated URL to acquire data. The data includes a format identifier for designating the format in which the acquired data is to be displayed.

The server generates an HTML document for displaying data found by search based on the format corresponding to that identifier, and sends it to the client. Note that the HTML document according to the format identifier is described in advance except for variable data fields, and data indices are inserted in the variable data fields as they can be recognized as indices. A document to be sent from the server to the client is generated by inserting data found by search into the index fields of the document in that format in correspondence with indices. Note that this display sequence will be described in detail later in the sixth embodiment with reference to the accompanying drawings.

The client displays the received data, as shown in FIG. 2. When the client user presses the server print button 211 or print button 210 while displaying these data, the document is printed from the server or client in the following sequence.

<Sequence Upon Printing by Server>

Operation executed upon pressing the server print button 211 in the state shown in FIG. 2 will be explained below. In the print process, a document to be printed is generated by inserting data into a template corresponding to the format identifier, as in the HTML document. Upon pressing the server print button 211, information indicating that the server print button has been pressed is sent to the server 106. The server searches form data stored in the form template storage unit 108 as a template of each form on the basis of the format identifier appended to the data that has been sent to the client 101 which requested the print process. Form templates are stored so that they can be found by search based on the format identifier.

FIG. 3 shows an example of a form template to be printed. Form data as a form template will be described using FIG. 3. The form data are classified into permanent data and variable data. A character string 301 of a form title, a frame and numeral/character string 302 indicating dates and the like, and a character string and frame 303 are permanent data. On the other hand, character strings 304 and 305 indicated by nxx and sxx are variable data in which values retrieved from a database or the like are inserted.

Figure 4:
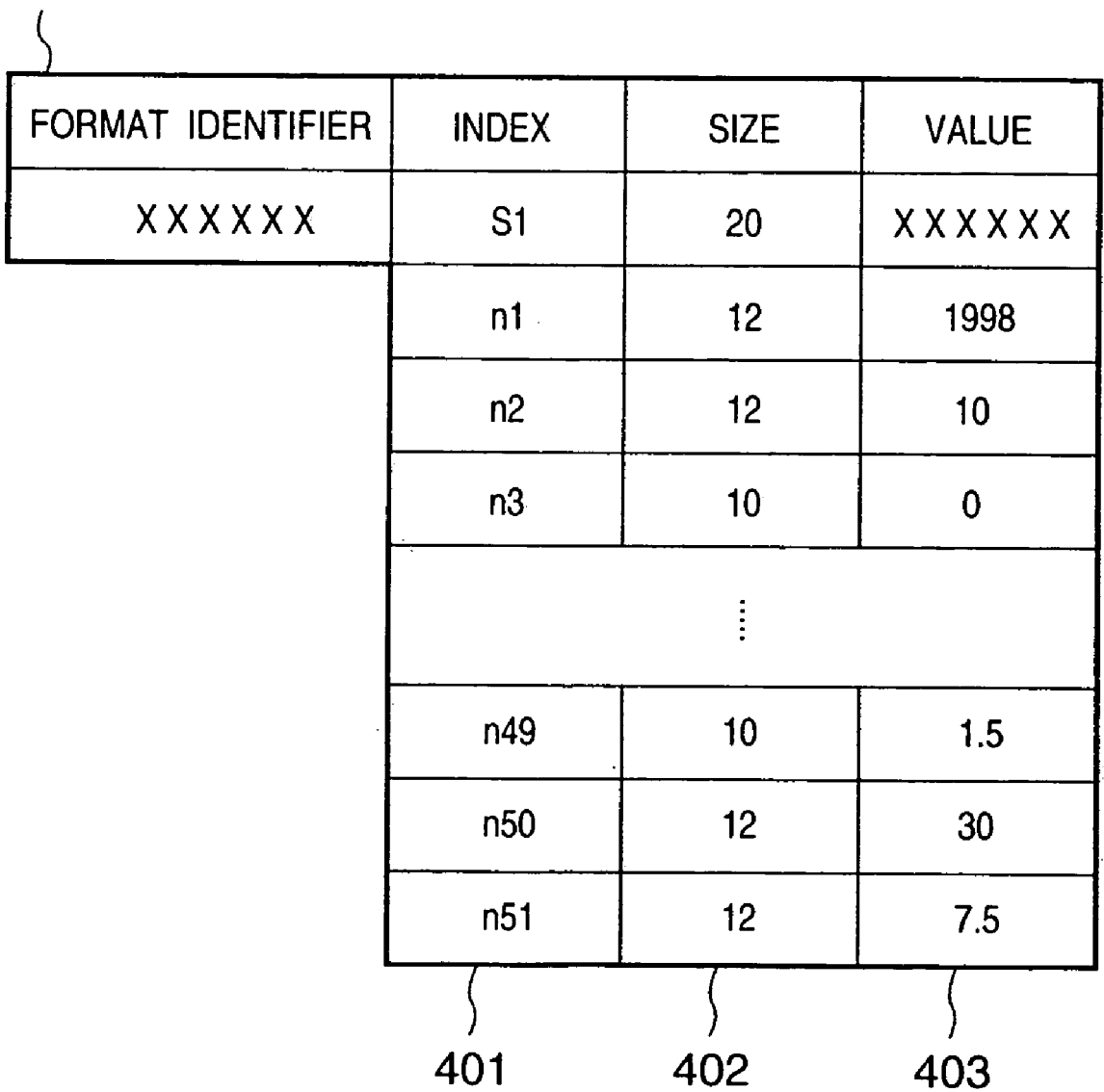
FIG. 4 shows an example of data to be merged with the form to be printed.

On the other hand, FIG. 4 is a table of variable data to be inserted in the form data shown in FIG. 3. Referring to FIG. 4, a field 401 stores indices which indicate variable data s1, n1, n2, . . . , n51 in FIG. 3. A field 402 stores the sizes of characters to be displayed. A field 403 stores actual numerals or character strings. By merging the form image shown in FIG. 3 and the data shown in FIG. 4 in correspondence with the indices, form form data can be generated. A format identifier 404 is data indicating a form template on which data included in this table are to be displayed. In case of this table, the format identifier 404 stores data indicating the form template shown in FIG. 3.

The merge process of the form template shown in FIG. 3 and the data shown in FIG. 4 will be explained below using the flow chart shown in FIG. 5.

In the following description, assume that the image of the form to be printed is displayed on the browser window while the print buttons are displayed by the browser, and data for displaying the form image on the browser have been retrieved from the data storage unit 109 of the server and have been saved in a memory of the server.

Figure 5:
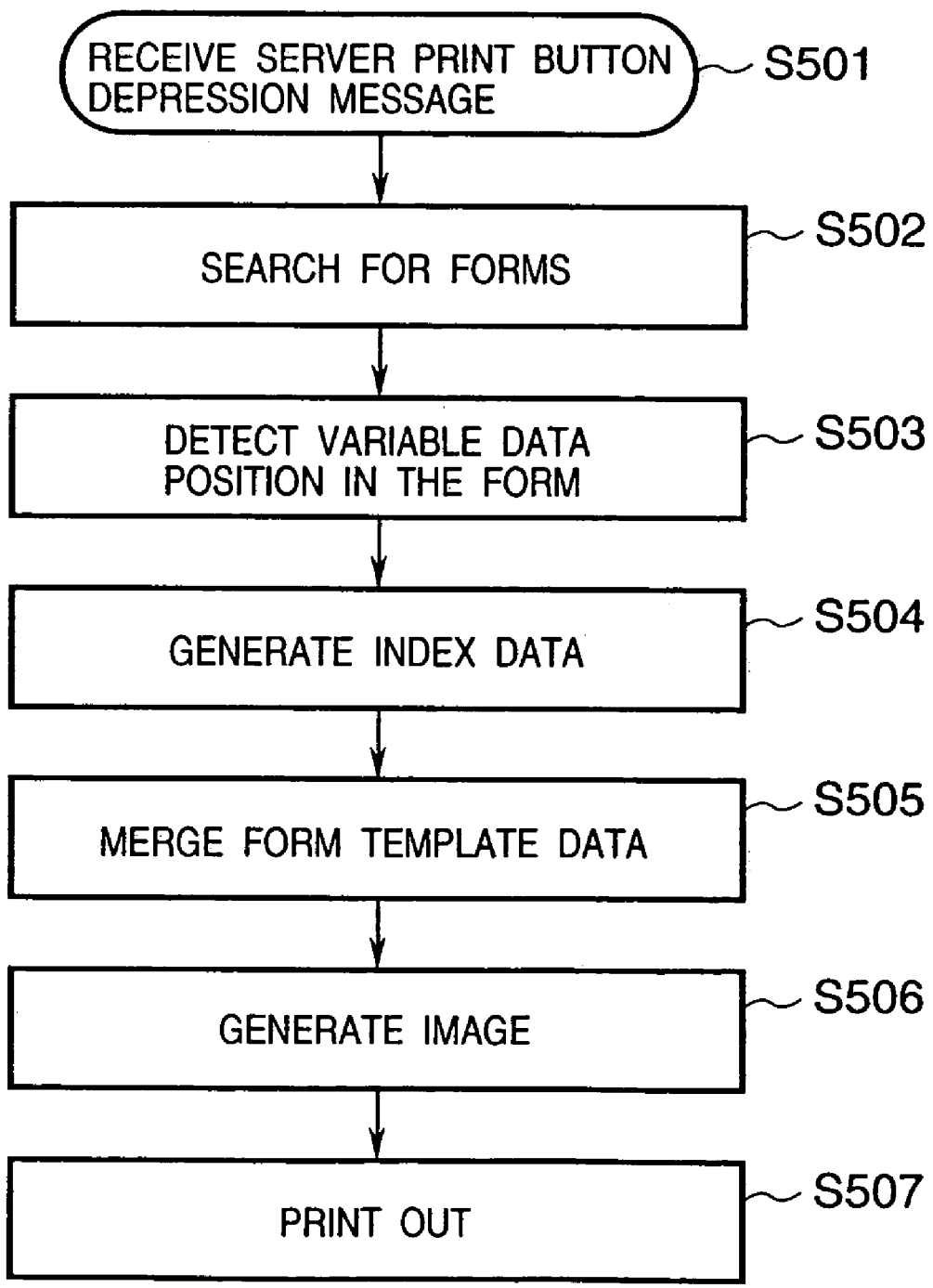
FIG. 5 is a flow chart showing the form print sequence by a server according to the first embodiment of the present invention.

FIG. 5 is a flow chart showing the processes executed by the server when the server has received information indicating that the server print button 211 was pressed on the browser window 201 (FIG. 2). Of the processes shown in FIG. 5, steps S501 to S504 are executed by the data processing unit 110, steps S505 and S506 by the image processing unit 111, and step S507 by the print output unit 112.

If the server receives information indicating that the button has been pressed in step S501, the server searches for a form to be used in the print process in step S502. Since the server stores a format identifier corresponding to a form template to be used in correspondence with HTML document data that has been sent to the client, the form template can be immediately found by search using the format identifier.

In step S503, the positions of variable data fields to be merged with the form template retrieved from the form template storage unit 108 are detected. For example, if the positions of variable data are described in correspondence with indices in units of data independently of fields that describe permanent data, the positions of the individual variable data can be easily recognized by indices included in the variable data fields. The indices and sizes are then extracted from the variable data table shown in FIG. 4. The variable data table corresponding to the form is read out at the time the display request was issued, and is saved in the server.

In step S504, index data is generated. More specifically, values (those included in the field 403) in the already saved variable data table are described in correspondence with the positions of variable data extracted in step S503 in accordance with their indices. In this manner, index data that describes the variable data fields is obtained.

In step S505, the image generation unit 111 merges the permanent data fields of the form template obtained in step S502 with the index data generated in step S504. In step S506, the image generation unit 111 generates data described in an actual image format, i.e., a format which the print output unit 112 can interpret, on the basis of the data merged in step S505. In step S507, the data generated in step S506 is converted into a print image in, e.g., a page description language that the printer 113 can output, and is output to a print spool assured on, e.g., the external memory 101c or the like. In this manner, the form template and data are merged, and are output from the printer 113 of the server 106.

<Process Upon Printing by Client>

Figure 6:
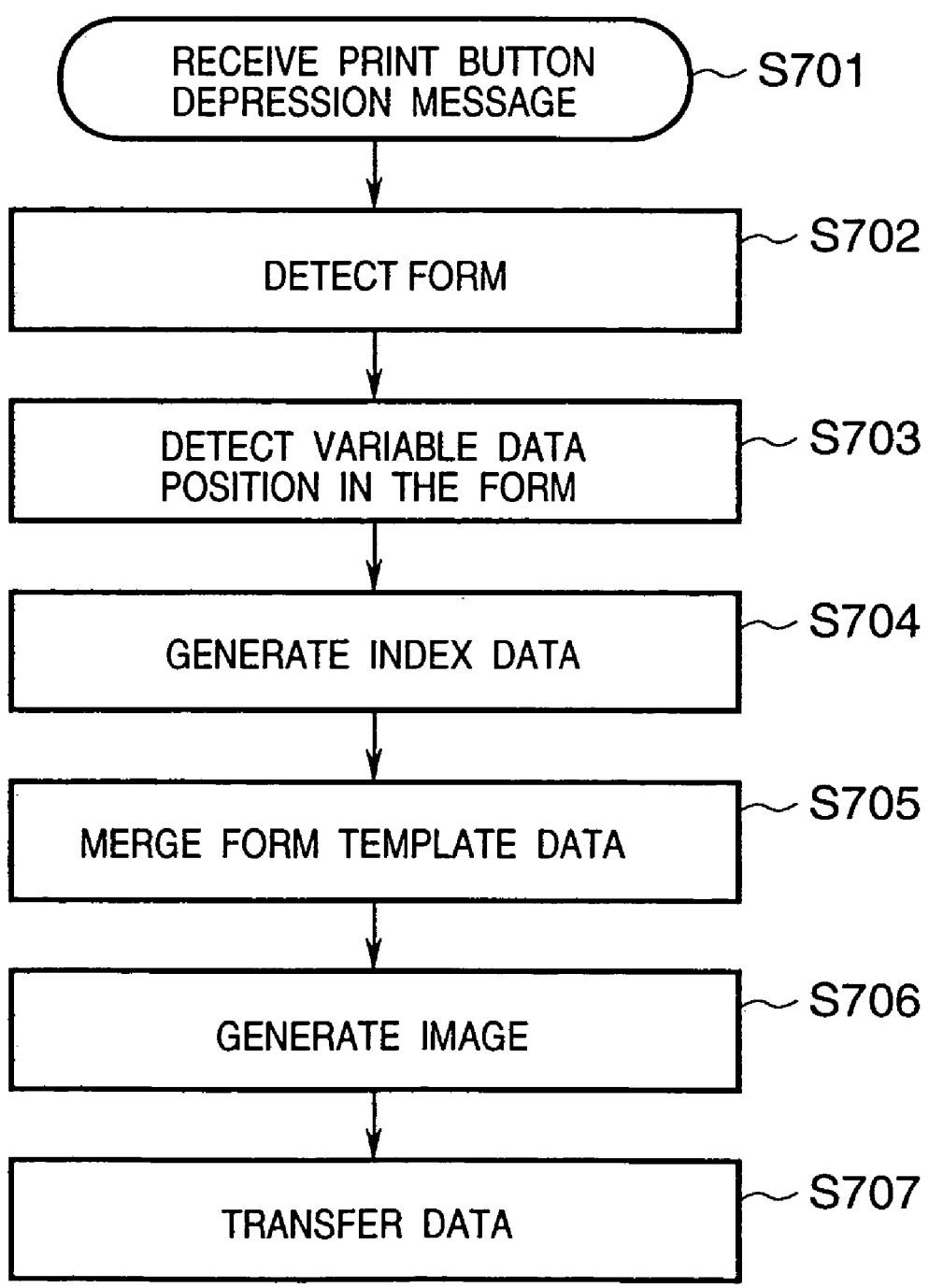
FIG. 6 is a flow chart showing the form print sequence by a client according to the first embodiment.

FIG. 6 is a flow chart showing the processing sequence of the server 106 upon pressing the print button 210 shown in FIG. 2.

If in step S701 the server receives information indicating that the button has been pressed, the server searches for a form to be used in the print process in step S702. Since the server stores a format identifier corresponding to a form template to be used in correspondence with HTML document data that has been sent to the client, the form template can be immediately found by search using the format identifier.

In step S703, the positions of variable data fields to be merged with the form template retrieved from the form template storage unit 108 are detected. For example, if the positions of variable data are described in correspondence with indices in units of data independently of fields that describe permanent data, the positions of the individual variable data can be easily recognized by indices included in the variable data fields. The indices and sizes are then extracted from the variable data table shown in FIG. 4. The variable data table corresponding to the form is read out at the time the display request was issued, and is saved in the server.

In step S704, index data is generated. More specifically, values (those included in the field 403) in the already saved variable data table are described in correspondence with the positions of variable data extracted in step S703 in accordance with their indices. In this manner, index data that describes the variable data fields is obtained.

In step S705, the image generation unit 111 merges the permanent data fields of the form template obtained in step S702 with the index data generated in step S704. In step S706, the image generation unit 111 generates data described in an actual image format, i.e., which the print output unit 112 can interpret, on the basis of the data merged in step S705. In step S707, the data generated in step S706 is sent to the client.

In this step, the data itself is sent to the client for the sake of simplicity. However, in practice, a URL of the generated data file is submitted to the client (Web browser 114) in place of the generated data itself. The client requests transmission of the data file using FTP in place of HTTP on the basis of the URL received by the Web browser, and the print data file is passed from the server onto the client.

Figure 7:
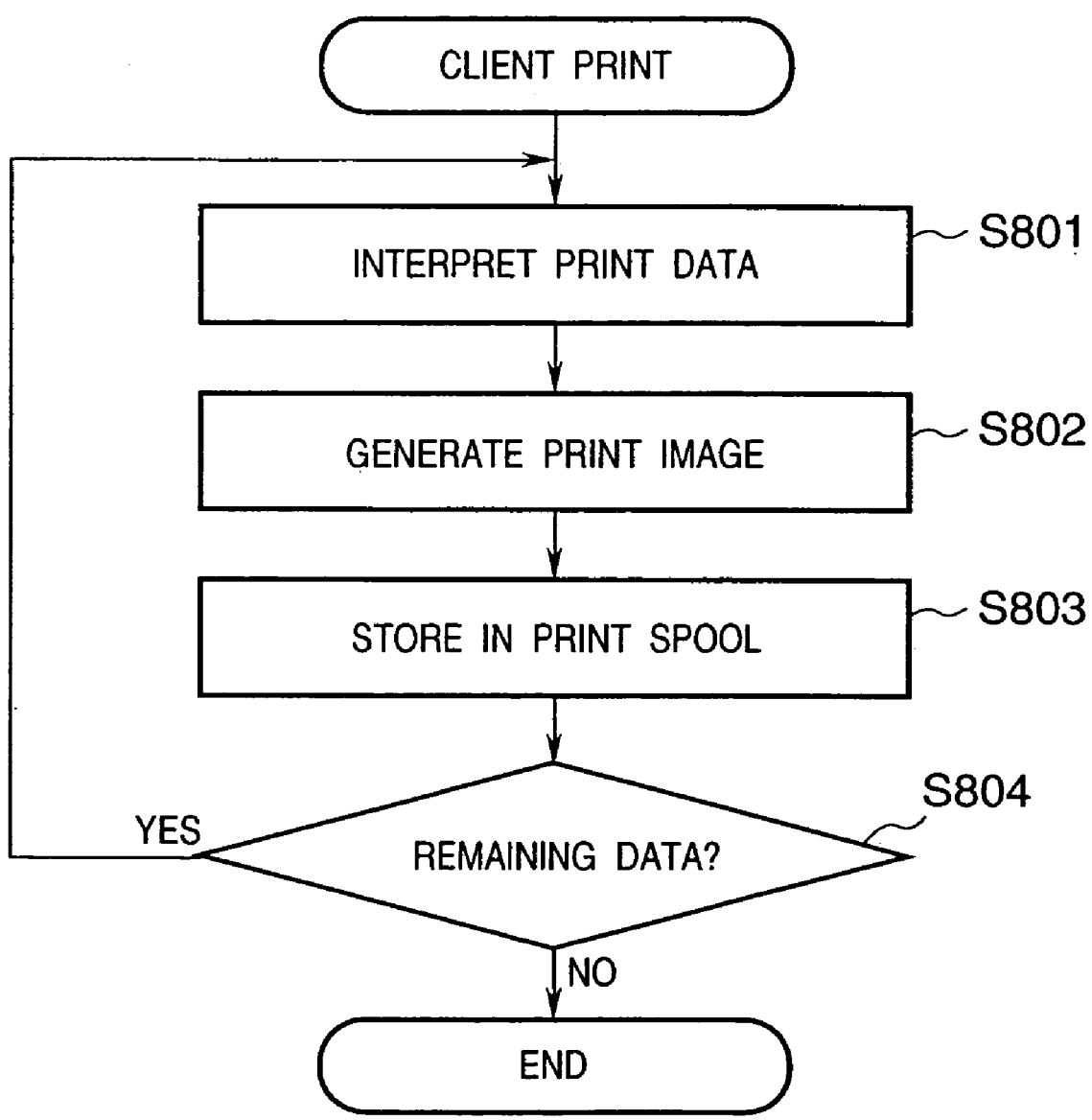
FIG. 7 is a flow chart showing the print sequence of data received from the server by the client.

FIG. 7 is a flow chart showing the processing sequence by the client that has received the data sent from the server in step S707 in FIG. 6.

In step S801, the print data interpreter unit 116 interprets the received data to find a printer suitable for the received data and to make the found printer print the data. In the arrangement of this embodiment, since only one printer is connected, as shown in FIG. 1, the received data is printed by that printer 104. In step S802, the print output unit 103 generates a print image that the printer 104 can output. The print image is stored in a print spool assured on, e.g., the external memory 101c in step S803, and is sequentially output by the printer. The processes in steps S801 to S803 are repeated until the whole data is received.

With the aforementioned sequence, the client can designate output data using the Web browser 114 and can print it out in an appropriate format.

Since a form is printed using the form template prepared for the print process, an image generated using the Web browser can be output as a high-quality print unlike a case wherein the displayed form is printed.

Also, a high-quality form image can be printed from the printer of either the server or client whichever the user chooses.

Furthermore, since only the server stores form templates and merges it with data, the client can print a high-quality form image from the server by preparing only a commercially available Web browser.

For this reason, the load on the client is light, and an inexpensive personal computer with low processing power can be used as the client.

In this embodiment, the form template is determined in accordance data. Alternatively, the template can be selected independently of data.

Also, data to be output is searched from the database, but may be input by the client user using the Web browser. In this case, input data can be merged with the form template, and the merged data can be printed.

Note that the print output unit 103 in the client has a function of generating data in a format which the printer can interpret. However, when the server generates data in the format which the printer 104 of the client can interpret, the print output unit 103 need not have that function, and need only have a function of storing received data in a printer spool.

When the client selects data, the display format is determined in correspondence with the selected data. Alternatively, the display format may be designated independently of data. In this case, a format designation switch is displayed on the browser window shown in FIG. 2, and the user designates a desired format using that switch. The server searches for a template corresponding to the designated format and uses it in the print process. When the format is designated from the browser, the format identifier 404 in the variable data table (FIG. 4) can be omitted.

[Second Embodiment]

This embodiment is characterized in that the server in the network print system according to the first embodiment has a three-layered structure to distribute the load.

Figure 9:
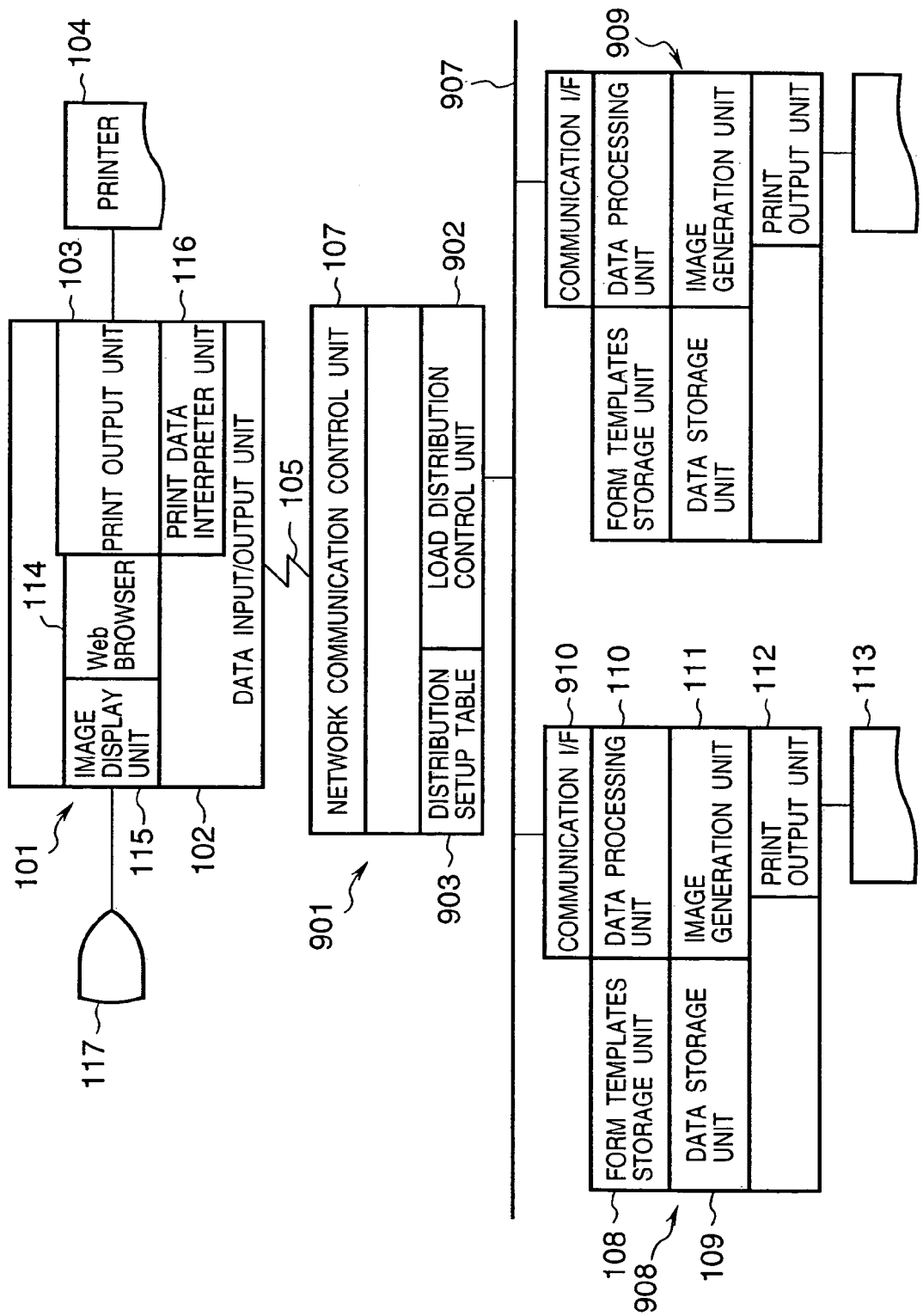
FIG. 9 is a block diagram showing a network print system having a plurality of image generation servers according to the second embodiment and its modification of the present invention.

FIG. 9 is a software block diagram of the network print system according to this embodiment.

Referring to FIG. 9, since the client 101 has the same arrangement as that shown in FIG. 1, a detailed description thereof will be omitted. In FIG. 9, the same reference numerals denote software blocks having the same functions as those of the server 106 to allow easy comparison with the server 106 shown in FIG. 1.

A Web server 901 is an information processing apparatus, and its network communication control unit 107 has the same functions as that of the server 106 shown in FIG. 1. A load distribution control unit 902 controls image generation servers 908 and 909 (to be described later) to share and execute the processes of the image generation unit and the like in the first embodiment. A network 907 connects the Web server 901, and image generation servers 908 and 909 to each other.

The image generation servers 908 and 909 have the same arrangement, and also comprise computers each having the arrangement shown in FIG. 8. Each image generation server has an arrangement obtained by excluding the network communication control unit 107 that processes the HTTP layer from that of the Web server 106 shown in FIG. 1. The image generation servers 908 and 909 are connected to the network 907 via communication interfaces 910 and can exchange data with the Web server 901. The image generation servers 908 and 909 perform processes such as search of data and a form template, merging of the data and form template, conversion of the merged data into a print image, and a print-out process of the print image. That is, the Web server 901 distributes requests from the client 101 to the image generation servers 908 and 909 or passes replies from the image generation servers onto the client.

The sequence for controlling the image generation servers 908 and 909 with the image generation units 111 by the Web server 901 will be described below with reference to the flow chart shown in FIG. 10. In general, in a Web system, one session comes to an end by a single set of request and reply exchanged between the server and client. In order to hold a session in such system, a session ID may be inserted in a URL that indicates the location information of the server. When both the client and server hold this session number, many requests/replies exchanged therebetween can be recognized as one session.

Figure 10:
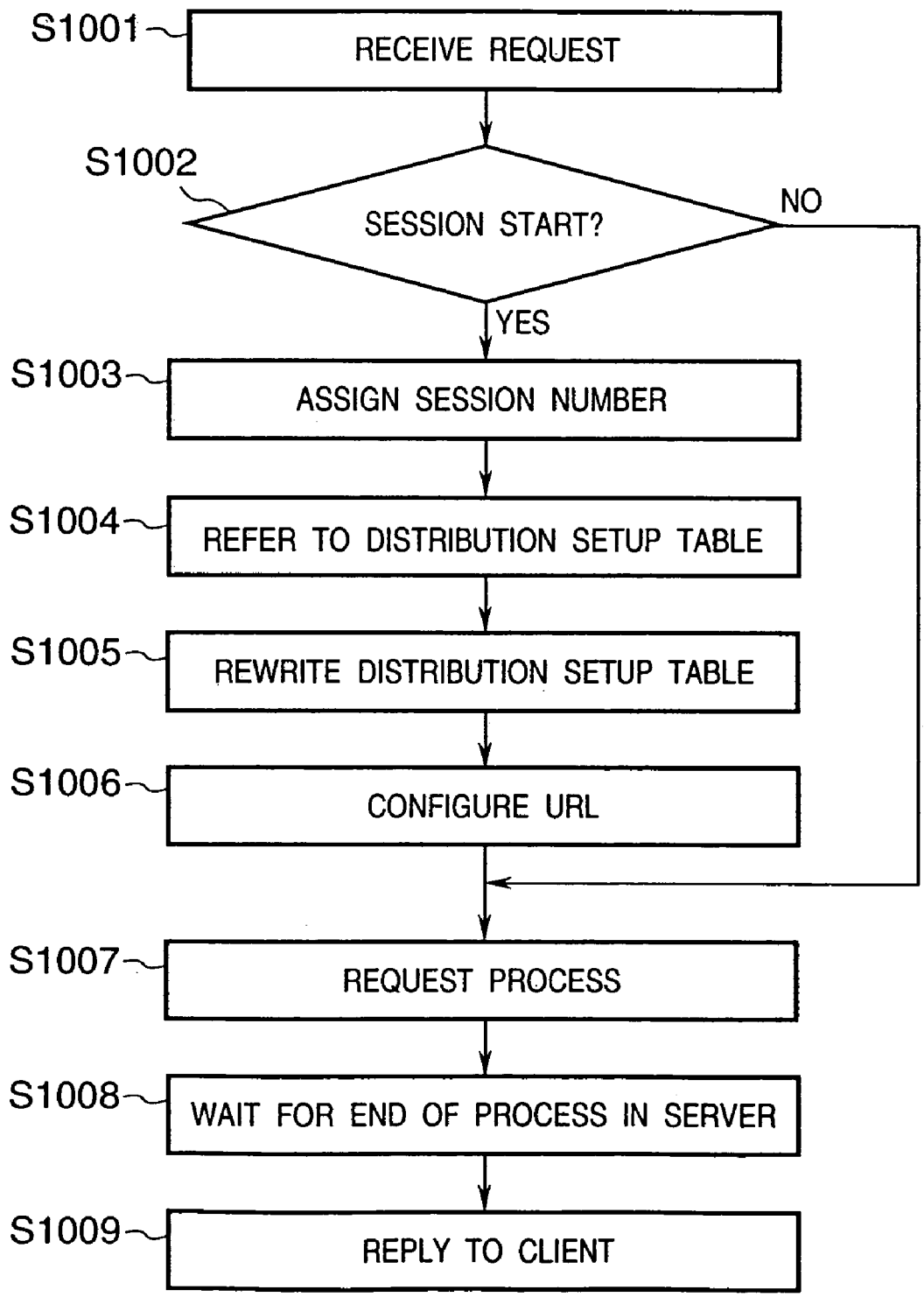
FIG. 10 is a flow chart showing the process request sequence to distributed image generation servers by a Web server.

FIG. 10 shows an example of the processing sequence that distributes processes to the image generation servers using the session ID.

Upon receiving a request from a certain client in step S1001, it is checked if a session ID is inserted in the designated URL (step S1002). If no session ID is inserted in the URL, it is determined that a session from this client is started, and a session ID is assigned to this request in step S1003. The URL with the session ID is returned to the client after the subsequent process is completed. As will be described later, the Web server 901 assigns a given image generation server for each session, and stores the session and corresponding image generation server.

When the client submits a request for the session that has already started, it inserts the session ID assigned in step S1003 into the URL. Hence, if it is determined in step S1002 that the session ID is inserted in the URL, i.e., if it is determined that the request from the client does not indicate session start but pertains to the session that has already started, the flow advances to step S1007 to access the image generation server corresponding to the session ID again.

In step S1004, the image generation server used is determined by looking up a distribution setup table 903 held in the Web server 901. FIG. 11 shows an example of the distribution setup table 903. Fields 1102 in FIG. 11 describe the addresses of computers (image generation servers in this embodiment) that perform distributed processes, and fields 1101 describe indices paired with the addresses. In this example, the IP addresses are described as the addresses.

The distribution setup table 903 is loaded into a memory managed by the load distribution control unit 902 upon starting up the Web server 901. Fields 1103 and 1104 hold the index ("99") of the computer, i.e., the image generation server having the image generation unit which was used most recently, and an offset address on this table.

Hence, FIG. 11 exemplifies a case wherein the Web server 901 manages four image generation servers with indices 1 to 4, and the image generation server with index 2 has received the latest process request.

Upon receiving a request from a new client, the image generation server with an index next to that of the server which was used most recently, i.e., the image generation server with index 3 is used. In this manner, the image generation server to be used next is determined in step S1004, and the contents of the field 1104 of the image generation server that was used most recently are updated in step S1005.

In step S1006, the session ID assigned in step S1003 and the address of the image generation server as a process request destination determined in step S1004 are appended to the URL designated by the URL, and that URL is stored. In this manner, upon receiving the URL and session ID in the subsequent access from the client to the server, the image generation server that performs the process can be specified.

In step S1007, the image generation server determined in step S1004 is requested to execute the process designated by the client.

In step S1008 in which the control waits for the end of the process in the server, the control waits until it receives a reply that indicates the end of the process requested of the image generation server. The process done by the image generation server is the same as the form data generation and output processes done by the Web server 106 in the first embodiment.

That is, the request from the client may be either a print process request or a display process request (to be described later) without any print process. Upon receiving a server print request, the process in the image generation server performs up to the printout process of image data obtained by merging the data and form template. Upon receiving a print request at the client, the process in the image generation server progresses until generation of a print image in the format which the client printer 104 can interpret (or up to generation of data in the format which the print output unit 103 can generate a print image). Upon receiving a display request, an HTML document corresponding to the display contents is generated.

Figure 12:
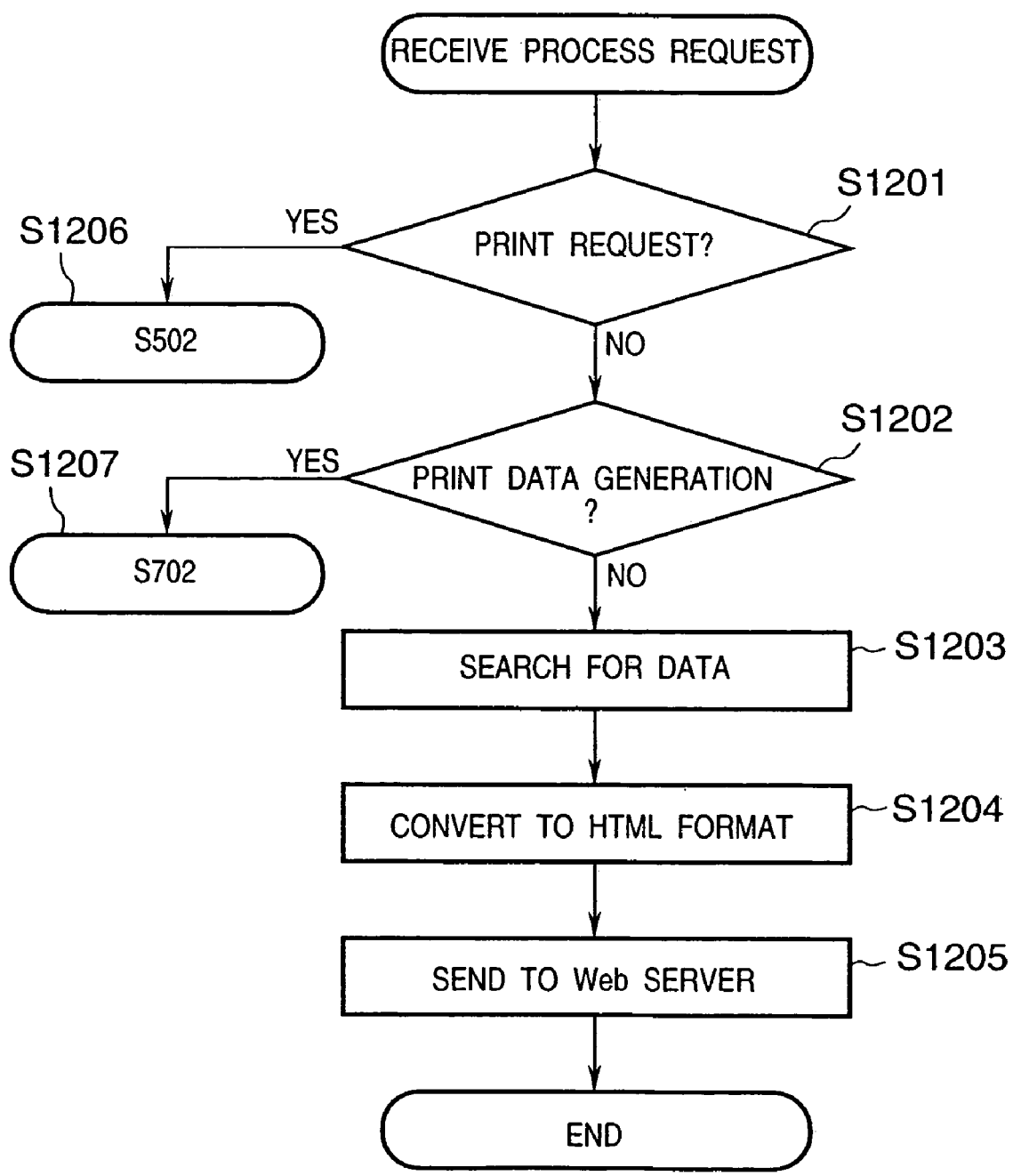
FIG. 12 is a flow chart showing the process sequence by the image generation server that has received a process request.

FIG. 12 is a flow chart showing the processing sequence executed by the image generation server which has received the process request from the Web server 901 in step S1008 in FIG. 11.

Upon receiving the process request from the Web server 901, it is checked in step S1201 if the request is a print request at the server. If YES in step S1201, the same processes as those in step S502 and the subsequent steps in FIG. 5 are executed to print out a form image.

On the other hand, if NO in step S1201, it is checked in step S1202 if the request is a print request at the client, i.e., a print data generation request. If YES in step S1202, the processes starting from step S702 in FIG. 6 are executed. Note that data is transferred not to the client but to the Web server 901 in step S707.

If the request is neither a print request at the server nor a print request at the client, it is determined that the request is a display request. Data to be displayed are retrieved in step S1203 and are edited to obtain an HTML document in step S1204, and that HTML document is sent to the Web server 901 in step S1205. Note that the processes requested from the Web server 901 are limited to those three processes. However, other requests can be easily processed by adding corresponding functions to the image generation server.

Upon receiving the process end message or the process result from the image generation server, the Web server 901 sends back a reply indicating the end of the print process or generated data to the client 101 in step S1009.

As described above, a session ID is assigned to a series of requests from the client, and an image generation server that processes the requests is determined. Every time a new session takes place, since the image generation server used is determined to be the one next to the image generation server used most recently in the load distribution table (if the image generation server used most recently is located at the end of the table, the first image generation server is selected), a series of requests from the client can be processed by a single image generation server, thus maintaining continuity of processes, and reducing the load on each image generation server.

[First Modification of Second Embodiment]

The load can be distributed more flexibly on the basis of the system in the second embodiment. More specifically, this modification is characterized by load distribution among a plurality of image generation servers.

The system arrangement in this modification is the same as that of the second embodiment, as shown in the block diagram of FIG. 9.

Figure 14:
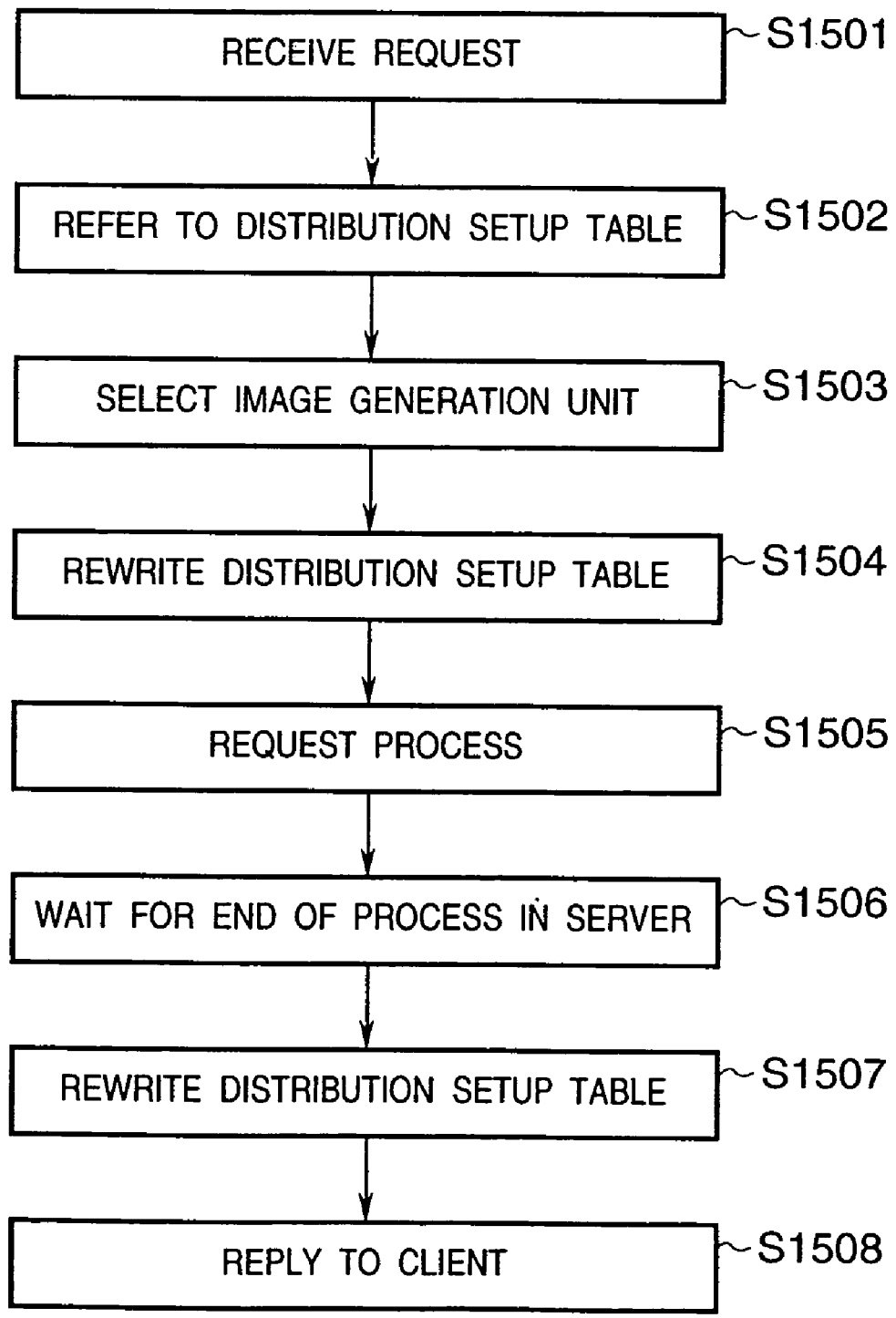
FIG. 14 is a flow chart of the image generation server selection sequence executed by the Web server in the modification of the second embodiment.

A mechanism for distributing processes of the image generation servers will be explained below using FIGS. 13 and 14.

FIG. 13 shows a distribution setup table 903' used to control load distribution in this modification. This table is used in place of the distribution setup table 903 in the second embodiment. The distribution setup table 903' stores indices corresponding in number to the image generation servers (or image generation units), and holds identification addresses for identifying the image generation servers in units of indices. As the identification address, an IP address and host name for network connection, a URL for HTTP connection, or the like is used. The distribution setup table 903' is stored in the Web server 901, and is loaded into a memory managed by the load distribution control unit 905 (FIG. 9) upon starting up the server.

The distribution setup table 903' is different from the distribution setup table 903 in that it has load coefficients 1403 together with the identification addresses in units of indices but does not have any identifier of the server which was used most recently. In this modification, the load coefficient 1403 indicates the number of requests from a client, which are assigned to a given server but the processes of which are not complete yet.

Upon receiving a request from a certain client, the Web server 901 selects an image generation server which appears to have the lightest load by looking up the distribution setup table 903', and sends a process request to the selected server. The processing sequence of the Web server 901 that processes client requests using the load coefficients in the distribution setup table 903' will be described below with reference to the flow chart in FIG. 14. In the following description, assume that a client request is processed by a new session.

In step S1501, the server receives a request from a certain client. In step S1502, the server searches the distribution setup table 903' for an image generation unit (server) with the smallest load coefficient. In the example shown in FIG. 13, an image generation server with index 4, which is denoted by reference numeral 1404, is a match. In step S1503, it is determined that the image generation server is requested to execute the process.

When there are a plurality of image generation units with a minimum load coefficient, one of them may be selected under an arbitrary condition.

In step S1504, the load coefficient in the distribution setup table 903', which corresponds to the selected image generation server, is incremented by 1. The selected image generation server is requested to execute the process in step S1505, and the control waits for the end of the process in the server in step S1506. The processing sequence done by the image generation server in step S1506 is the same as that in the second embodiment.

Upon reception of a process end message or processing result data from the image generation server, the load coefficient in the distribution setup table 903', which corresponds to that image generation server, is decremented by 1 (step S1507). Since the sequence shown in FIG. 14 is launched every time a client request is received, the next process request may be issued to the image generation server, which has not completed the previous process. The same applies to the second embodiment.

In step S1508, a process end message is sent to the client (if the request is a print or display data generation request, the processing result data is sent to the client).

(Registration Process in Distribution Setup Table)

Figure 15:
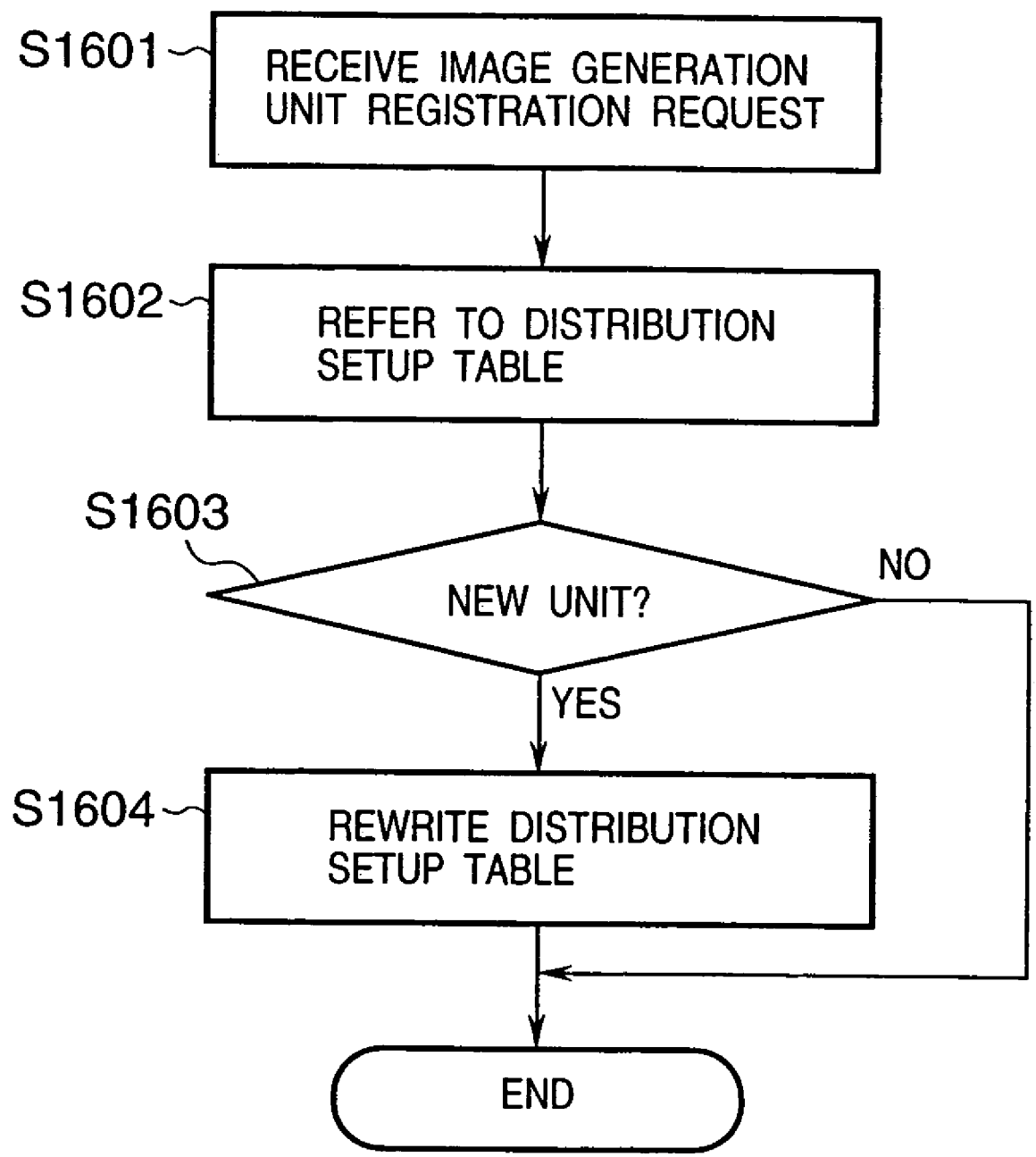
FIG. 15 is a flow chart showing the sequence for registering image generation units in the distribution setup table.

FIG. 15 is a flow chart showing the processing sequence for registering the identification address of a new image generation server in the distribution setup table. This sequence may be executed in response to input from a keyboard of the image generation server or to a new registration message from the Web server.

In step S1601, a registration request of an image generation unit is received. This request message contains the identification address of a source image generation server.

In step S1602, the distribution setup table is looked up. If the identification address is not registered, it is determined in step S1603 that a new image generation unit is to be registered, and the identification address is registered in the distribution setup table together with a new index in step S1604, thus ending the process. Note that zero load coefficient is set upon new registration.

On the other hand, if it is determined as a result of table lookup in step S1602 that the identification address has already been registered, the process ends without any process. In this manner, when a new image generation server is connected to the network 907, it can be registered in the distribution setup table of the Web server.

As described above, according to this modification, since a new process request is submitted to an image generation server which is processing a fewer number of requests than other servers, the loads on the image generation servers can be averaged. For this reason, the loads can be effectively distributed, and the processing efficiency of the whole system can be improved.

[Third Embodiment]

A network print system according to the third embodiment of the present invention will be described below. The system of this embodiment is a network system using a plurality of image generation servers as in the second embodiment, and is characterized in that when a given image generation server has failed, its process is done by another server.

Figure 16:
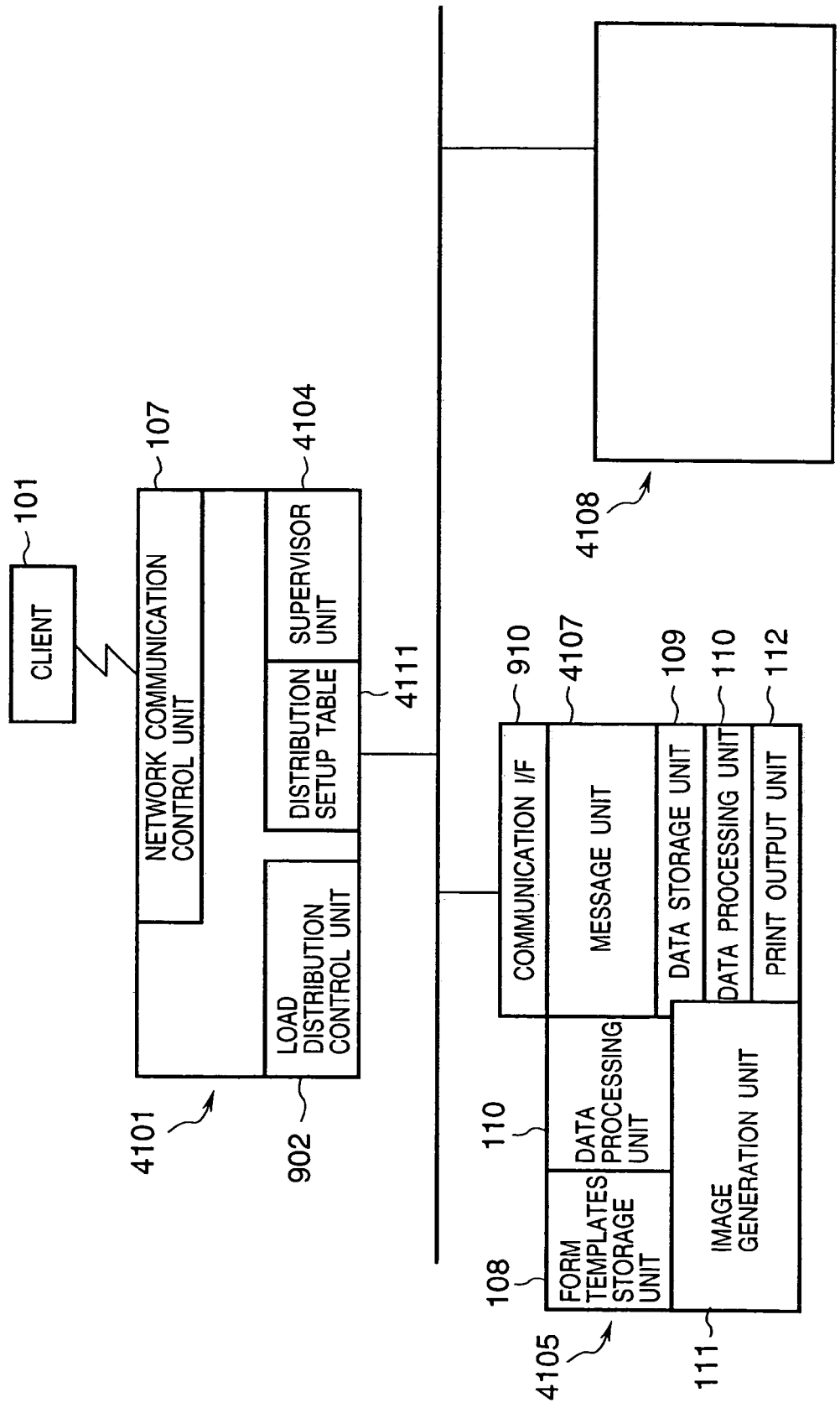
FIG. 16 is a block diagram of a network print system according to the third embodiment of the present invention.

FIG. 16 is a software block diagram showing the arrangement of the system according to this embodiment. Referring to FIG. 16, a client 101 is the same as that in the first or second embodiment. A Web server 4101 has substantially the same arrangement as that of the Web server 901 of the second embodiment, except that it has a supervisor unit 4104 for managing a distribution setup table 4111. A network communication control unit 107 and load distribution control unit 902 have the same functions as those of the second embodiment.

Image generation servers 4105 and 4108 have substantially the same arrangement (e.g., an image generation unit 111 and the like) as that of the image generation servers 908 and 909 in the second embodiment shown in FIG. 9, except that each of these servers has a notification unit 4107 which notifies the supervisor unit 4104 of status of the corresponding image generation server.

FIG. 17 shows the distribution setup table 4111 used to control distribution of the image generation servers in this embodiment. The distribution setup table 4111 stores indices corresponding in number to the image generation servers, and holds identification addresses for identifying image generation servers and status information in units of indices.

As the identification address, an IP address and host name for network connection, a URL for HTTP connection, or the like is used. The status information is a flag indicating whether or not a given image generation server is ready to receive an image generation request from the Web server. "OK" is set for image generation servers which are ready to receive requests, as indicated by fields 4004, 4005, and 4006, and "NG" is set for an image generation server which is not ready to receive a request, as indicated by a field 4007.

Such distribution setup table 4111 is stored in the Web server 4101, and is loaded into a memory managed by the load distribution control unit 902 upon starting up the server. Note that the table 4111 may have a field indicating the server which was used most recently, or a field for storing a load coefficient, like in the distribution setup table 903 in the second embodiment or the distribution setup table 903' in the first modification of the second embodiment. In this case, load distribution is done, as has been explained in the second embodiment and its modification, in addition to the server substitution process.

(Substitution Process)

The substitution process executed when a certain image generation server has failed and cannot be used will be described below with reference to the flow chart in FIG. 18. Since this process is done by the load distribution control unit 902 and supervisor unit 4104, FIG. 18 shows the processes by the load distribution control unit 902 on the left side, and those of the supervisor unit 4104 on the right side to help easy understanding of the processing flow.

Figure 18:
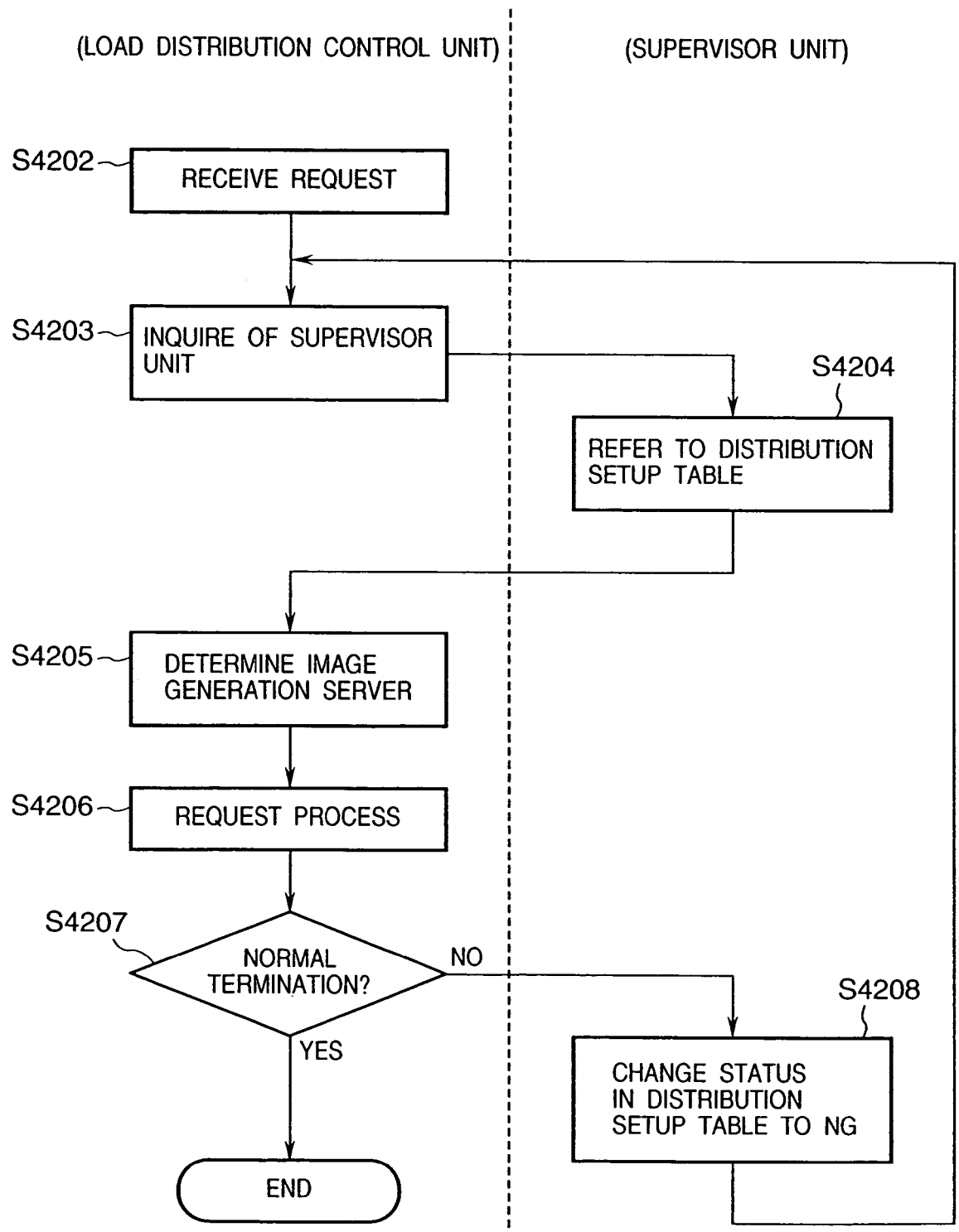
FIG. 18 is a flow chart showing the sequence for changing status of an image generation server to "NG" in the third embodiment.

The flow chart in FIG. 18 shows the sequence in which an appropriate image generation server is selected upon receiving a request from a certain client, a process request is sent to that image generation server, and when a trouble has occurred or been detected in the destination image generation server of the request, a substitute image generation server is selected to complete the requested process.

Upon receiving a request from a certain client in step S4202, the load distribution control unit 902 inquires of the supervisor unit 4104 as to an image generation server to which a process request can be submitted (if there is an image generation server with status "OK").

In step S4204, the supervisor unit 4104 searches the distribution setup table 4111 for an image generation server with status "OK", and returns that information to the load distribution control unit. In the example of the distribution setup table shown in FIG. 17, image generation servers with indices 1 to 3 have status "OK", but in this embodiment, information of an image generation server with index 1 in the first field 4004 is sent back to the load distribution control unit. If the distribution setup table includes a load coefficient item, information of an image generation server with status "OK" and the smallest load coefficient is returned.

In step S4205, it is determined that the process request is to be submitted to the image generation server determined in step S4204. The process request is submitted to that image generation server and the control waits for the end of the process in that server in step S4206.

Upon completion of the process by the image generation server, the processing result is checked in step S4207. If the process requested in step S4206 has not normally terminated, the notification unit 4107 of that image generation server notifies the load distribution control unit 902 of an abnormal termination message. In case of abnormal termination, the load distribution control unit 902 informs the supervisor unit 4104 of the address or index of the image generation server that has abnormally terminated the process. In step S4208, the supervisor unit 4104 sets "NG", indicating that the corresponding server cannot be used, in the status field of the corresponding image generation server in the distribution setup table 4111.

The flow returns to step S4203, and the server inquires of the supervisor 4104 as to an image generation server that can process the request. In this case, since the status of the image generation server that had abnormally terminated the process has changed to "NG" in step S4208, another image generation server is selected. After that, the same processes are repeated until a normal termination result is obtained.

If the process requested in step S4206 terminates normally, the image generation process result (or print end message) is received from the image generation server and the process ends. Alternatively, the load distribution control unit 902 may inform the supervisor unit 4104 of normal termination of the process. Also, the result of the process requested in step S4206 may be directly supplied from the notification unit 4107 to the supervisor unit 4104.

Upon completion of the process in this way, the Web server sends the processing result or the process end message received from the image generation server to the client that has requested the process. In this case, when the substitution process is done, a message indicating this may be sent to the client.

As described above, when the process terminates abnormally, since that process is done by another image generation server, a more stable system can be built.

Since the status in the distribution setup table corresponding to the image generation server that had abnormally terminated the process changes to "NG", that server is not used in subsequent processes and does not disrupt the processes.

(Recovery Process)

The process sequence executed when the image generation server with status "NG" in the distribution setup table due to some trouble or the like becomes ready to use again will be described below with reference to the flow chart shown in FIG. 19.

Figure 19:
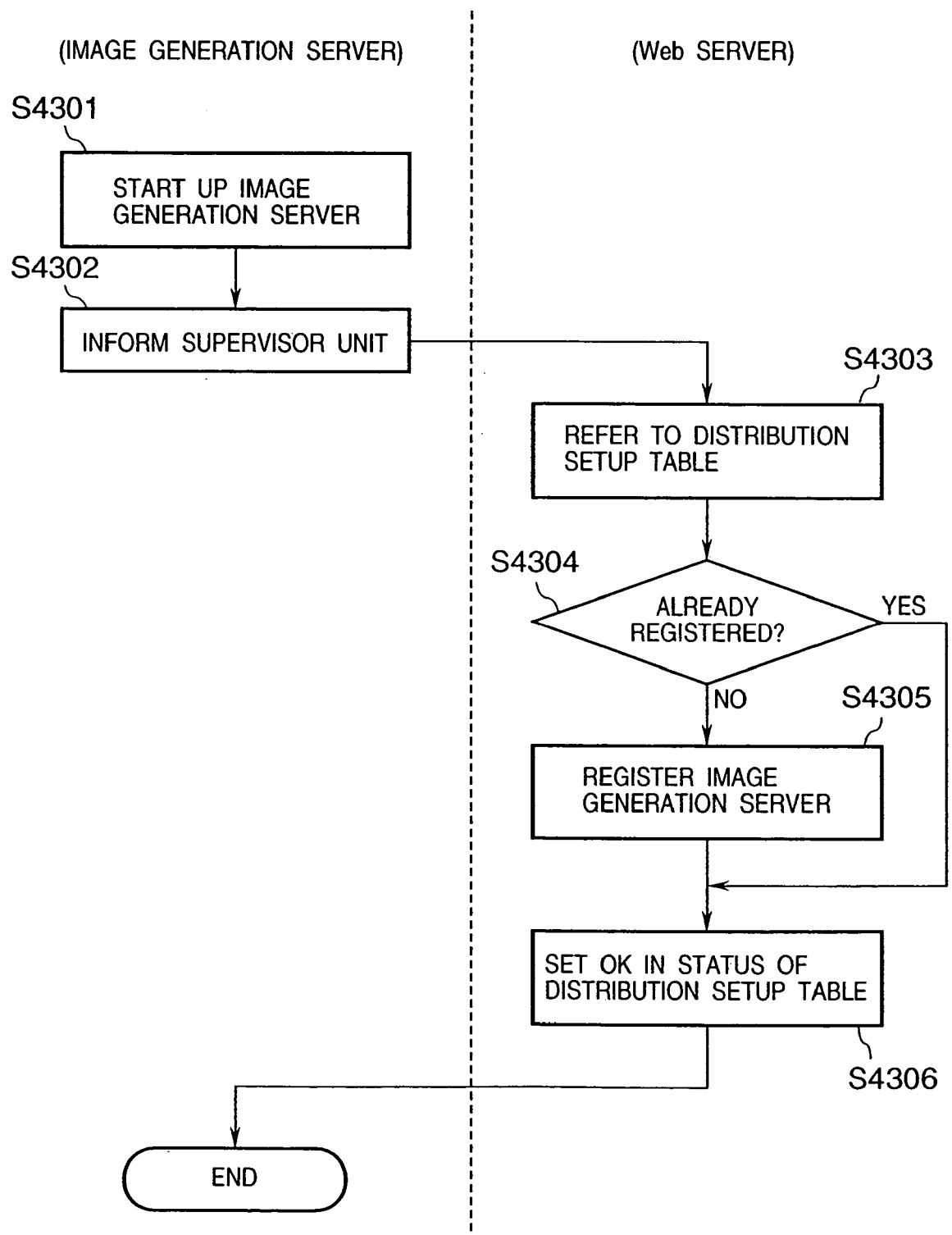
FIG. 19 is a flow chart showing the sequence for changing status of an image generation server, which becomes ready to use, to "OK" in the third embodiment.

FIG. 19 also shows the processes done by the image generation server on the left side and those done by the Web server on the right side to help easy understanding of the locations of the processes.

The following process is executed when the image generation server, which could not be used due to some trouble or the like, becomes ready to use again, i.e., when such image generation server recovers from the trouble and is restarted, so that the Web server can use that image generation server again.

In step S4301, assume that an image generation server which could not be used or was kept OFF becomes ready to use. An image generation server becomes ready to use when it is restarted after a trouble, is newly started, or recovers from a trouble without any restart.

The image generation server which is ready to use informs the supervisor 4104 of that status message in step S4302.

In step S4303, the supervisor unit 4104 searches the distribution setup table 4111 for the image generation server as the source of the message received in step S4102.

It is checked as a result of search in step S4303 if the corresponding image generation server has already been registered. If no match is found, it is determined that the image generation server is to be newly registered, and that server is registered in the distribution setup table 4111 in step S4305. On the other hand, if the server has already been registered, the control skips the registration process in step S4305.

In step S4306, status of the corresponding image generation server in the distribution setup table is changed to "OK". For a newly registered image generation server, "OK" is simply set. But when the image generation server corresponding to index 4 in the distribution setup table 4111 shown in FIG. 17 is ready to use, status "NG" in the status field 4007 is changed to "OK".

As described above, according to this embodiment, an image generation server which has caused an error during processing is removed from a list of useable image generation servers by rewriting its status in the distribution setup table to "NG". When that server is restarted, its status in the distribution setup table is rewritten from "NG" to "OK", and the server can be used in subsequent processes.

For this reason, use of an image generation server is automatically stopped/restarted even when the operator does not disconnect an image generation server that cannot be used from the network print system or re-connect the recovered image generation server. For this reason, the image generation servers can be efficiently used, and the distribution process efficiency can be improved.

Even when a certain image generation server terminates abnormally, since the process can be done using another substitute, image generation server, a system with higher stability can be provided.

[Fourth Embodiment]

A network print system according to the fourth embodiment of the present invention will be described below. In the system according to this embodiment, a plurality of printers are connected to a client, and when the user of a Web browser designates a form print process at the client, the client selects an appropriate printer.

Figure 20:
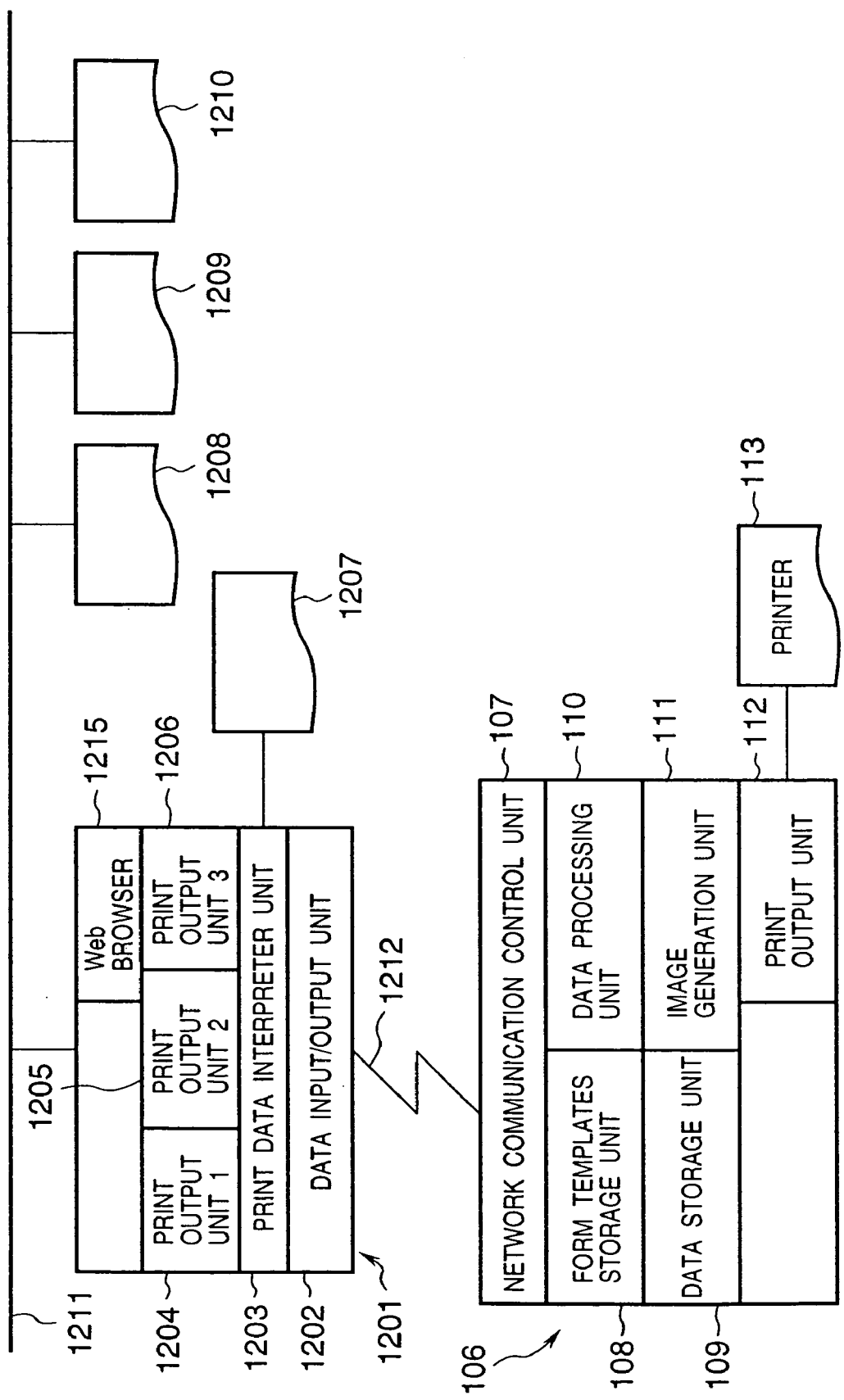
FIG. 20 is a block diagram of a network print system according to the fourth embodiment of the present invention.

FIG. 20 is a block diagram showing the arrangement of the network print system according to this embodiment. In this system, a plurality of printers are connected to a client on which a browser is running.

Referring to FIG. 20, a client 1201 is a computer on which a Web browser is running, as in the clients of the aforementioned embodiments. A data input/output unit 1202 performs data communications with a server 1213. A Web browser 1215 can be the same as the Web browser 114 in the first embodiment. A print data interpreter unit 1203 interprets print data sent to the client. First to third print output units 1204, 1205, and 1206 convert print data into an actual print image, and send data to printers. Printers 1207 to 1210 are connected to the client 1201 directly or via a network 1211. The network 1211 connects the client and printers.

A network 1212 connects the client 1201 and the server 106 as in the network 105 shown in FIG. 1. Since the server 106 is a Web server having the same arrangement as that of the first embodiment shown in FIG. 1, the same reference numerals denote the same parts and a repetitive description thereof will be avoided. More specifically, the system arrangement of this embodiment is substantially the same as that of the first embodiment shown in FIG. 1, except that a plurality of printers are connected to the client. For this purpose, the client has a plurality of print output units 1204 to 1206 corresponding to the printers.

Normally, when a print process of form data at the client is instructed from the Web browser, an image generation unit 111 merges a form template and data to be combined with that template, a print output unit 112 generates a print data file according to the page description language (PDL) format on the basis of the merged data, and that print data file (or its URL) is submitted to the client.

The submitted PDL file is output to the printer via one of the print output unit 1204 to 1206 of the client 1201. At this time, the format of PDL data generated by the print output unit 112 of the server must match that of PDL data that the printer connected to the client can interpret. However, PDL includes many types, and subject to change and update at times. For this reason, the format which can be generated by the image generation unit 112 does not often match the format which can be interpreted by the printer connected to the client. Hence, this embodiment is characterized in that the print data interpreter unit 1203 of the printer has a mechanism for selecting a print output unit, i.e., a printer to select a printer which can interpret PDL data in a best possible condition.

Figure 21:
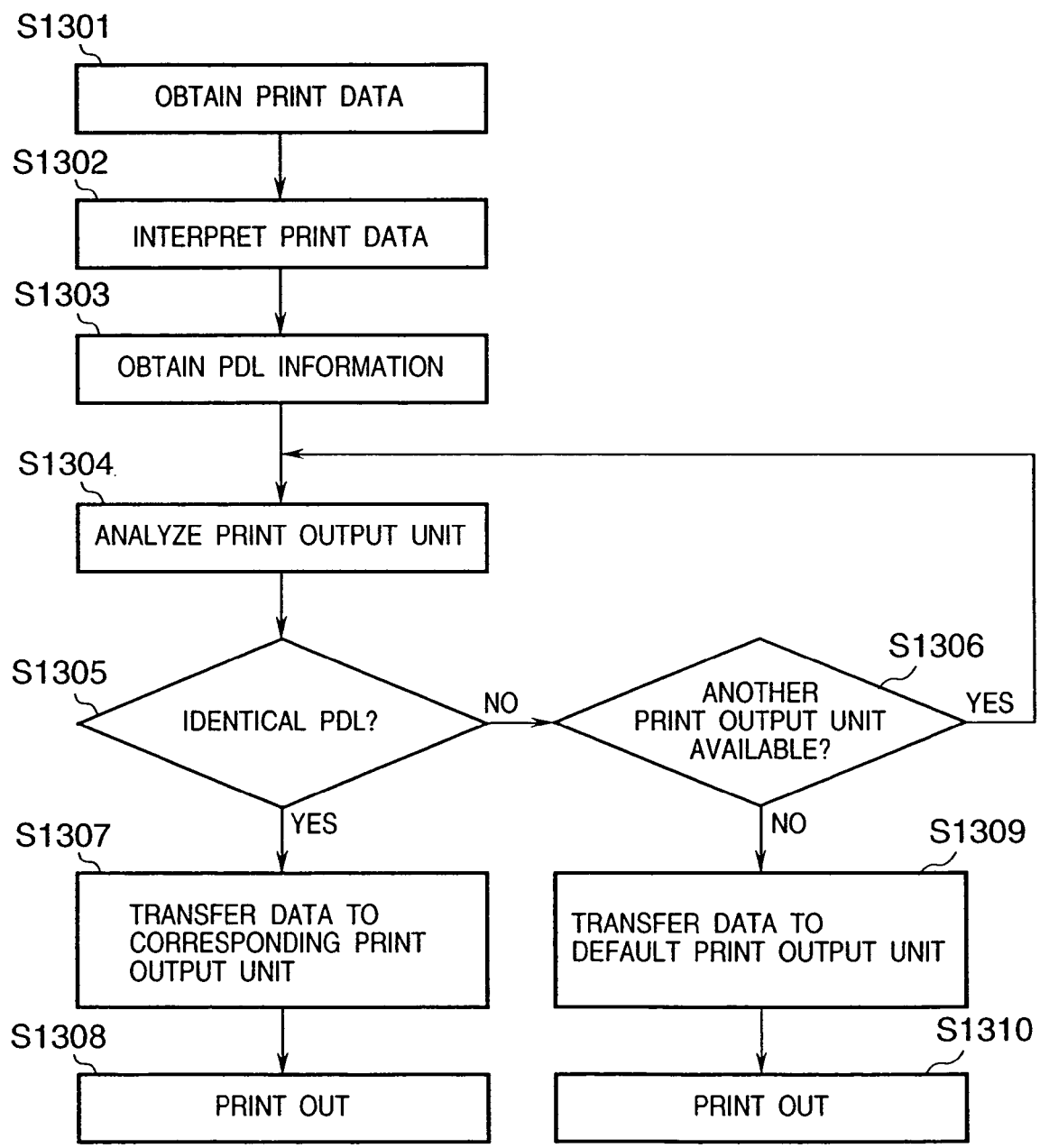
FIG. 21 is a flow chart showing the sequence for selecting a printer that is suitable for printing received data in a client of the fourth embodiment.

The operation of the print data interpreter unit 1203 of this embodiment will be described below using the flow chart shown in FIG. 21.

In step S1301, a print data file transferred from the server 106 is received. Since a PDL name and version are written in the header field of that printer data file, the header information is interpreted in step S1302, and the PDL name and version are held in step S1303.

In step S1304, information of clients of the print data interpreter unit 1203, i.e., information of a plurality of printers connected thereto is analyzed. That is, the print output units 1204 to 1206 as printer drivers are analyzed. It is checked in step S1305 if a given print output unit analyzed in step S1304 is compatible to the received print data, strictly speaking, if they match in the strict sense. If YES in step S1305, the print data is sent to that print output unit (step S1307). In this case, an accurate output result can be obtained from the printer corresponding to the selected print output unit (step S1308).

If it is determined in step S1305 that the print data does not match the print output unit, another print output unit is analyzed. If it is determined in step S1306 that all the print output units have been analyzed, the data is transferred to a predetermined default print output unit (step S1309) and is printed out from the default printer (step S1310). In this case, since the PDL of the print output unit does not match the PDL which described the print data file, it is not guaranteed that a desired output can be accurately obtained. In some cases, data cannot be printed out due to PDL mismatches.

As described above, in this embodiment, when a plurality of printers are connected to the client, a printer which can accurately interpret print data received from the server is automatically selected to obtain an accurate output result.

[Fifth Embodiment]

A network print system according to the fifth embodiment of the present invention will be described below with reference to FIG. 22. This embodiment is characterized in that a plurality of Web servers are connected to a network.

Figure 22:
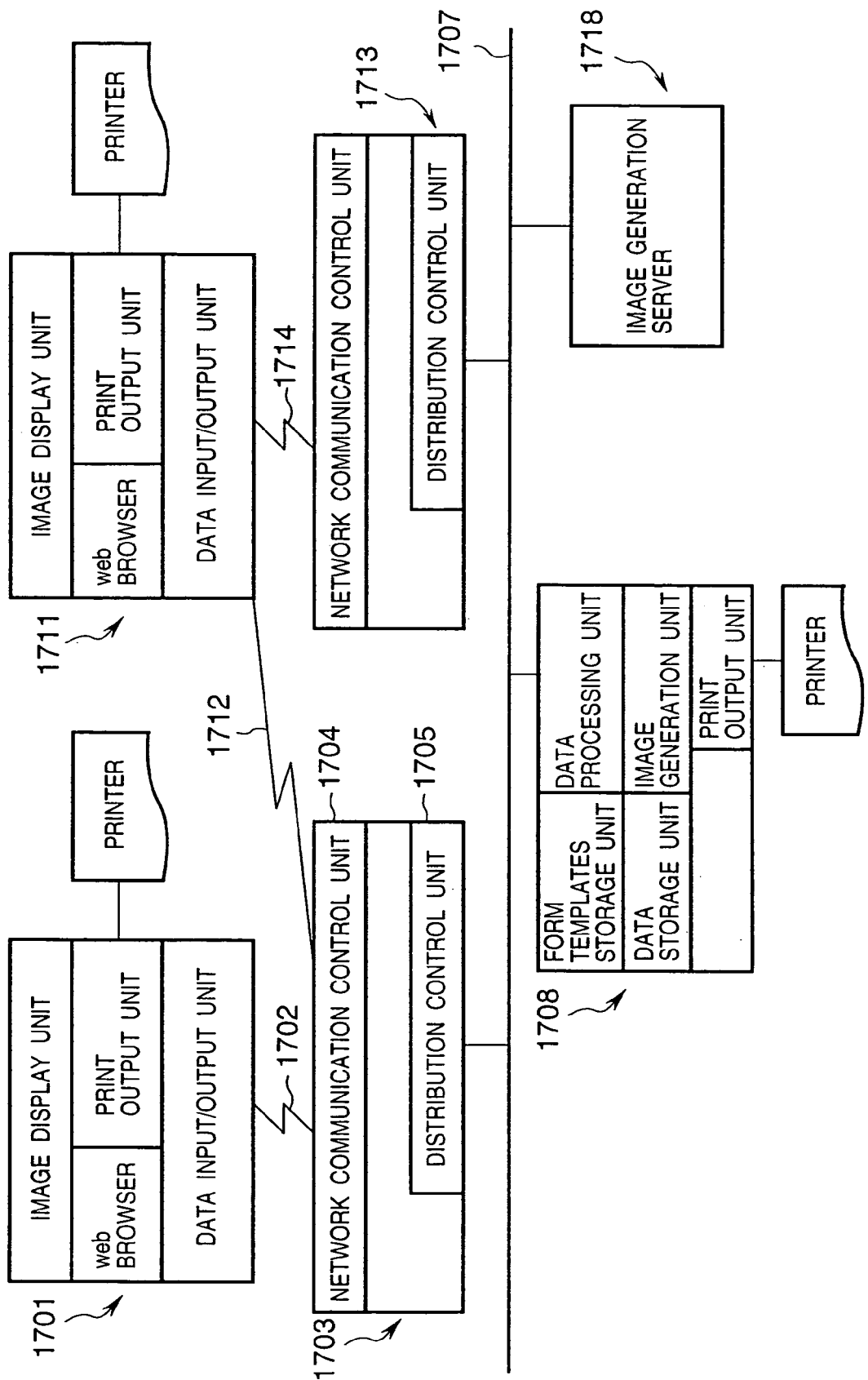
FIG. 22 is a block diagram of a network print system according to the fifth embodiment of the present invention.

FIG. 22 shows the arrangement of a network print system according to this embodiment. The individual building components of the system are the same as those which have been explained in the first or second embodiment. More specifically, clients 1701 and 1711 have the same arrangement as that of the client 101 shown in FIGS. 1 and 9, and Web servers 1703 and 1713 have the same arrangement as that of the Web server 901 shown in FIG. 9. Also, image generation servers 1708 and 1718 are the same as the image generation servers 908 and 909 shown in FIG. 9.

In the system shown in FIG. 22, when the user instructs a print process of displayed form data at the client, the image generation server merges the displayed data with a corresponding form template, and the server or client can print the merged data as in the first embodiment. Hence, the arrangement shown in FIG. 22 is substantially the same as that in FIG. 9, except that a plurality of clients and Web servers are connected.

Referring to FIG. 22, the client 1701 is connected to the Web server 1703 via a network 1702. The Web server 1703 is connected to the image generation servers 1708 and 1718. Each image generation server generates print data or HTML document data for display in accordance with a request received from the Web server, and sends it back to the source Web server (in case of a print request, the server prints it out, and sends back an end message). That data is sent back to the source client 1701 via the network 1702 again.

Likewise, the client 1711 is connected to the Web server 1703 via a network 1712, and can submit a process request thereto. In this case, the Web server 1703 performs the same processes as those upon receiving the process request from the client 1701.

In this manner, the Web server can receive process requests from a plurality of clients, and can process them. However, when the number of clients connected increases, and the server must process their requests parallelly, the processing speed lowers.

Hence, the client 1711 is also connected to the Web server 1713 via a network 1714 to use the resources of the Web server 1713, thus reducing the load on the Web server 1703.

When the networks 1702, 1712, and 1714 are connected via a telephone network or the like, they can be switched by only switching the destination Web server. In other words, the user need only switch and designate the URL of the Web server to be connected from the Web browser at the client.

In this manner, in the system of this embodiment, a plurality of image generation servers 1708 and 1718 can be commonly used from a plurality of Web servers 1703 and 1713.

If only one image generation server is available, both the Web servers 1703 and 1713 submit image generation requests to that image generation server. For this reason, no scheduling is required. However, when a plurality of image generation servers are connected to a plurality of Web servers, as shown in FIG. 22, a sequence for determining which image generation server is used by a given Web server is required. As such sequence, the following examples may be used.

(1) Correspondence between the Web servers and image generation servers is determined in advance. In this case, if a plurality of image servers are assigned to one Web server, the image generation server used is determined by the method described in the second embodiment or its modification.

(2) The distribution setup table shown in FIG. 11 or 13 is shared by the Web servers to manage the image generation servers. For this purpose, every time the contents of the distribution setup table are updated in step S1005 in FIG. 10 or in steps S1504 and S1506 in FIG. 14 and in step S1604 in FIG. 14, each Web server must send the updated table contents to other Web servers.

As described above, according to this embodiment, since a plurality of Web servers are prepared, a network print system that can reduce the load on each Web server and can improve the processing efficiency as a whole can be implemented.

[Sixth Embodiment]

Figure 23:
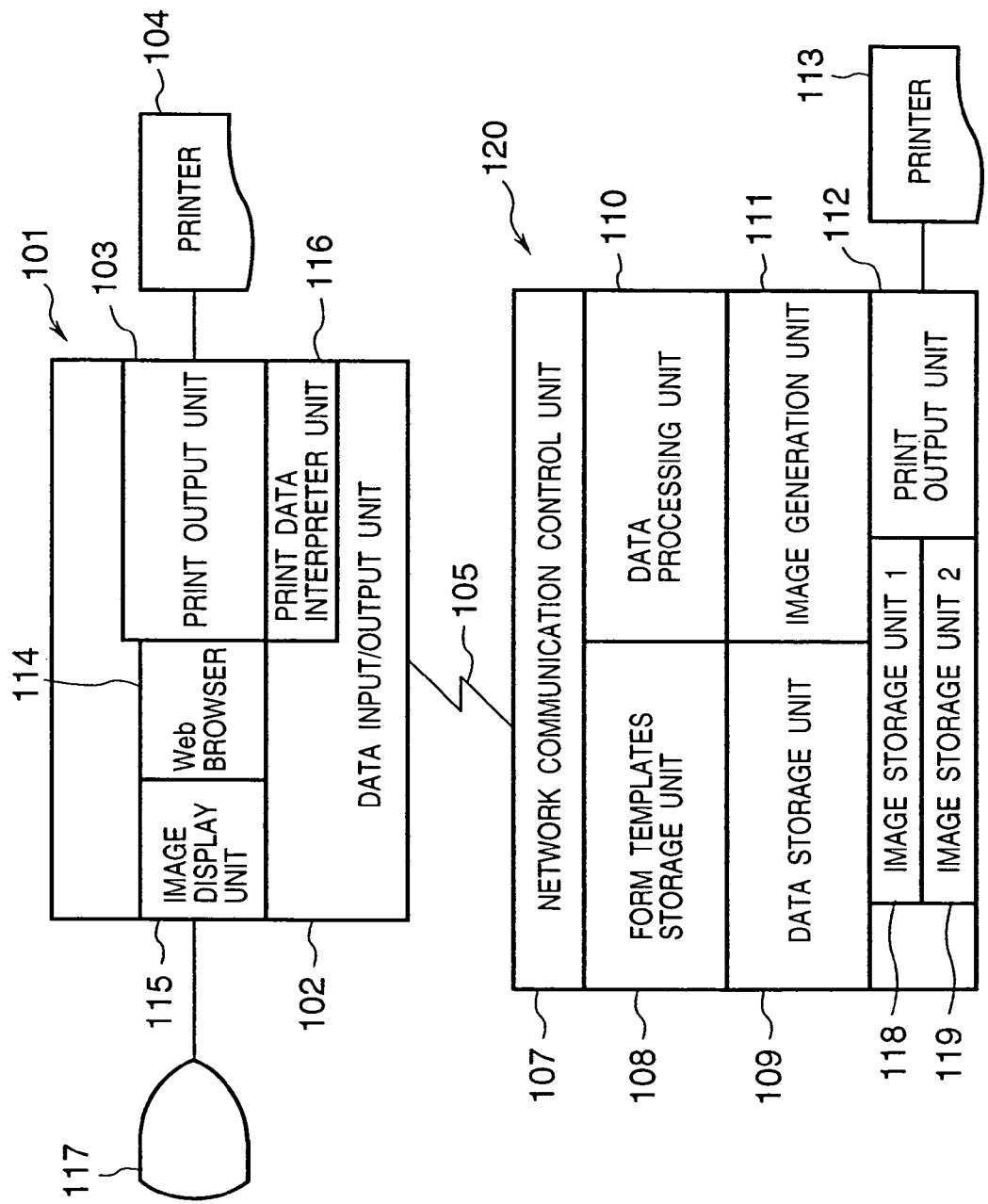
FIG. 23 is a block diagram of a network print system according to the sixth embodiment of the present invention.

The sixth embodiment of the present invention will be described below. FIG. 23 is a software block diagram of a network print system according to this embodiment, and shows one each of a server and client. As can be seen from comparison between FIG. 23, and FIG. 1 that has been explained in the first embodiment, the system according to this embodiment has substantially the same arrangement as that of the system according to the first embodiment, except that a Web server 120 has image storage units 118 and 119. For this reason, a description of the already explained arrangement will be omitted.

The image storage units 118 and 119 of the server 120 are implemented by devices for storing image data such as hard disk devices. The image storage unit 118 is not open to the client 101, and is an area the client cannot access. By contrast, the image storage unit 119 is open to the client, and the client can access a file included in the image storage unit 119 by designating its URL.

<Display Request Process>

Prior to the description of the process of this embodiment, a conventional process executed upon pressing the display button 208 on the window (FIG. 2) of the Web browser 114 which has been explained in the first embodiment will be explained.

Figure 24:
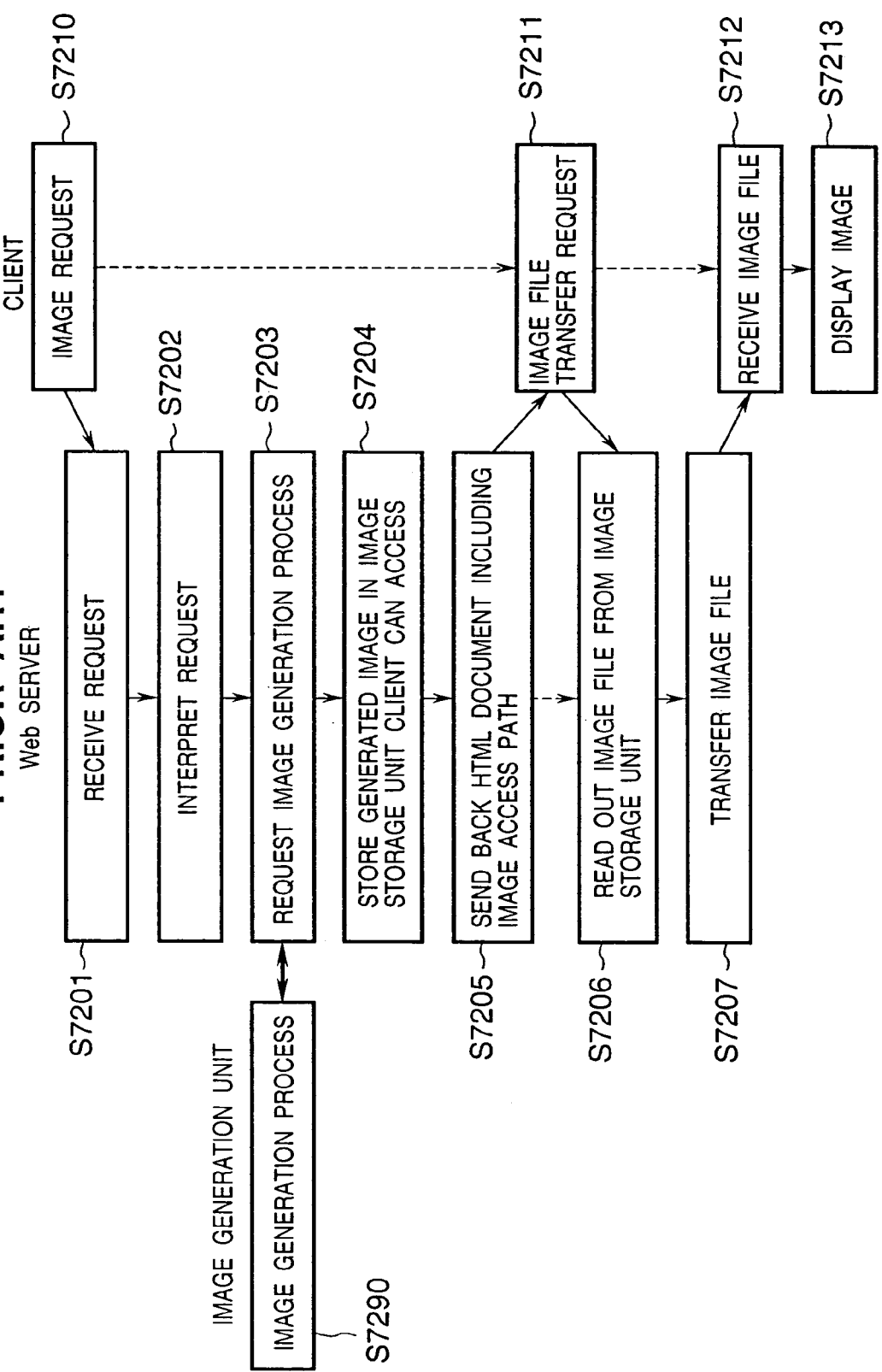
FIG. 24 is a flow chart showing the image generation sequence by a server and client in the prior art.

FIG. 24 is a flow chart showing the processing sequence of the server and client upon display by the conventional method. In the conventional process, the generated image file to be returned to the client is placed in the image storage unit 119 the client can access.

Referring to FIG. 24, the client 101 sends an image request including information that pertains to an image to be displayed to the Web server 120 via the network communication control unit 107 (step S7201).

The Web server interprets the request contents and starts a process (step S7202). The Web server 120 requests a required image generation process of the image generation unit 111 (step S7203). The image generation unit 111 executes an image generation process based on the request (step S7290). A generated image as the result of the process is sent to the Web server, and is stored in the image storage unit 119 in the Web server that the client can access (step S7204).

Note that the image generation unit 111 may be implemented by an independent computer (image generation server) which is connected to the server main body to be able to communicate therewith, and has a function of an image generation unit, as has been explained in other embodiments. In this case, step S7290 is executed by that image generation server.

The Web server 120 returns a data block (HTML document) 7219 having a structure shown in FIG. 25 to the client 101 via the network communication control unit 107 (step S7205). This data block consists of a header field 7220 and content field 7230. The header field 7220 describes a content type indicating that an HTML document is stored in the content field 7230. The HTML document in the content field is embedded with a path (/InetPub/wwwroot/img_dir/tem03.pdf) used to access the image file generated in response to the request from the client 101.

Upon receiving the data block 7219, the client 101 detects the embedded path to the image file, and submits an image file transfer request corresponding to that path to the Web server 120 (step S7211). Upon receiving the image file transfer request, the Web server reads out the image file from the image storage unit 119 (step S7206), and transfers it as a data block 7239 shown in FIG. 26 to the client 101 (step S7207).

The data block 7239 consists of a header field 7240 and content field 7250. The header field 7240 describes a content type indicating that image data is stored in the content field 7250. The content field 7250 stores the contents of the generated image file. The client 101 receives the data block 7239 (step S7212), and displays the received image on the window of the Web browser 114 (step S7213).

By contrast, in the system according to this embodiment, the Web server stores the generated image in the image storage unit 118 the client cannot access, thus assuring security of the image file as the generation result. The display process in this embodiment will be described below with reference to the flow chart shown in FIG. 27.

The client 101 sends an image request including information that pertains to an image to be displayed to the Web server 120 via the network communication control unit 107 (step S7301).

The Web server interprets the request contents and starts a process (step S7302). The Web server 120 requests a required image generation process of the image generation unit 111 (step S7303). The image generation unit 111 executes an image generation process based on the request (step S7390). A generated image as the result of the process is sent to the Web server, and is stored in the image storage unit 118 in the Web server that the client cannot access (step S7304).

The reason why the image file is temporarily stored in the image storage unit 118 is not only to prevent clients other than the client 101 that issued the request from accessing the image file as the generation result, but also to achieve high-speed processes by transferring the image file already stored in the image storage unit 118 to the client 101 without requesting an identical image generation process of the image generation unit 111 when the identical user submits an identical image request at the client 101.

In other words, for the sake of security in the conventional processing method, an image, generated and stored in the image storage unit 119 in response to a transmission request of the image by a user, must be deleted soon after the image is read out from the image storage unit 119 and transmitted so as to prevent the image from being read by another user by chance.

Therefore, if the former user requests to generate the same image, the image generating process is repeated.

In contrast, in the configuration of this embodiment, since the generated image is stored in the image storage unit 118, it is unnecessary to delete the generated image. Accordingly, when the user requests transmission of the same image once again, the stored image is to be only transmitted and generation of the image is not required.

Figure 26:
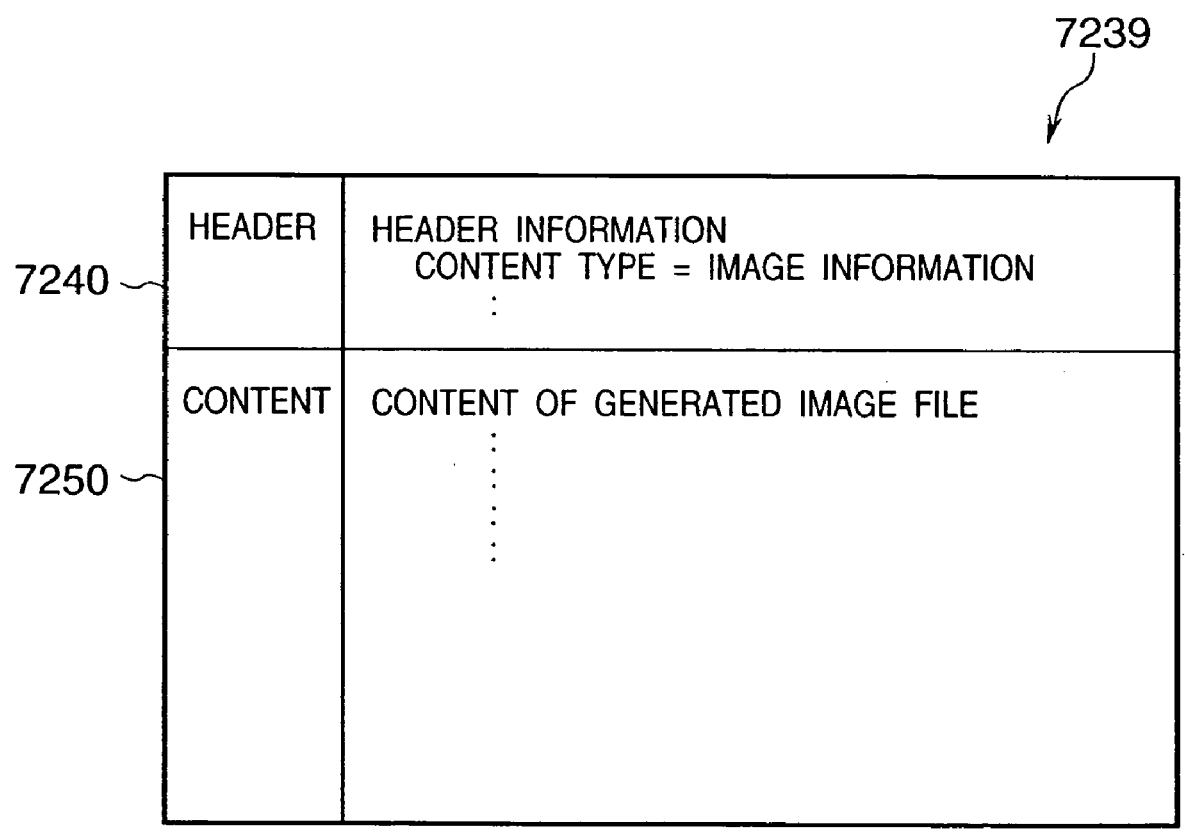
FIG. 26 is a data block diagram for sending image data from a client to a server according to the present invention.

Furthermore, the Web server 120 returns the data block 7239 with the structure shown in FIG. 26 to the client 101 via the network communication control unit 107 (step S7305). As described above, the data block 7239 consists of the header field 7240 and content field 7250, and the header field 7240 describes the content type indicating that image data is stored in the content field 7250. The content field 7250 stores the contents of the generated image file.

In this embodiment, since the image file as the generation result is stored in the image storage unit 118 that the client cannot access, the Web server cannot send a file path to the client unlike the aforementioned prior art. Hence, upon completion of file generation, the Web server directly sends an image file to the client.

Upon receiving the data block 7239 (step S7312), the client 101 displays an image on the browser window on the basis of the image file embedded in this data block (step S7313).

As described above, according to this embodiment, an image file generated in response to a client request is stored in an area the client cannot access, and that image file is sent to only the client which issued the generation image of that image. In this manner, an image file can be reliably sent to the client which requested image generation without opening a directory which stores an image to unspecified clients.

The Web browser of the client can always display an image received from the server without caching received image data, since it does not refer to any URL.

[Seventh Embodiment]

A display process in a network print system according to the seventh embodiment of the present invention will be described below using the flow chart shown in FIG. 28.

Figure 27:
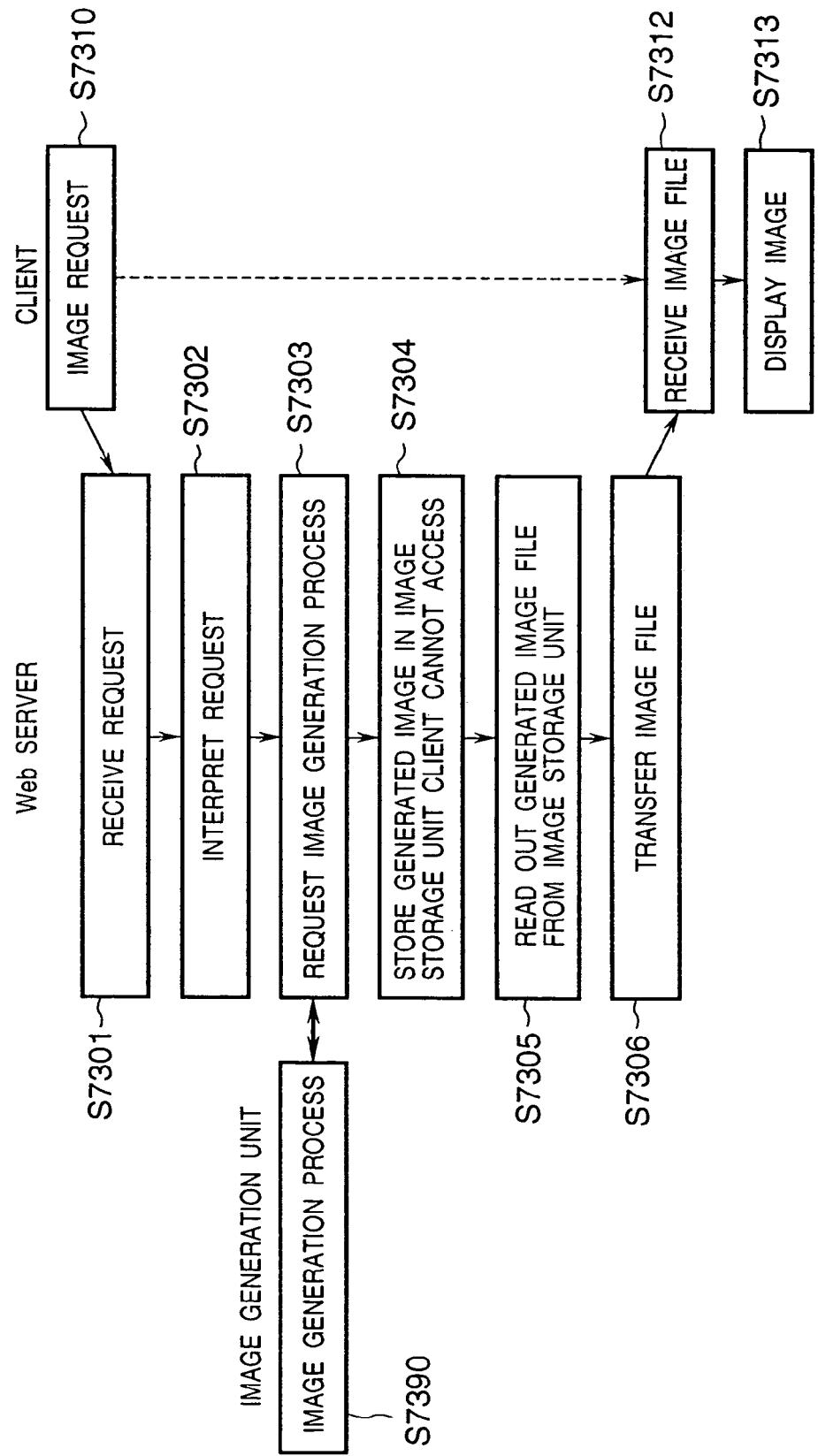
FIG. 27 is a flow chart showing the image generation sequence by a server and client in the sixth embodiment.
Figure 28:
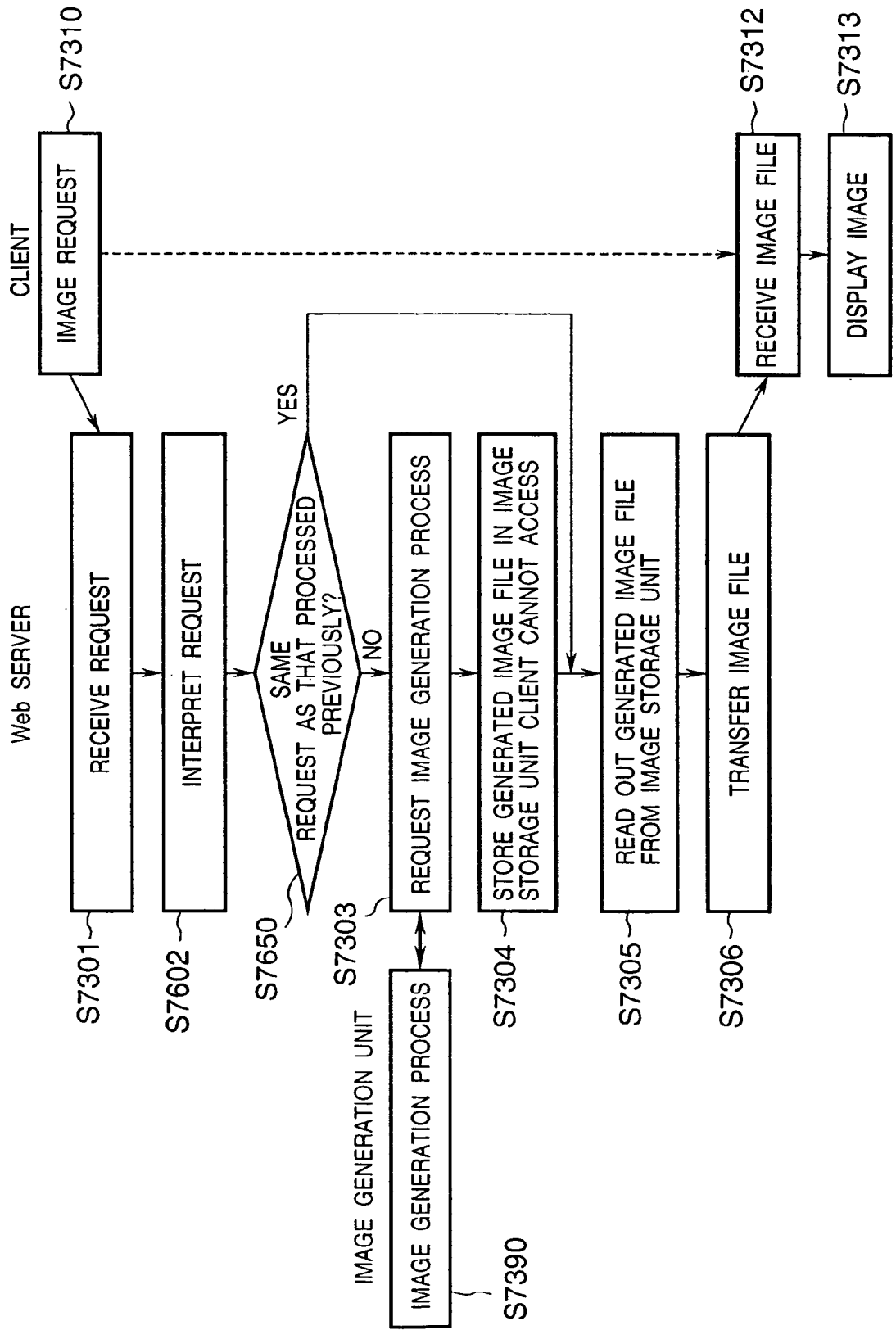
FIG. 28 is a flow chart showing the image generation sequence by a server and client according to the seventh embodiment of the present invention.

The same step numbers in FIG. 28 denote the same processes as those in FIG. 27, and a detailed description thereof will be omitted. In the seventh embodiment, the operations in the following steps are modified compared to the sixth embodiment.

In the request interpreting step (step S7602), a user session is detected from an image request from the client. It is determined if the requested image has already been generated in an identical user session by checking an entry stored in a session/image generation job correspondence table storage unit. The session/image generation job correspondence table storage unit stores sessions whose processes are underway and/or are complete in correspondence with the processing contents requested in those sessions and processing results, i.e., the storage locations of generated image files or the like. The session/image generation job correspondence table storage unit is not shown in FIG. 23, but is also included in the Web server 120 shown in FIG. 23 like FIG. 30 that will be described later.

If it is determined in the conditional determination step (step S7650) that the same image as that of the previously executed image generation job is requested, the generated image file that has already been stored in the image storage unit 118 is read out (step S7305). Note that it is determined in step S7650 that the same image as that of the previous request is requested when the session ID and the request contents (e.g., an image generation instruction and parameters) from the client match previously received ones.

The Web server stores the image file read out from the image storage unit 118 in the data block with the structure shown in FIG. 26 as in the process in the sixth embodiment, and sends it to the client (step S7305).

On the other hand, if a new image generation job is determined in the conditional determination step (step S7650), the same processes as those in the sixth embodiment are done in step S7304 and the subsequent steps.

As described above, according to this embodiment, since the processing result is sent to only the source client, it can be prevented from being accessed by other clients. Also, upon receiving the same request as that which has already been processed from the client, the result generated in the previous process is returned. Hence, since the server need not repeat an identical process, resources for that process can be saved, and high-speed processing can be realized.

[Eighth Embodiment]

A display process in a network print system according to the eighth embodiment of the present invention will be described below using the flow chart shown in FIG. 29.

In the sixth and seventh embodiments, the image file as the processing result is forcibly stored in the image storage unit 118 the client cannot access. This embodiment is characterized in that the client can select which of the conventional method and the method of the present invention is to be used. More specifically, the client can select whether an image file is sent back immediately after the end of an image generation process (to be referred to as "content delivery" hereinafter) or a path to the image file is sent back.

Figure 29:
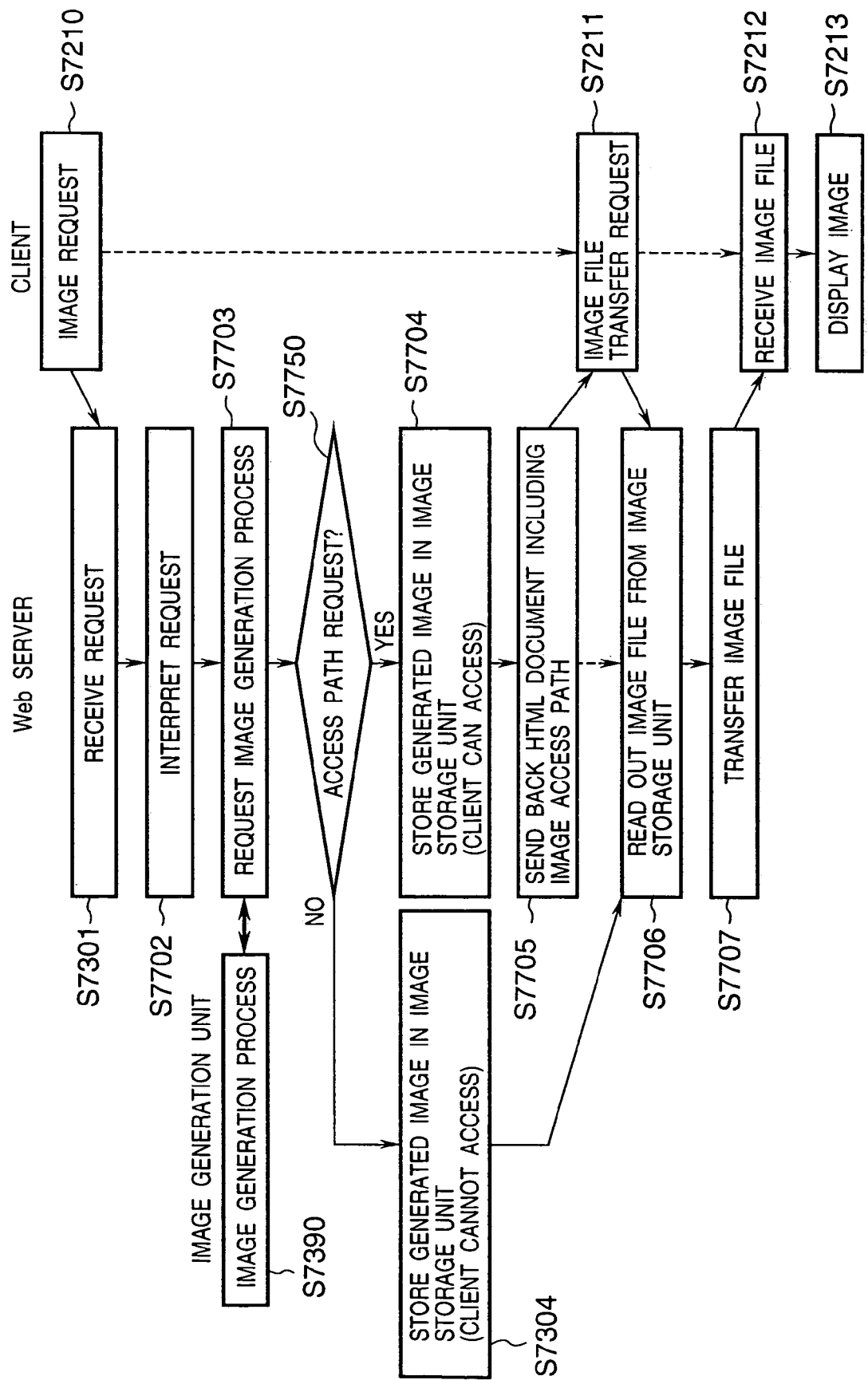
FIG. 29 is a flow chart showing the image generation sequence by a server and client according to the eighth embodiment of the present invention.

The same step numbers in FIG. 29 denote the same processes of the Web server as those in FIG. 27, and a detailed description thereof will be omitted. Also, since the processes at the client are the same as those of the conventional method shown in FIG. 24, a detailed description thereof will be omitted. In the eighth embodiment, the operations in the following steps are modified compared to the sixth embodiment.

In the request interpreting step (step S7702), it is determined based on an image generation request from the client 101 which of the content delivery method and image file path delivery method is required. After an image generation process (steps S7703 and S7390), the reply method determined in step S7702 is checked (step S7750).

If the content delivery method is selected, the flow advances to step S7705 to store the generated image file in the image storage unit 118 the client 101 cannot access. After that, the Web server 120 stores that image file in the content field of the data block 7239 with the structure shown in FIG. 26, and sends it back to the client (steps S7706 and S7707).

On the other hand, if it is determined in step S7750 that the image file path delivery method is selected, the flow advances to step S7704 to store the generated image file in the image storage unit 119 the client 101 can access. After that, the Web server 120 sends back to the client 101 the data block 7219 shown in FIG. 25, which has an HTML document including the path to this image data in its content field (step S7705).

Upon receiving the data block 7219, the client submits a file transfer request to the Web server 120 using the path contained in the content field (step S7211), and the Web server 120 reads out and transfers the corresponding file from the image storage unit 119 (steps S7706 and S7707), as has been explained above with reference to FIG. 24. The client displays the received image file on the window of the browser 114 (step S7213).

As described above, according to this embodiment, since the reply method is designated by the client request, the client can designate the image file delivery method and whether access to an image file from a specific client is possible or impossible can be set.

[Ninth Embodiment]

Figure 30:
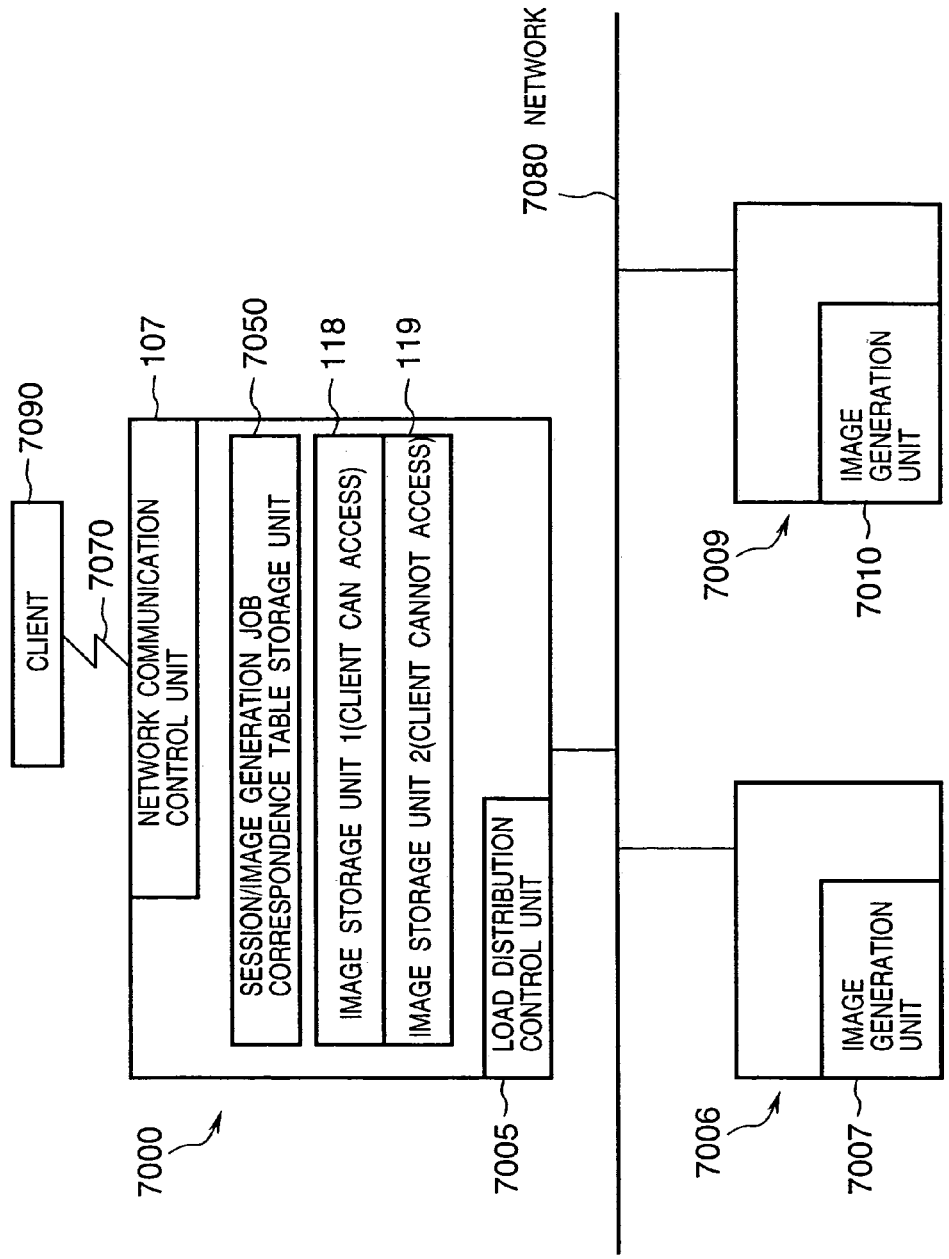
FIG. 30 is a block diagram showing the system arrangement according to the ninth embodiment of the present invention.

FIG. 30 is a block diagram showing the arrangement used when processes are distributed by locating an image generation process on computers different from a Web server as in the second embodiment shown in FIG. 9, in the network print system according to the sixth to eighth embodiments.

Referring to FIG. 30, a client 7090 has the same arrangement as that of the client 101 shown in FIG. 23. A Web server 7000 has substantially the same arrangement as that of the Web server 120 shown in FIG. 23 except that it has a load distribution control unit 7005 and does not have any image generation unit.

Image generation servers 7006 and 7009 have the same arrangement, and are the same computers as the Web server 7000 and a client 7090. Image generation units 7007 and 7010 having a function equivalent to that of the image generation unit 111 of the Web server 120 are provided to the image generation servers 7006 and 7009. The image generation servers 7006 and 7009 and the Web server 7000 are connected to be able to communicate with each other via a network 7080.

The load distribution control unit 7005 that attains load distribution of the image generation units and the like distributes the image generation process loads to the image generation servers 7006 and 7009 by a round robin method, a method of counting coefficients that indicate the loads on the individual image generation units, or the like.

In the arrangement shown in FIG. 30, the image generation units are simply independently connected as image generation servers, and upon using the image generation units, an image generation process request and generated image data must be sent/received via the network 7080 unlike in the sixth to eighth embodiments. But the control sequence itself of the Web server and client can be the same as those described in FIGS. 27, 28, and 29.

[First Modification of Ninth Embodiment]

Figure 31:
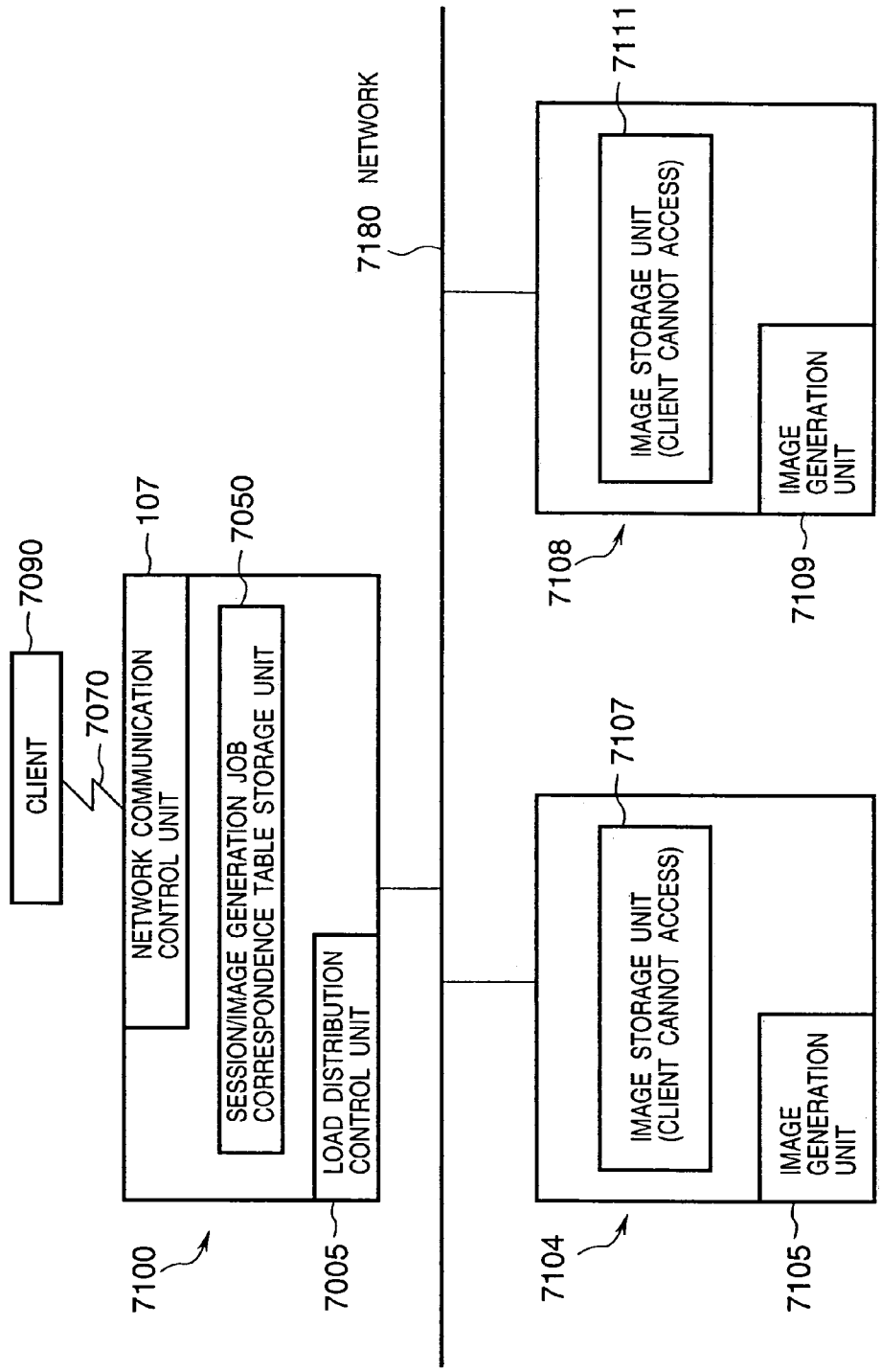
FIG. 31 is a block diagram showing the system arrangement according to the ninth embodiment of the present invention.

FIG. 31 shows a system having an arrangement in which not only the image generation unit but also an image storage unit (which cannot be accessed from the client) for storing generated image data are provided to the image generation server in the arrangement shown in FIG. 30.

In this system, an image file is stored in an image storage unit 7107 or 7111 of an image generation server 7104 or 7108 in place of that in the image server 120. In this modification, since these image storage units are invisible from the client 7090, the display process described in the sixth or seventh embodiment (the processing sequence shown in FIG. 27 or 28) can be implemented by this arrangement.

In this case, upon completion of the process in the image generation unit, the image generation unit stores a file in the image storage unit included in the identical image generation server, and then sends a process end message and storage location message of an image file as the processing result to the Web server.

[10th Embodiment]

A network print system according to the 10th embodiment of the present invention will be described below. This embodiment relates to a system that can improve secrecy of communications by providing to the client a means for encrypting an image file and print data file sent from a Web server to a client to the Web server, and a means for decrypting an encrypted file.

In this embodiment, the Web server has an arrangement shown in, e.g., FIG. 1, and can send to the client image data or print data, which is generated by the image generation unit 111 and encrypted by a predetermined method, by adding a file encryption function to the data processing unit 110.

An encryption method and its implementation method are arbitrary, and those normally used in the communication fields can be applied.

Figure 32:
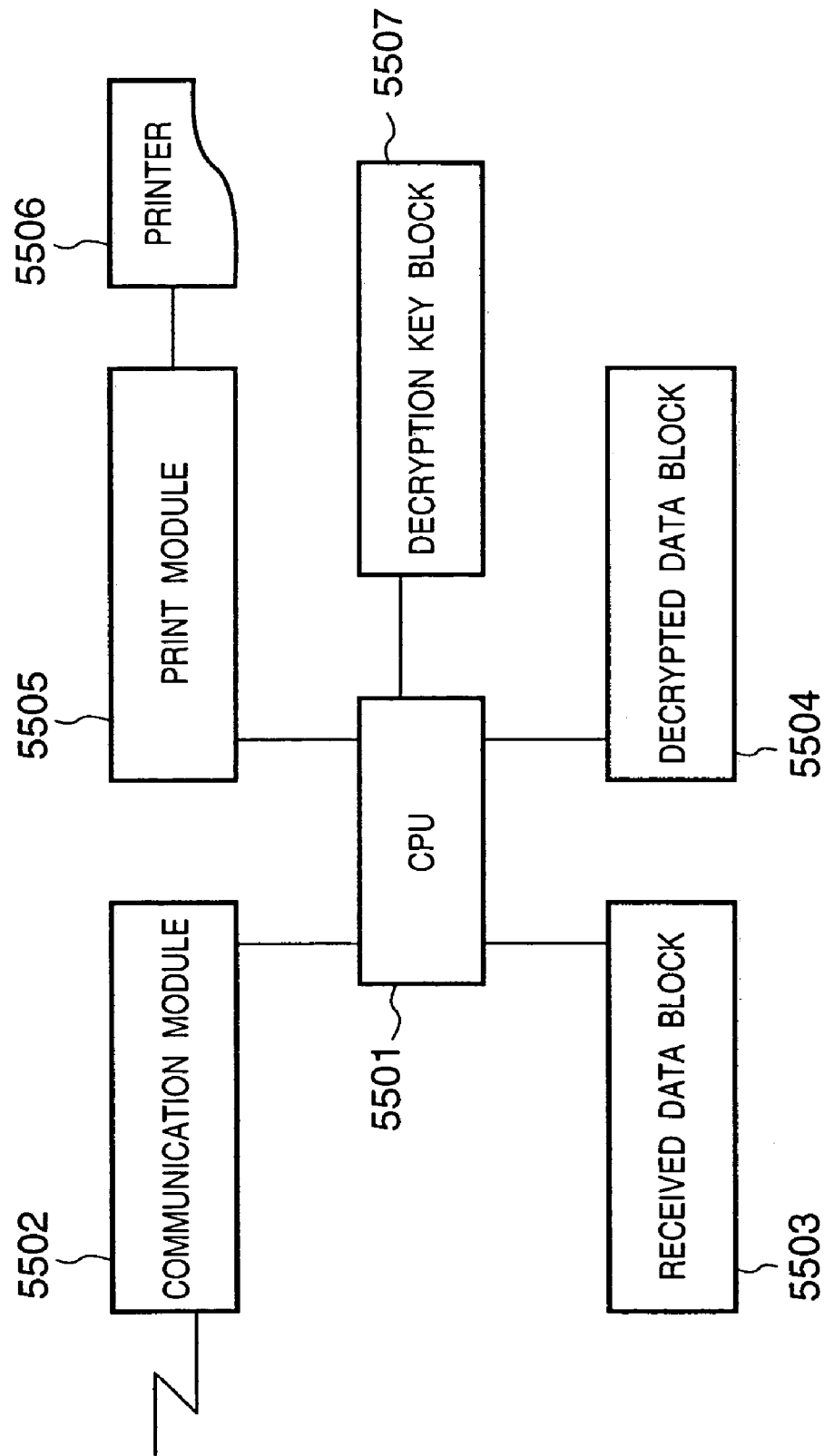
FIG. 32 is a block diagram of a client according to the 10th embodiment of the present invention.

FIG. 32 is a block diagram showing the arrangement of a client in this embodiment. Referring to FIG. 32, reference numeral 5501 denotes a CPU which implements a decryption process of an encrypted file (to be described later) by executing a program.

Reference numeral 5502 denotes a communication module which has a function equivalent to that of the data input/output unit 102 in FIG. 1. The communication module 5502 communicates with the Web server to obtain display data or print data.

Reference numeral 5503 denotes a received data block which is a memory block for storing data received via the communication module 5502. The memory block can use a so-called external memory, and in such case, the received data block corresponds to a data file.

A decrypted data block 5504 is a memory block for storing the decrypted result of an encrypted file stored in the received data block. The decrypted data block can use a data file as in the received data block 5503.

Reference numeral 5505 denotes a print module which has a function of sending decrypted print data to a printer 5506, and is, for example, a print spool or parallel cable device.

Reference numeral 5507 denotes a decryption key block for holding information (decryption key) for decrypting encrypted information. The decryption key block 5507 can also use a memory area or data file as in other data blocks 5503 and 5504. A decryption key can be input by an arbitrary method. For example, the decryption key may be embedded in a program which runs on the client in advance, or may be input by the user upon installing a program in the client.

Figure 33:
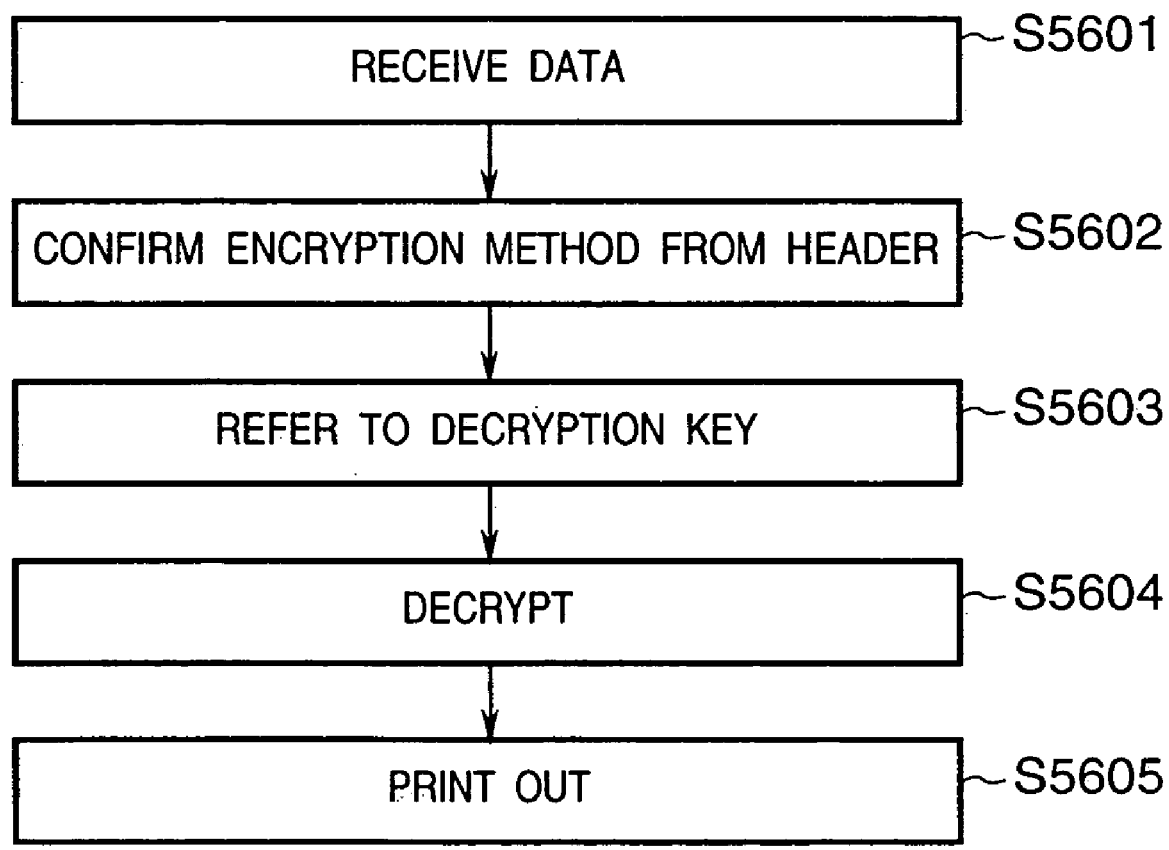
FIG. 33 is a flow chart showing a decryption method according to the 10th embodiment of the present invention.

A decryption process at the client shown in FIG. 32 will be described below with reference to the flow chart shown in FIG. 33. In the following description, assume that the client submits a print request using its printer 5506 to the Web server, and receives an encrypted print data file from the Web server in response to that request.

In step S5601, the print data file is received via the communication module 5502 and is stored in the received data block 5503. As has been described in the above embodiments, the data file may be sent directly from the Web server or may be downloaded from the Web server by a program running on the client. In this embodiment, the data file can be acquired by either method.

Figure 34:
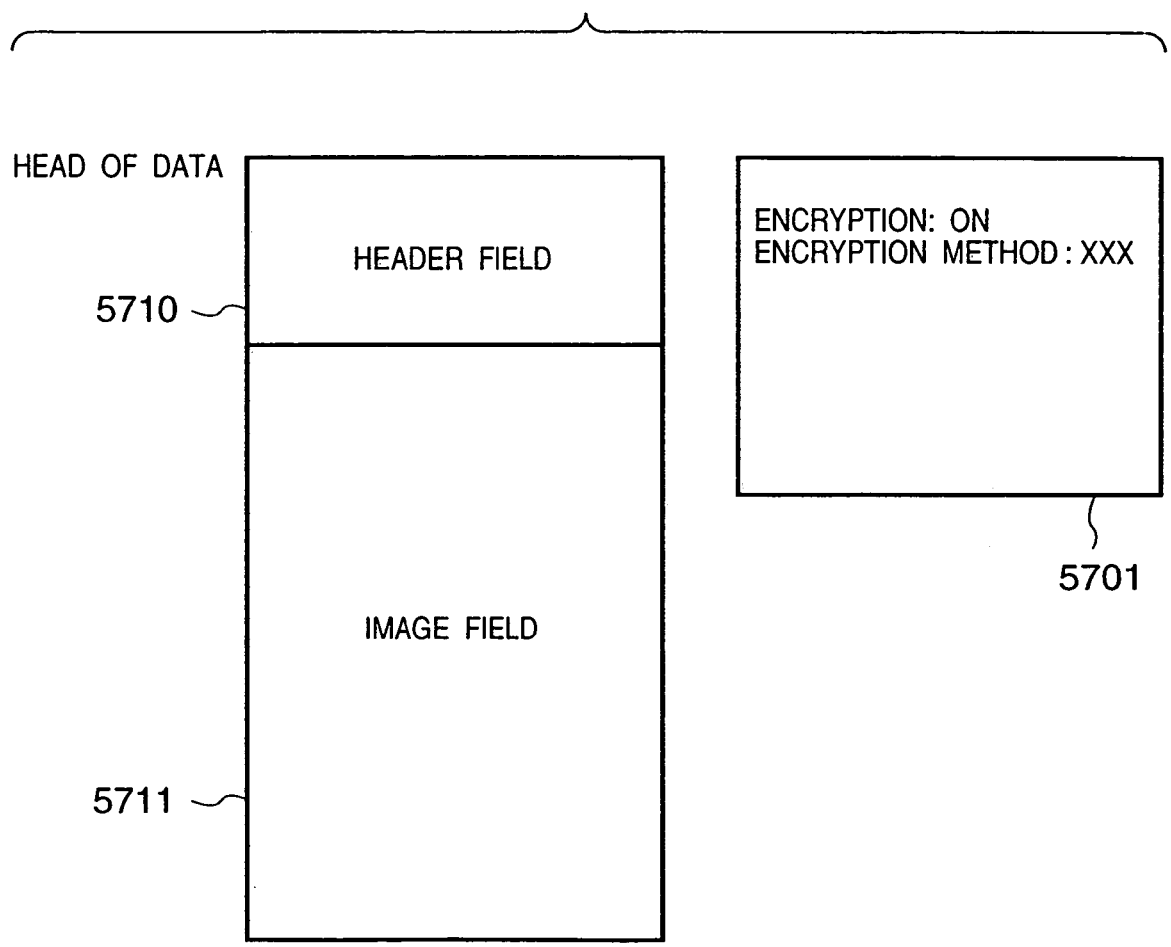
FIG. 34 is a block diagram showing the structure of encrypted data according to the 10th embodiment of the present invention.

FIG. 34 shows an example of the format of the received data.

The received data consists of a header field 5710 indicating the internal structure of data, and an image field 5711 that stores a print image itself.

Furthermore, the header field 5710 has a flag area 5701 indicating whether or not the contents of the image field 5711 are encrypted. If the contents are encrypted, the flag area 5701 describes "ON" and also information indicating the type of encryption.

In step S5602, the flag area 5701 of the header field 5710 of the received data is checked to obtain information indicating whether or not the image field is encrypted and the encryption method used.

In this embodiment, since the received file is encrypted, a decryption key is obtained from the decryption key block 5507 on the basis of the information obtained in step S5602 (step S5603).

The encrypted file stored in the received data block 5503 is decrypted using the decryption key obtained in step S5603, and the decrypted result is stored in the decrypted data block 5504 (step S5604).

The decrypted data is sequentially read out from the decrypted data block, and is output to the printer 5506 via the print module 5505.

[11th Embodiment]

A network print system according to the 11th embodiment of the present invention will be described below. This embodiment is particularly effective when data received from the Web server consists of a plurality of data blocks in the 10th embodiment.

For example, when print data consists of a plurality of text data and image data, and these data are independently sent from the Web server to the client, whether or not data is encrypted and an encryption method may be selected depending on the types of data (such as text, image, and the like).

Because encryption itself requires a long processing time and decryption requires more computation time depending on the encryption method, such processes impose a heavy load on the system. Also, a long processing time means a long wait time for the client user, resulting in inconvenience.

Figure 35:
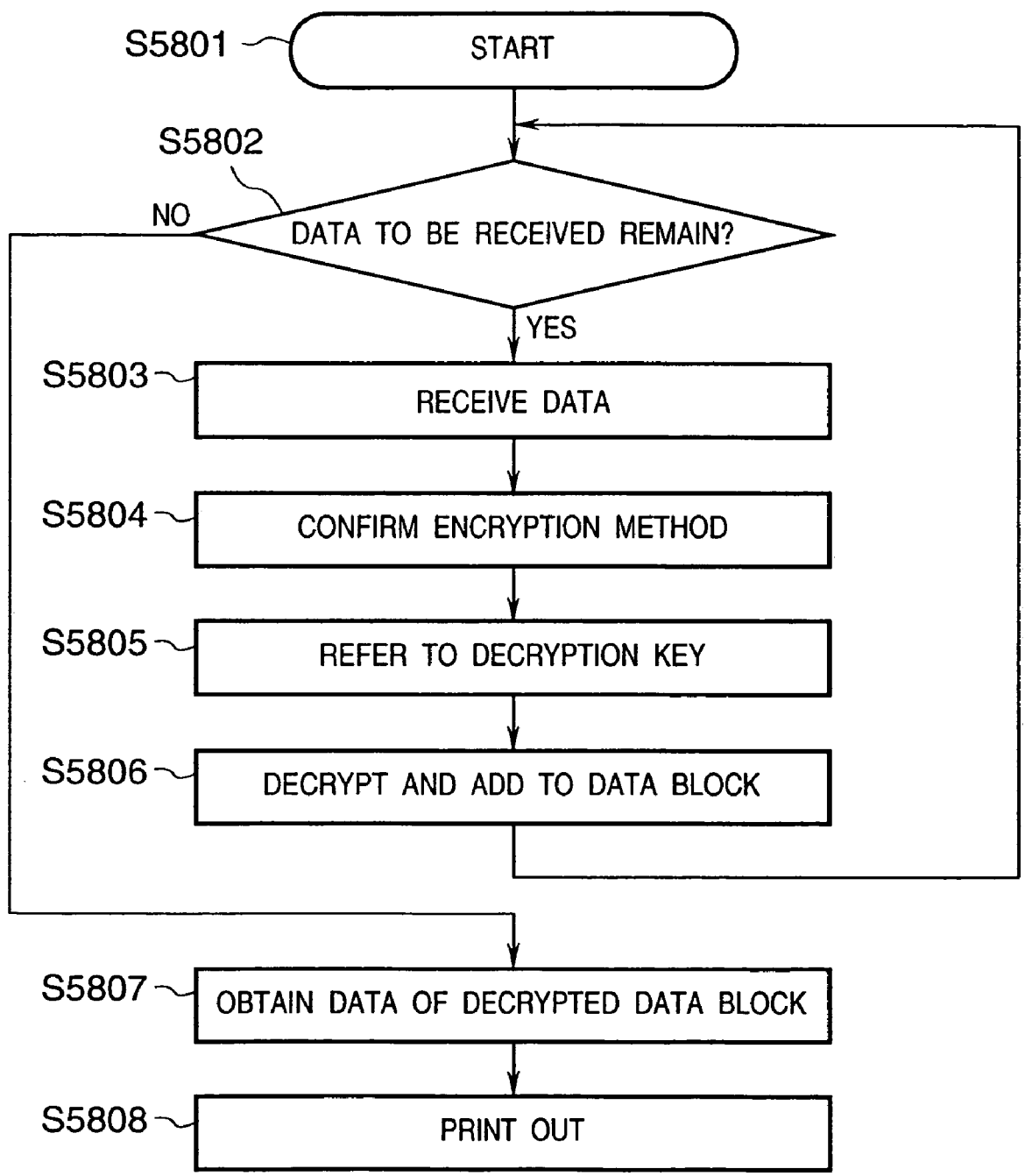
FIG. 35 is a flow chart showing a decryption method according to the 11th embodiment of the present invention.

The decryption process in this embodiment will be explained below using the flow chart shown in FIG. 35. The arrangement of a client that decrypts encrypted data can be the same as that in the 10th embodiment. The processes shown in FIG. 35 are also implemented when the CPU 5501 of the client executes a program stored in an external memory, ROM (not shown), or the like as in those shown in FIG. 33.

In the following description, assume that the client submits a print request using its printer 5506 to the Web server, and receives a print data file consisting of a plurality of individually encrypted data blocks from the Web server as a result of that request.

Step S5801 means start of a certain print job consisting of a plurality of print data. For example, a document including images consisting of a plurality of pages is to be printed.

It is checked in step S5802 if data to be received which form the print job still remain.

If data to be received still remain, data is received and is stored in the received data block 5503 in step S5803.

In step S5804, the flag area 5701 in the header field of the received data block is checked to obtain information indicating whether or not that data block is encrypted and the data type of that data block. The data type can be determined by referring to the header field of the data block, as shown in FIGS. 25 and 26.

Figure 36:
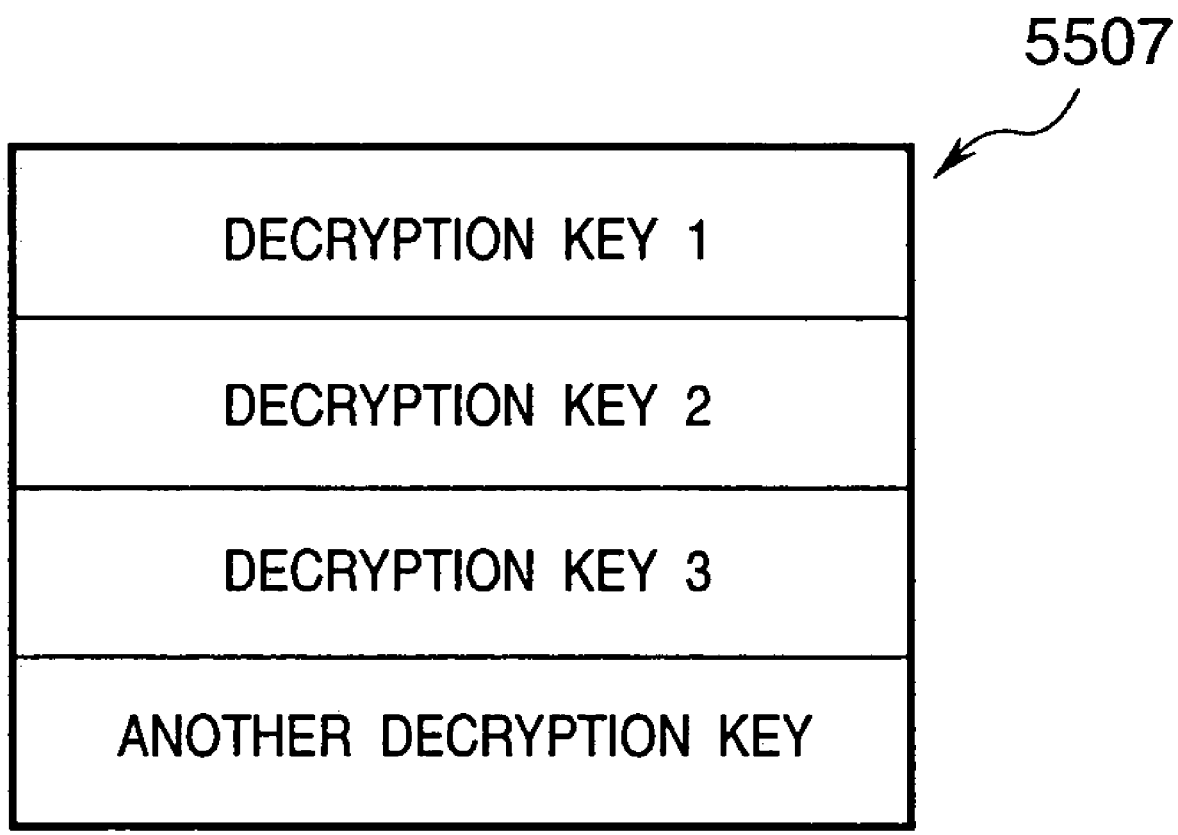
FIG. 36 is a block diagram showing the structure of a decryption key block according to the 11th embodiment of the present invention.

Selection of a decryption key will be described below using an example of the format of the decryption key block 5507 shown in FIG. 36.

The total number of decryption keys included in the decryption key block 5507 is arbitrary. In this embodiment, four decryption keys (decryption key 1, decryption key 2, decryption key 3, and another decryption key) are stored in the decryption key block 5507.

In step S5804 in FIG. 35, the decryption key to be used in the decryption key block shown in FIG. 32 is determined in accordance with the type of received data. For example, it is defined in advance in the system to use decryption key 1 for text data, decryption key 2 for image data, and so on, and the key is determined according to such rule.

In step S5806, the encrypted data block stored in the received data block 5503 is decrypted using the decryption key determined in step S5804, and the decrypted result is stored in the decrypted data block 5504.

In this embodiment, since one job is formed by a plurality of data blocks, there are a plurality of decrypted data files. Hence, the decrypted data block 5504 is designed so that data can be sequentially added.

For example, data can be added by a method of simultaneously holding the next write address every time data is added.

After that, the processes in steps S5802 to S5806 are repeated until all received data are decrypted. If the absence of data to be received is detected in step S5802, the decrypted data are read out from the decrypted data block 5504 in step S5807, and are output to the printer 5506 via the print module 5505 in step S5808.

[12th Embodiment]

A network print system according to the 12th embodiment of the present invention will be described below. In the system according to the 10th and 11th embodiments, a decryption key is determined based on information or the data type of a data block obtained from the header field of the received data block. Alternatively, the system of this embodiment is characterized by providing a network print system which can ensure communications with higher secrecy using a decryption key based on session information held between the Web browser and Web server upon decryption.

Figure 37:
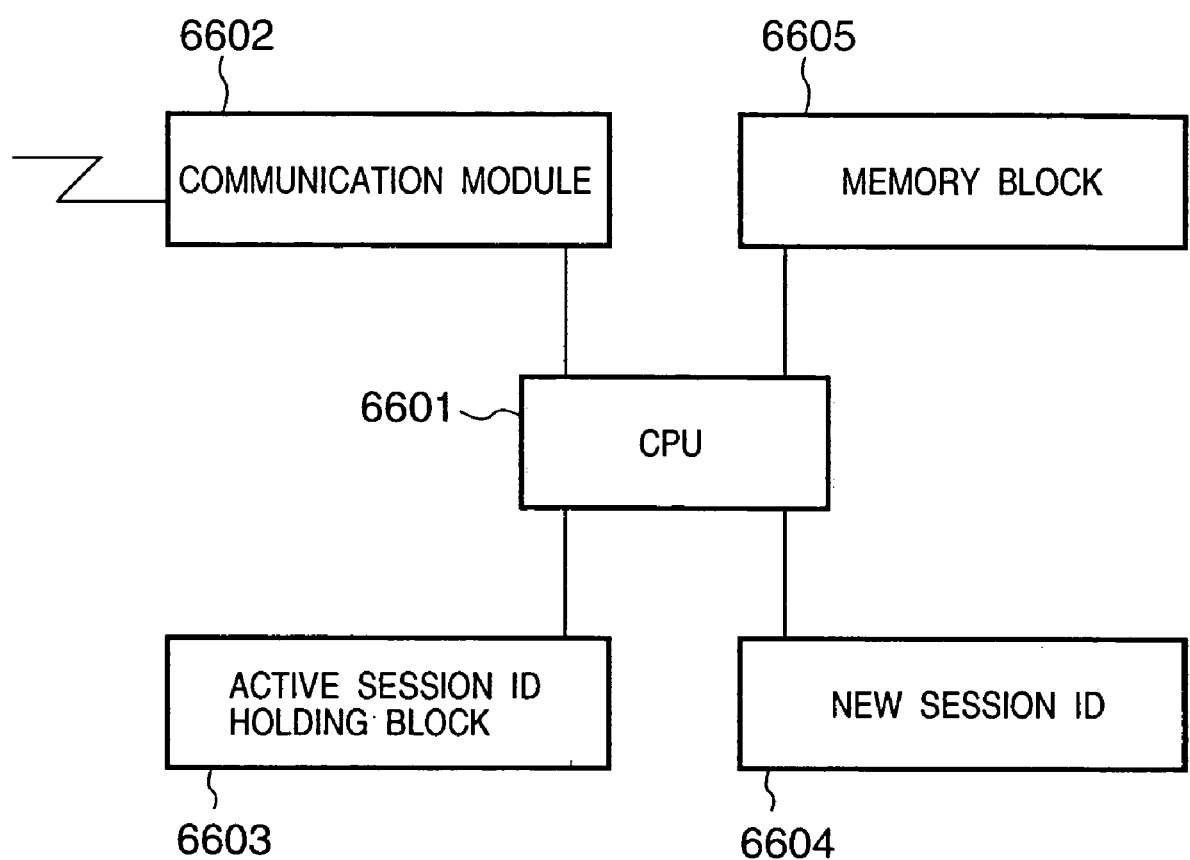
FIG. 37 is a block diagram showing the arrangement of a server according to the 12th embodiment of the present invention.

FIG. 37 is a system block diagram of a Web server in this embodiment. Reference numeral 6601 denotes a CPU for executing a program of processes to be described below. Reference numeral 6602 denotes a communication module for communicating with a client (not shown). Reference numeral 6603 denotes a session ID block; and 6604, a new session ID block. Reference numeral 6605 denotes a memory block for storing a session ID and decryption key in correspondence with each other.

As has been described in the second embodiment, in a normal Web system, one session comes to an end by a single set of request and reply exchanged between the server and client, and that system has no mechanism for identifying a client in the session. For this reason, this embodiment also uses a method of inserting a session ID in a URL that indicates the location information of the server.

Figure 38:
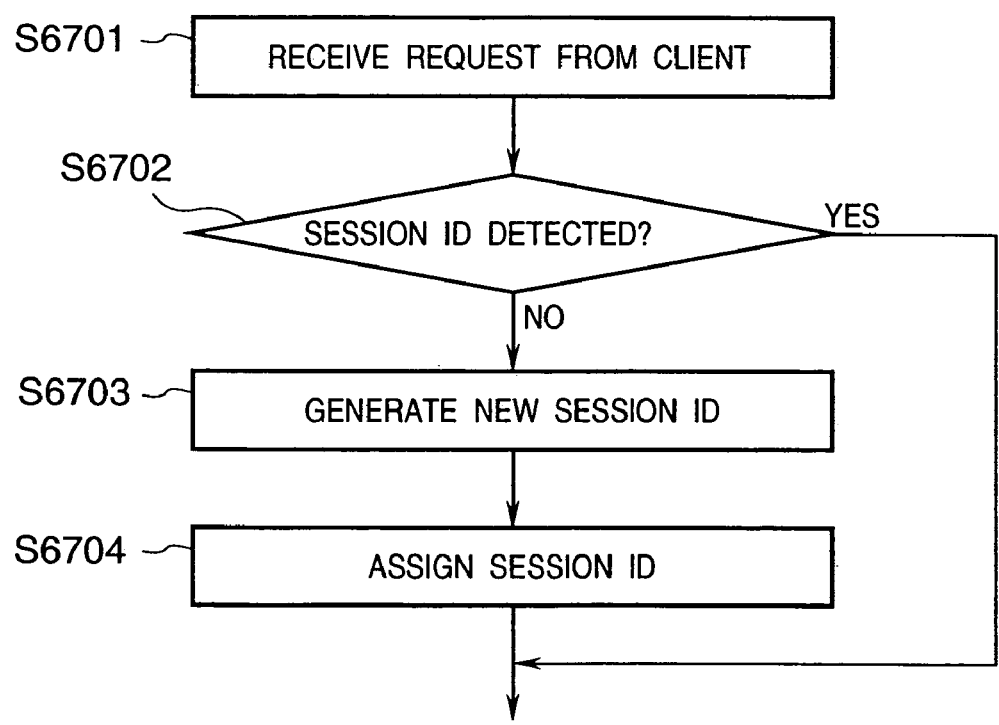
FIG. 38 is a flow chart showing a session holding method according to the 12th embodiment of the present invention.

A session ID insertion process will be further explained below using the flow chart shown in FIG. 38. Upon receiving a request from a certain client in step S6701, it is checked in step S6702 if a session ID is appended to the URL. If no session ID is found in the URL, start of a new session from that client is determined, a new session ID is generated in step S6703, and the session ID is assigned to the request in step S6704. The URL with the session ID is returned to the client upon completion of the process corresponding to the request. When the identical client submits the next request to the Web server in the identical session, it re-accesses the server using the URL with the session ID.

The new session ID is generated in the following sequence in step S6703. The server holds an active session ID in the active session ID block 6603.

If it is determined in step S6702 that the URL has no session ID, a new session ID is generated using a random number, and is held in the new session ID block 6604.

If this value is not held in the active session ID holding block 6603, that value is determined to be a new session ID, and is stored in the block 6603. Also, that value is appended to the URL in step S6703.

In place of a random number, a value which does not overlap other session IDs may be obtained by simply counting up a value. However, since this embodiment uses the session ID in an encryption process, a higher security effect can be expected if random numbers are used.

Figure 39:
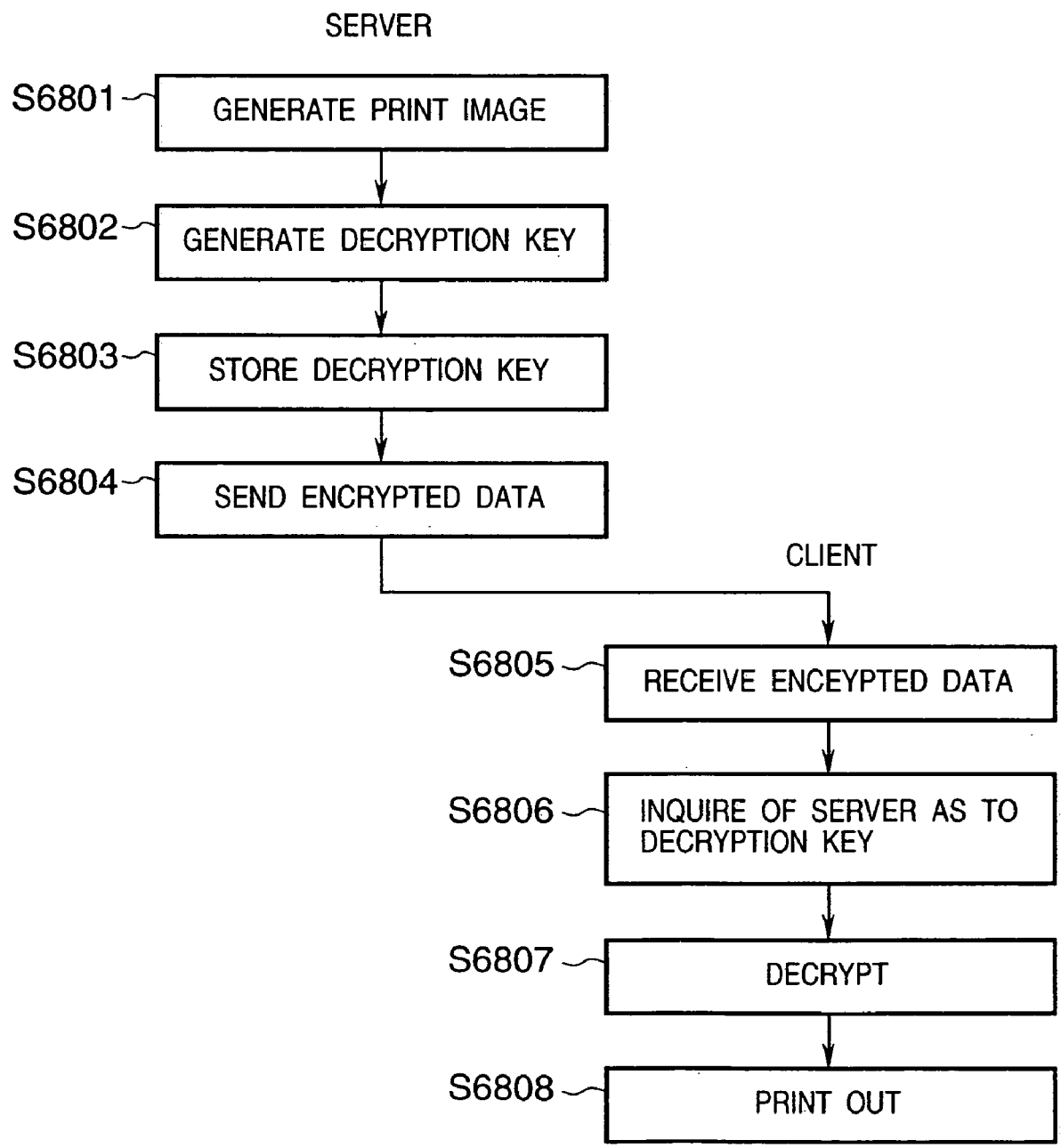
FIG. 39 is a flow chart showing a decryption method according to the 12th embodiment of the present invention.

A sequence for using the session ID in encryption will be explained below using the flow chart shown in FIG. 39.

FIG. 40 shows the configuration of the memory block 6605 held on the server. As can be seen from FIG. 40, the memory block 6605 has a table structure. A key field in the table stores the aforementioned session IDs. A value field stores decryption keys required for decrypting encrypted data.

Assume that in step S6801 the Web server generates a print image in response to a client request.

In step S6802, the Web server generates a decryption key, which is used at the client to decrypt a print image file encrypted later, using the session ID assigned to this session. Note that the decryption key preferably uses a random number to obtain high secrecy, as described above.

In step S6803, a set of the key and value, i.e., the session ID as a key and the decryption key as a value, are stored in the memory block 6605.

In the example shown in FIG. 40, a value "187737216" is stored as the decryption key corresponding to a key "1121", and a value "98673628" is stored in correspondence with a key "4827". The decryption key can be generated from the session ID using a predetermined arbitrary method.

In step S6804, the print image is encrypted by an encryption method that can be decrypted by the decryption key, and the encrypted print image is sent to the client.

In step S6805, the client receives the encrypted image data.

Since the client already knows the session ID, it inquires of the server as to the decryption key using that session ID in step S6806. In this case, since the session ID permits only a continuous connection from a specific user, a request from another user is denied.

Since the decryption key is sent back to the client in step S6807, the client can decrypt the encrypted image data using that decryption key, and can output the decrypted image data from a printer connected directly thereto or via the network.

Note that the arrangement of the client in this embodiment is not particularly described. However, a client with an arbitrary arrangement can be used as long as it can implement processes described in steps S6805 to S6808 in FIG. 39. For example, the client with the arrangement shown in FIG. 32 may be used, and a program that allows the CPU 5501 to implement the processes described in steps S6805 to S6808 in FIG. 39 may be stored in an external memory (not shown) or the like.

[13th Embodiment]

A network print system according to the 13th embodiment of the present invention will be described below. In the 11th and 12th embodiments, systems that can ensure higher security between the client and Web server has been explained. This embodiment is characterized by improving security among client users.

More specifically, in an organization such as a company, printable/displayable contents often differ depending on offices. A process executed when the contents that can be output are restricted to different degrees according to the authority levels of Web browser users in the system according to this embodiment will be explained below. Note that the system according to this embodiment can be implemented by an arrangement in which the data storage unit 109 of the Web server 106 has an authority table (to be described later) in the arrangement shown in FIG. 1, and the following process can be implemented when the CPU 101a (FIG. 8) of the server 106 executes a program stored in the external memory 101c.

Figure 41:
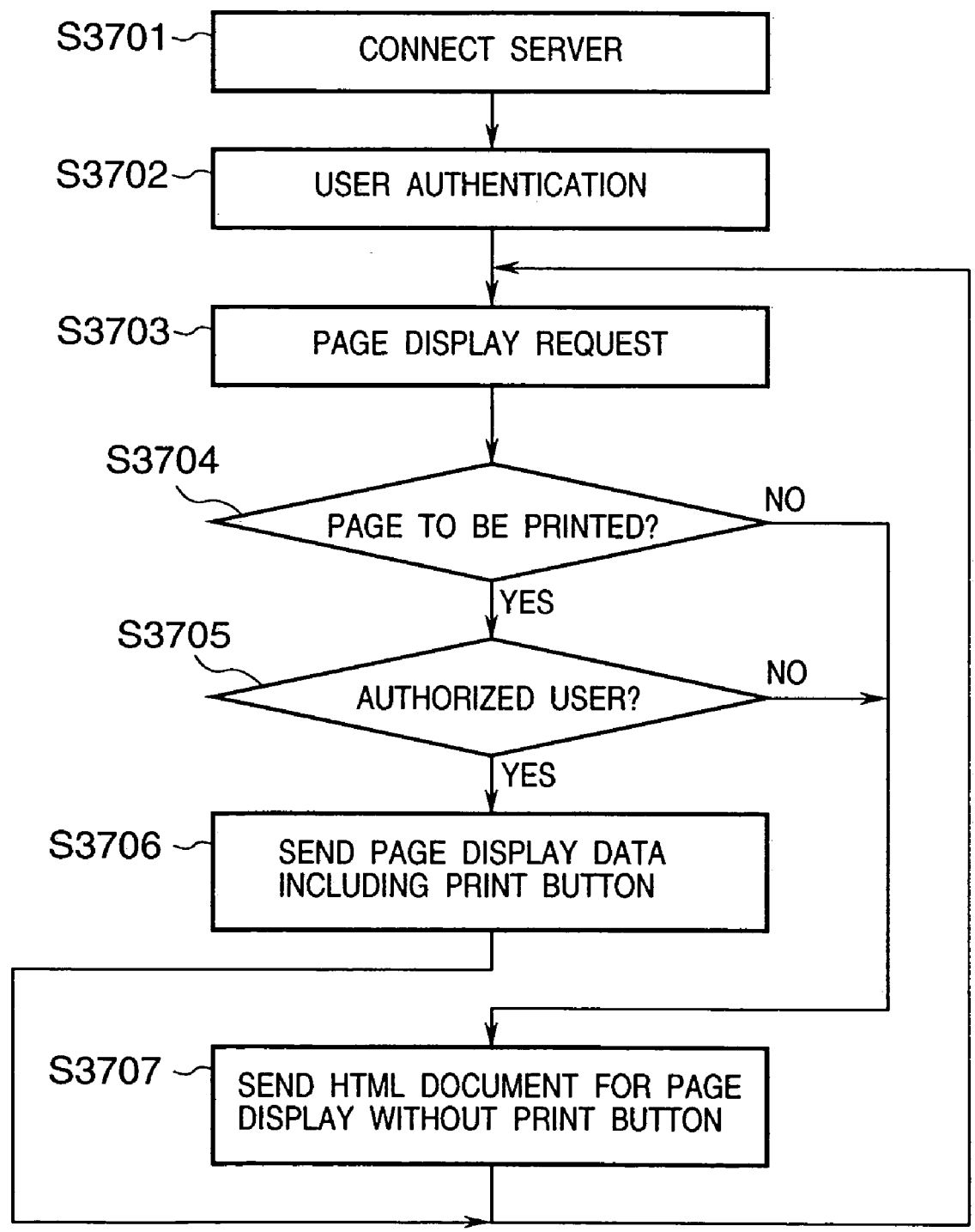
FIG. 41 is a flow chart showing a display process on the basis of user authority in a network print system according to the 13th embodiment of the present invention.

A process for restricting the entire print process will be explained below using the flow chart shown in FIG. 41.

In step S3701, the user accesses (login request) the Web server 106 via the Web browser 114 (FIG. 1). Since the server displays a user authentication window on the browser in response to this request in step S3702, the user inputs, e.g., his or her user ID, password, and the like. The data processing unit 110 of the Web server compares the input user ID and password with the contents of a database which is included in the data storage unit 109 and stores user information.

As shown in FIG. 42, the user IDs and its print authority levels are registered in advance in the data storage unit 109, and the print authority level of the logged-in user can be obtained by referring to this table. After that, when a process is requested by this user, the process is done based on the obtained authority level.

Assume that the user submits a new page display request to the Web server in step S3703. The Web server 106 checks if the next page to be displayed is a page to be printed, i.e., that page includes a print button. If the next page is a normal page without any print button, the flow jumps to step S3707.

On the other hand, if it is determined in step S3704 that the next page is a page to be printed, the server checks the user authority level obtained and held in step S3702. If it is determined that the user has print authority, page display data including the print button is sent (step S3706). On the other hand, if the user has no authority, page display data without any print button, which is prepared in advance, is sent in step S3707. Hence, the page sent in response to the display request from the user having no print authority has no print button, and a form print process is not done.

Of course, when only print button display can be turned on/off, common page display data to be sent may be prepared, and only print button display may be changed in correspondence with the presence/absence of authority.

A process when authority levels are set in units of form items will be explained below. In this case, when an unauthorized user operates, some important items are neither displayed nor printed. FIG. 43 shows items added in this embodiment as a part of the variable data table (FIG. 3) of the form template, which has been explained in the first embodiment.

As shown in FIG. 43, in this embodiment whether print/display is/are possible in respective authority levels is registered in units of indices of variable data. In the variable data table shown in FIG. 43, a field 3801 stores indices each indicating variable data embedded in a template. A field 3802 stores area names indicated by the indices stored in the field 3801. This field is not always necessary, but is assured for a supervisor or the like, since meanings of data cannot be determined by only indices. Fields 3803, 3804, and 3805 store flags indicating whether or not a display/print process is permitted in correspondence with authority levels.

In the example shown in FIG. 43, the user with authority level 1 can display/print all items. On the other hand, the user with authority level 2 can display/print the department name, gender, subtotal, and total, but cannot display/print the member number and name. The user with another authority level can display/print only the gender and total. This variable data file is stored in the data storage unit 109 in the Web server. The authority levels of users are registered in advance in, e.g., a table (FIG. 42) having a structure in which the print authority field is replaced by the authority level field, and that table is stored in the data storage unit.

The operation of the Web server (image generation unit 111) upon pressing a print button on the Web browser window while the setups shown in FIG. 43 are made will be explained below using the flow chart shown in FIG. 44. In the following description, assume that the user login process has ended, and the authority level of that user has already been acquired.

As has been described in the first embodiment, if the print button is pressed (step S3901) and its message is received, the Web server detects a form template used in this print process (step S3902). In step S3903, the Web server searches its data storage unit or the like for a variable data table required for form generation to prepare for data filled out into the form template.

Assume that the form template used in the print process corresponds to the data table shown in FIG. 43. The positions of items in the form are detected (step S3903), and data corresponding to indices N1, N2, . . . in the field 3801 are searched for. In step S3904, user authority information is obtained, and a print item file is loaded from the variable data table shown in FIG. 43.

In the next step, corresponding values and authority information in the print item file shown in FIG. 43 are compared in the order of indices. In step S3905, an index is set at 1 (N1). It is checked in step S3906 based on the print item file loaded in step S3904 if data corresponding to N1 is printable at the current user authority level. If data corresponding to N1 is printable at the authority level of that user, the already found data corresponding to N1 is loaded in step S3907, and index data used to merge that data with the form template is generated in step S3909.

It is checked in step S3910 if all indices are checked. If indices to be checked still remain, the value N is incremented to check the next item. Even when it is determined in step S3906 that the item of interest cannot be printed at the current user authority level, N is also incremented to check the next item. Hence, no index data is generated for an item that cannot be printed at that authority level, and when a form image is generated in step S3912, no data are printed (as blank fields) in items for which no index data are generated.

Figure 44:
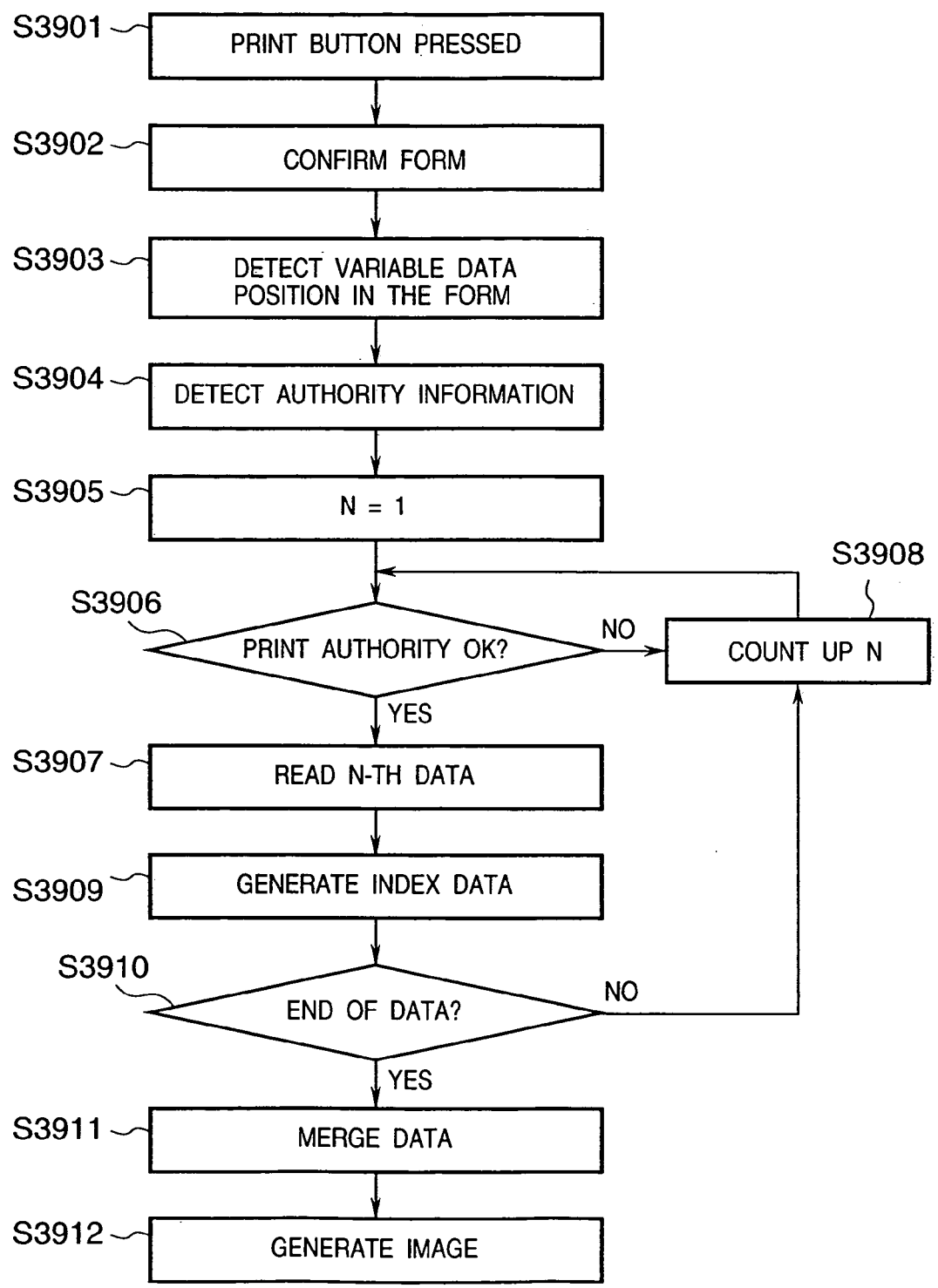
FIG. 44 is a flow chart for explaining the process upon setting proprieties of processes in units of form items on the basis of user authority levels.

The print process has been explained in FIG. 44. The same applies to the display process.

[14th Embodiment]

A network print system according to the 14th embodiment of the present invention will be described below.

Figure 45:
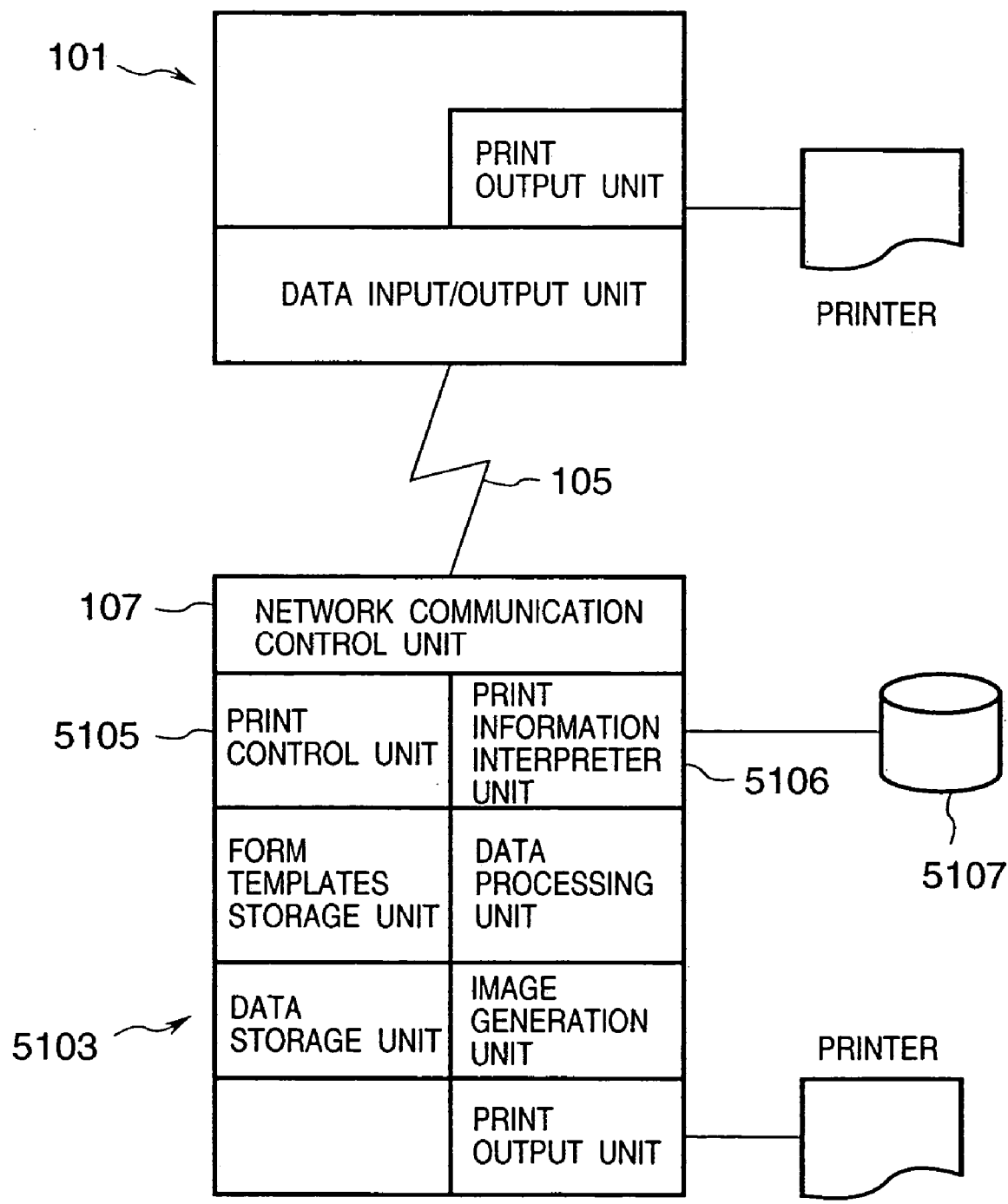
FIG. 45 is a block diagram of a network print system according to the 14th embodiment of the present invention.

FIG. 45 is a software block diagram showing the arrangement of a network print system according to this embodiment. This embodiment has an arrangement obtained by adding a function of restricting process contents to be done in response to a print request sent from a client as the characteristic feature of this embodiment to the arrangement shown in FIG. 1 in the first embodiment.

Referring to FIG. 45, reference numeral 101 denotes a client; and 105, a network. The client 101 and network 105 are respectively the same as those in FIG. 1. In a Web server 5103, a network communication control unit 107 is the same as that in the Web server 106.

Reference numeral 5105 denotes a print control unit which has a function of instructing the client as to whether or not a print process is permitted, on the basis of an interpretation result of a print information interpreter unit 5106. The print information interpreter unit 5106 has a function of determining whether or not print of print data sent from the client 101 is restricted, by referring to a database 5107 (to be described later). The database 5107 holds restriction information set for each form.

Figure 46:
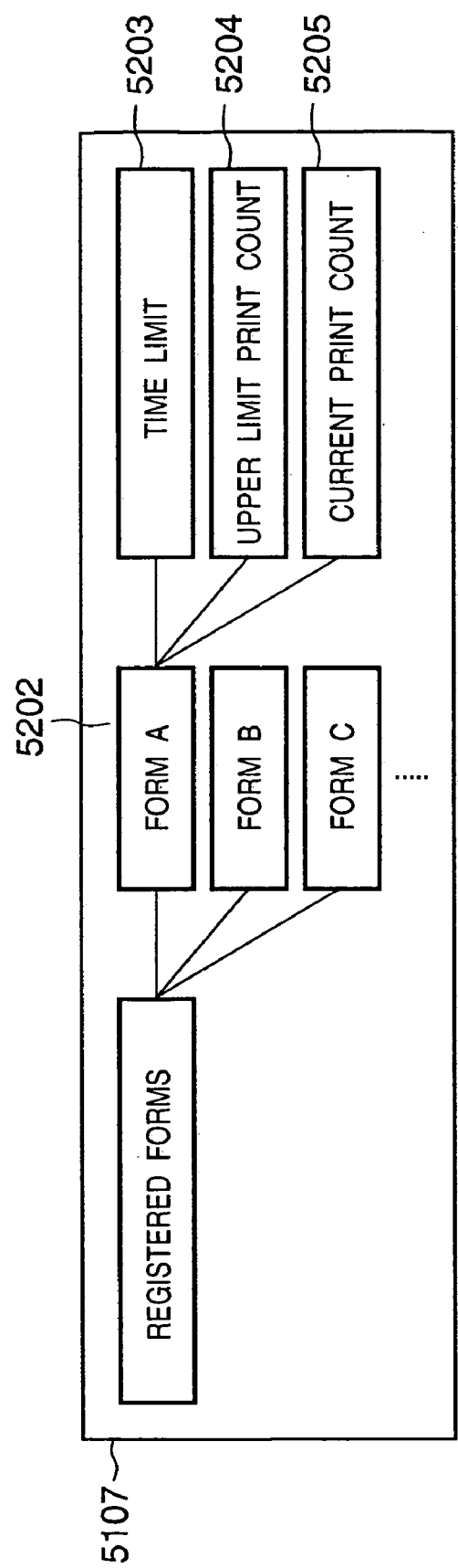
FIG. 46 is a view showing the structure of a database that holds print restriction information.

FIG. 46 shows an example of data held in the database 5107 shown in FIG. 45. A plurality of forms 5202 are registered in an already registered form file, and have print restriction information in units of forms that can be used. Time-limit information 5203 defines the use time limit of that form, and a print process is denied for a print request after the time expires. Count information 5204 specifies the upper limit of the print count of that form, and when the print count has reached this upper limit, a print process is denied for any subsequent print request. A current print count 5205 holds the number of times that form has been printed so far. In FIG. 46, these pieces of information 5203 to 5205 are shown in correspondence with only form A, but are stored in correspondence with respective forms in practice.

Figure 47:
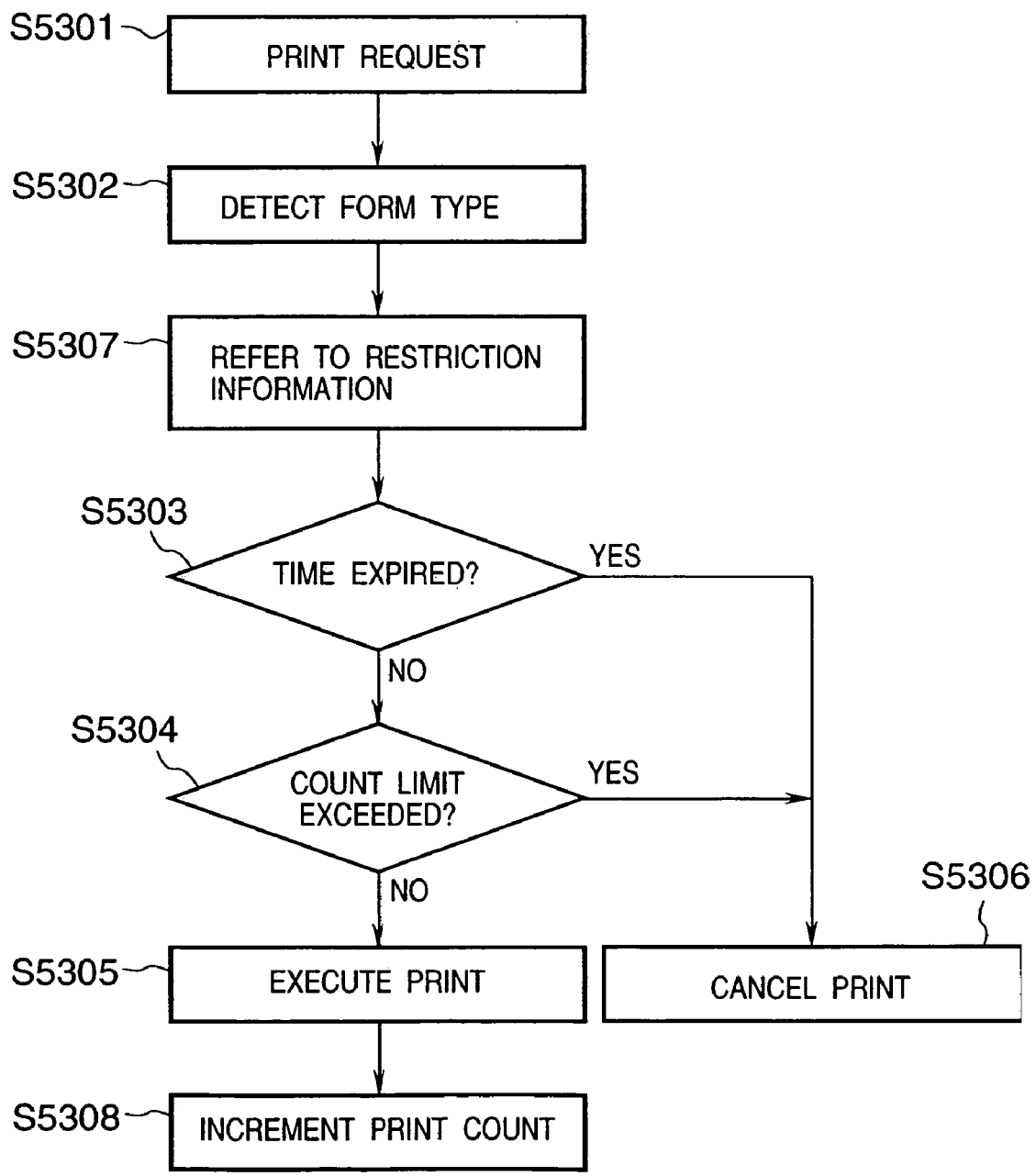
FIG. 47 is a flow chart showing the sequence of a print authorization process on the basis of restriction information.

A print authorization process using the restriction information will be explained below using the flow chart shown in FIG. 47. This process is executed during a process for a print request from the client. For example, in the server print process (FIG. 5) that has been explained in the first embodiment, this process can be executed in place of the server print button depression detection process (step S501) and form search process (step S502).

In step S5301, a print request from the client to the Web server is received. In step S5302, the print information interpreter unit 5106 of the server 5103 interprets the print request data sent from the client to detect the type of form used in the requested print process. In step S5307, the server searches the database 5107 based on the type of form for restriction information corresponding to that form. If a print time limit is set, the current date is compared with the time limit information 5203, and if the time limit has expired, the print process is denied.

If no time limit information is set or if the current date falls within that time limit, and if an upper limit of the print count is set, the current print count 5205 is compared with the count information 5204 in step S5304. If the current print count is equal to the count set in the count information, since the upper limit is exceeded if the print process is done, the print process is denied.

If no upper limit of the print count is set or if the current print count is smaller than the upper limit, a print execution instruction is sent to the print control unit 5105 in step S5305, and the print count value corresponding to the form used in the database 5107 is incremented by one (step S5308). If it is determined in either step S5303 or S5304 that the print process is denied, a print denial instruction is sent to the print control unit 5105 in step S5306.

If the print process is denied, a message indicating this may be displayed on the window of the Web browser 114 of the source client. Not only the print process but also the display process can be restricted. In such case, either the display process itself may be denied or a window excluding a print button may be displayed, as described in the 13th embodiment.

[15th Embodiment]

A network print system according to the 15th embodiment of the present invention will be explained below.

Figure 48:
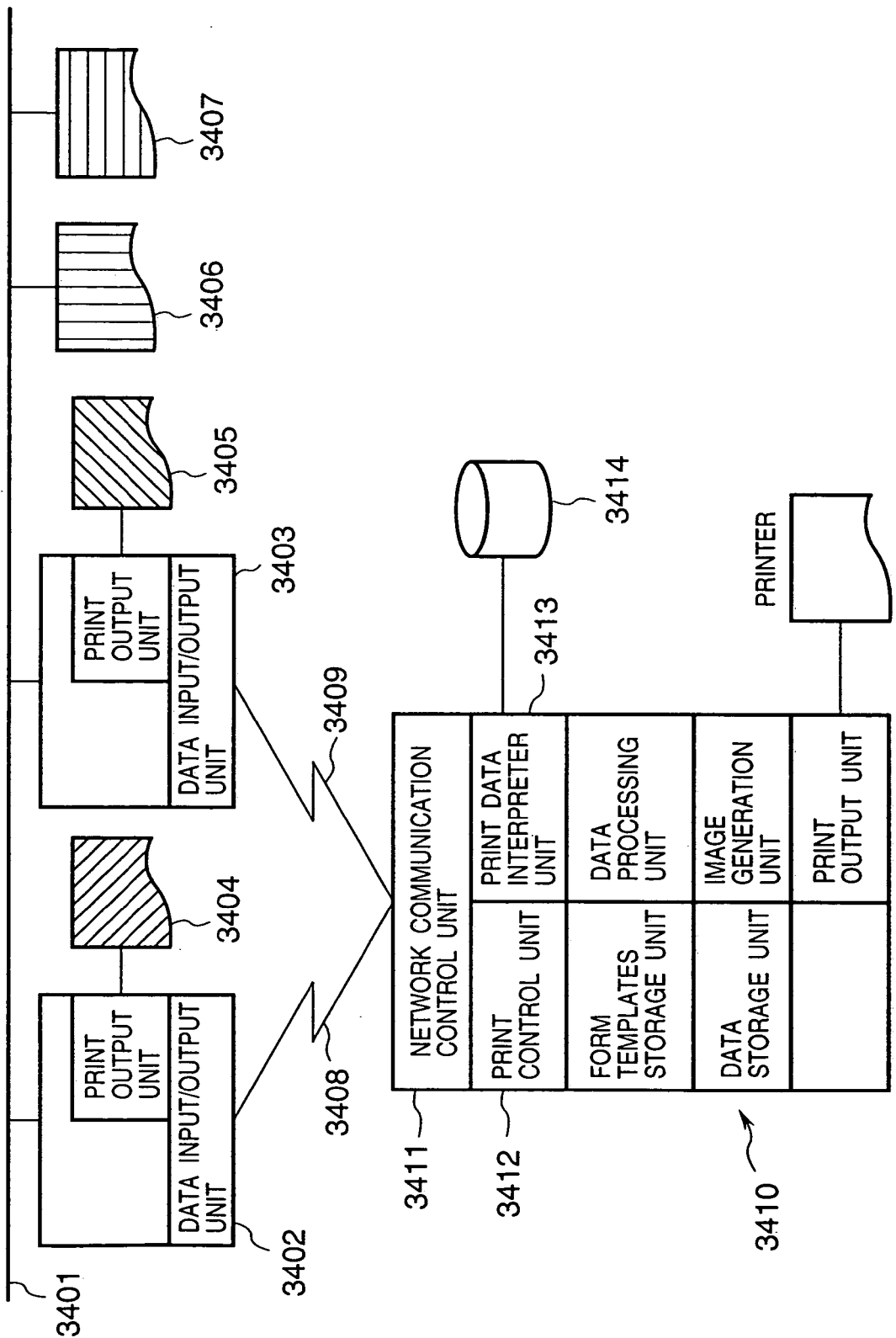
FIG. 48 is a block diagram of a network print system according to the 15th embodiment of the present invention.

FIG. 48 is a block diagram showing the arrangement of a network print system according to this embodiment. This embodiment is characterized in that a Web server selectively distributes print data to a plurality of clients to distribute the load on the clients and to achieve a high-speed output process at each client.

Referring to FIG. 48, reference numeral 3401 denotes a network, to which computers serving as clients, printers and the like are connected. Reference numerals 3402 and 3403 denote clients, which have the same arrangement as that of the client 101 (FIG. 1) explained in the first embodiment. Reference numerals 3404 to 3407 denote printers having different print capabilities. The printers 3404 and 3405 are respectively connected to the clients 3402 and 3403, and the printers 3406 and 3407 are connected to the network 3401.

Reference numerals 3408 and 3409 denote networks which are the same as the network 105 in the first embodiment, but are characterized in that different routes are selected in accordance with the printers used. A Web server 3410 is substantially the same as the Web server 106 in the first embodiment, except that it has a function of interpreting print information, and distributing print data to an appropriate destination client. A network communication control unit 3411 is the same as the network communication control unit 107 shown in FIG. 1.

Reference numeral 3412 denotes a print control unit which automatically selects a printer optimal to a print process and sends a print request thereto on the basis of the print capabilities and load states of the printers connected on the network 3401, and information from a print data interpreter unit 3413 (to be described below) in the Web server 3410.

The print data interpreter unit 3413 interprets print information, and informs the print control unit 3412 of the printer to be preferentially used on the basis of information and the like of the user who submitted a print request. Also, the unit 3413 stores the received print request information in a database 3414. The database 3414 is, e.g., a relational database, and stores the types of printers connected on the network and information of previous print processes.

Figure 49:
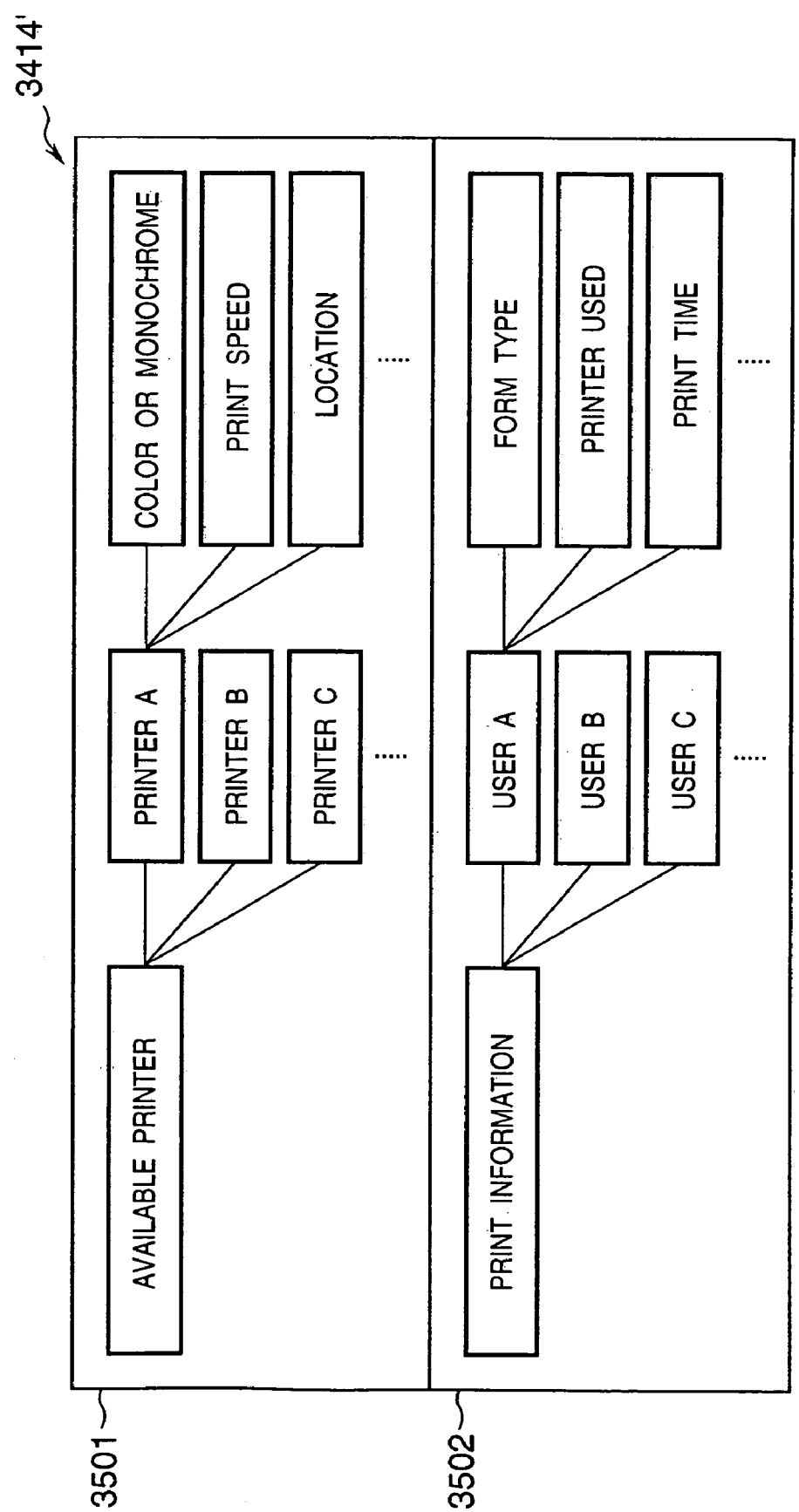

FIG. 49 shows an example of data stored in the database 3414. The database 3414 has a printer file 3501 which stores information of available printers, and a print information file 3502 which stores previous print histories in units of users.

The printer file 3501 stores unique information such as the possibility of a color print process, print speed, location, and the like in units of printers that the clients can use. The print information file 3502 stores histories, i.e., correspondence between forms and their output printers, formats used, and the like as print history information of each user. In this embodiment, setups upon receiving the next print request are determined on the basis of the histories.

Figure 50:
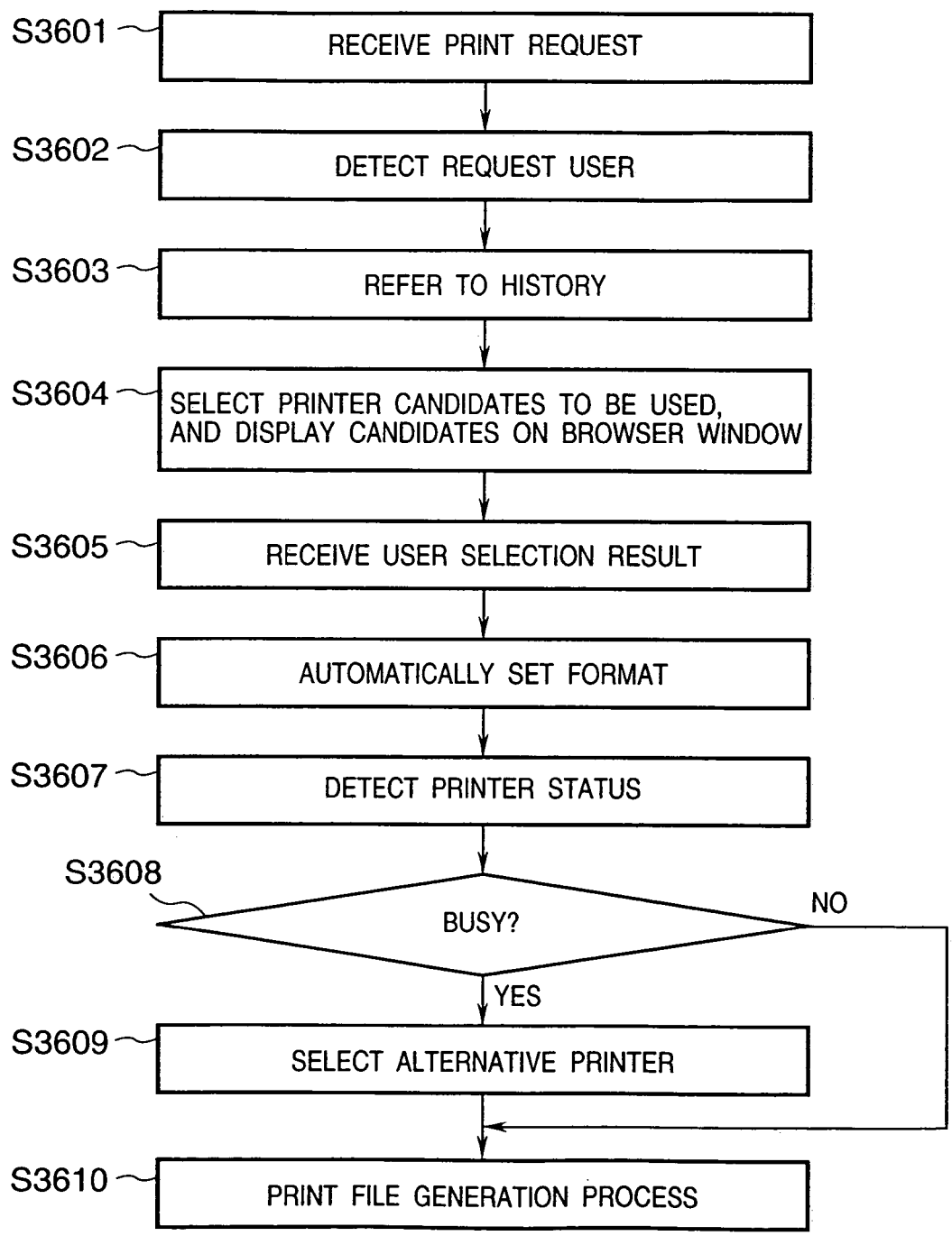
FIG. 50 is a flow chart for explaining a print process that selectively uses a plurality of printers.

Processes from reception of a print request until selection of a printer to be used in the print process in the system according to this embodiment will be explained using the flow chart shown in FIG. 50.

In step S3601, a certain client generates a print request to the Web server, and that server receives this request. The print data interpreter unit 3413 of the Web server interprets the received print request to specify the user who submitted the print request (step S3602). The unit 3413 refers to the print information file 3502 in the database 3413 (step S3603) to narrow down the printer candidates to be selected on the basis of the previous print history of the specified user (step S3604).

As the printer candidates, a predetermined number of printers (e.g., three printers) in descending order of the number of times of use may be selected from those which were used in a predetermined number of previous print requests (e.g., last 10 print requests), or the previously used printer may be simply selected.

After printer candidates are selected, they are displayed on the Web browser window of the client to prompt the user to select a printer. In this case, the printer used in the immediately preceding print process may be displayed as a default choice. Upon receiving the printer selection result of the user in step S3605, the print format is automatically determined on the basis of the history in step S3606.

In step S3607, the print control unit 3412 detects status of the determined printer to be used. If it is determined in step S3608 that the printer is busy, another printer having a function equivalent to or higher than that of the determined printer is automatically selected from the printer file 3501 in the database 3414, and print job control is transferred to that printer (step S3609). In this case, a message indicating that the printout destination has changed is preferably sent to the user.

On the other hand, if the selected printer is busy, a message indicating this may be sent to the user, and other printer choices selected from the printer file may be displayed. Then, the print process control may be transferred to the printer selected by the user.

In step S3610, a print process such as a print data generation process and the like by the image generation unit of the Web server is executed in correspondence with the finally selected printer.

In the above description, a plurality of candidates are selected, and the user selects one of them. Alternatively, a printer which is used most frequently or the previously used printer may be automatically selected.

In the above description, both the format setup process and alternative printer selection process when the selected printer is busy are done. However, either one of these processes may be done.

[16th Embodiment]

A network print system according to the 16th embodiment of the present invention will be described below. The network print system according to this embodiment is characterized in that a printer optimal to a print process is automatically selected depending on whether or not the contents of form data to be printed include color data.

The system of this embodiment is also characterized in that when the number of pages of a document to be printed is larger than a predetermined number of pages, one document is divided into a plurality of page groups, and the print process is distributed to a plurality of client printers. In this case, the document may be divided into color/monochrome pages, and optimal printers may be assigned to those pages to distribute the print process.

Since the network print system according to this embodiment can be realized by the arrangement shown in FIG. 48 described in the 15th embodiment, a detailed description of the arrangement will be omitted.

Figure 51:
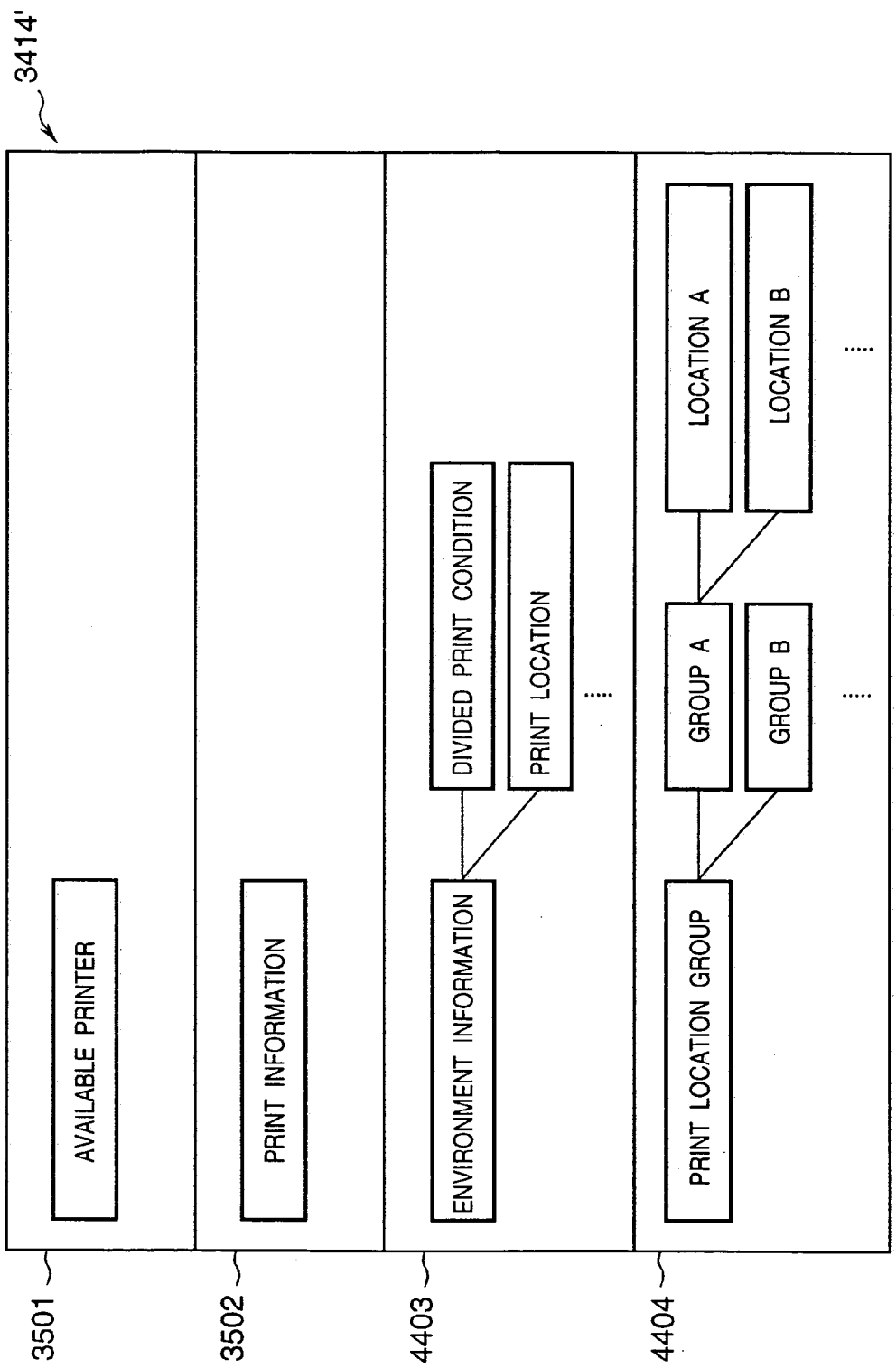
FIG. 51 is a view for explaining information stored in a database in a network system according to the 16th embodiment of the present invention.

FIG. 51 shows the contents of a database 3414' in this embodiment. The database 3414' has a configuration obtained by adding, to that of the database 3414 shown in FIG. 48 in the 15th embodiment, an environment information file 4403 and print location group file 4404 as information for a divided print process. The environment information file 4403 stores information such as the number of pages of a document to be printed beyond which a divided print process is done, the locations of printers to be used in the divided print process using a plurality of printers, and the like. The print location group file 4404 stores information that groups ranges of printers used in the divided print process.

Figure 52:
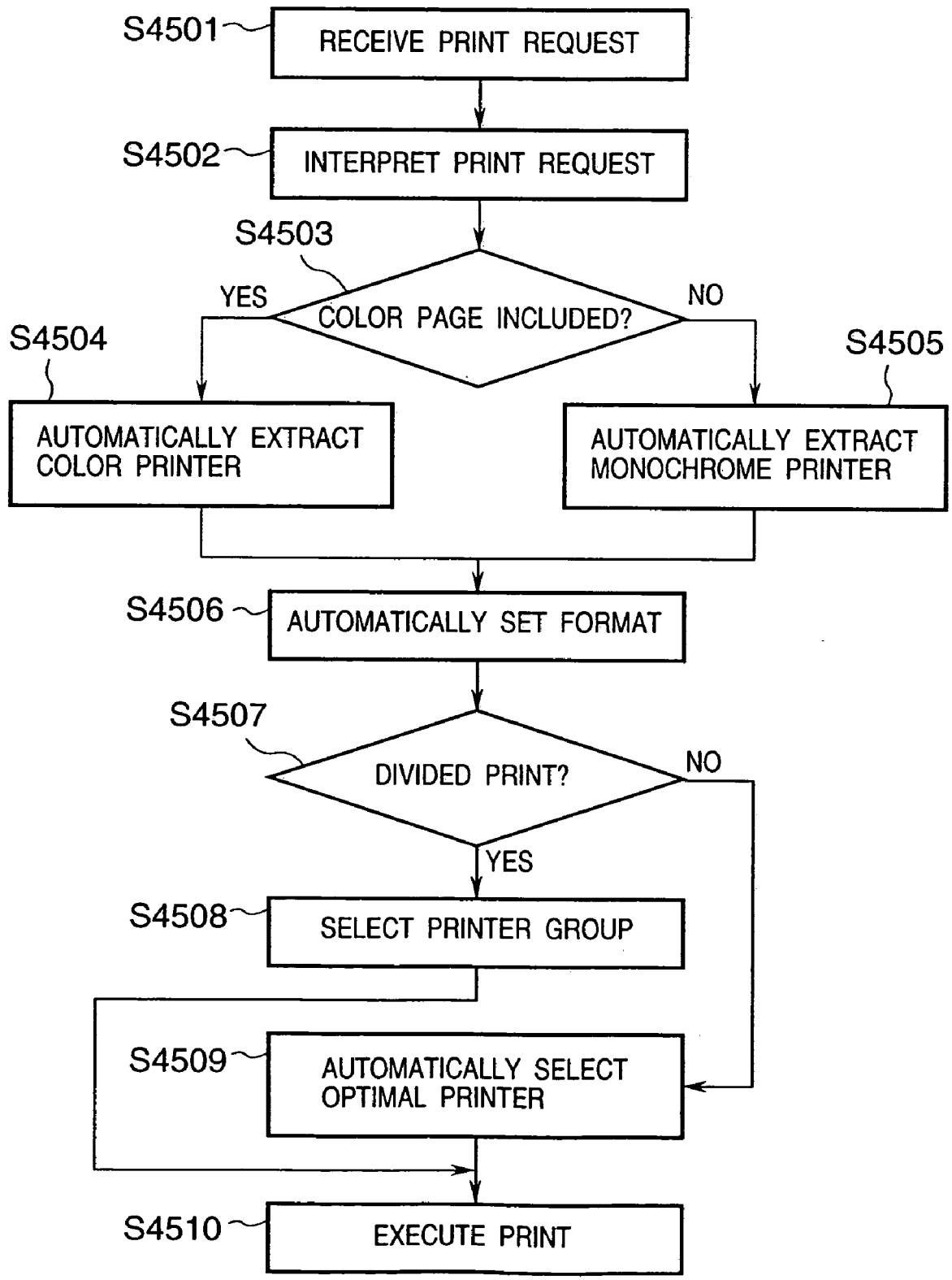
FIG. 52 is a flow chart showing the sequence of a divided print process.

The print process in this embodiment will be described below using the flow chart shown in FIG. 52. FIG. 52 shows the processes from reception of a print request from the client until determination of a printer that executes the print process as in those described with reference to FIG. 50 in the 15th embodiment.

In step S4501, a print request from the client is received by the Web server. In step S4502, the print data interpreter unit 3413 (FIG. 48) of the Web server interprets the received print request to specify the user who submitted the request and to detect if a document to be printed includes a color page.

If a color page is included, the flow advances from step S4503 to step S4504 to extract a color printer from the available ones with reference to the printer file 3501 in the database 3414'.

On the other hand, if the document consists of only monochrome pages, the flow advances from step S4503 to step S4505 to extract a monochrome printer from the available ones with reference to the printer file 3501 in the database 3414'.

In step S4506, the print format is automatically set based on the print history of the user with reference to the print information file 3502 in the database 3414'. This process is the same as that in step S3606 in the 15th embodiment. Upon completion of format setups, it is checked in step S4507 if the document to be printed is to be divisionally printed. That is, it is checked with reference to the environment information file 4403 in the database 3414' if the document to be printed satisfies divided print conditions.

For example, when the document to be printed has pages beyond those specified by the divided print conditions, it is determined in step S4507 that the document is to be divisionally printed, and a printer group to be used in the divided-print process is set in step S4508. This setup is done by selecting an appropriate printer group from the print location group file 4404 in the database 3414'. Upon selecting the printer group, the interpretation result (information such as the type of form, a printer to be preferentially used, and the like) of the print data interpreter unit 3413 is preferably taken into consideration, and a group which includes the printer extracted in step S4504 or S4505, and consists of only color printers if the document includes a color page is preferably selected. Furthermore, an output printer group which is not too much distant from the user who submitted the print request is preferably selected.

When the divided print process is done, a generated print file is divided and sent in correspondence with the number and capabilities of printers used in the divided print process (step S4510). The divided print process need not use all printers included in the selected printer group, and can select printers under arbitrary conditions (e.g., the distance from the user and the like).

On the other hand, if a divided print process is not done, the processes corresponding to, e.g., steps S3607 to S3609 (FIG. 50) in the 15th embodiment are done in step S4509 to determine an optimal printer, and a print process such as a generation process of a print file suitable for that printer, and the like is executed (step S4510).

Of course, in this embodiment, printer candidates extracted in step S4504 or S4505 may be presented to the user and the printer selected by the user may be used as in the 15th embodiment.

When the divided print process is done or when the printer selected by the user is busy and the print process is executed using another printer, a corresponding message including printer names used and the like is preferably sent to the user.

(First Modification of 16th Embodiment)

In the processes shown in FIG. 52, the divided print process is done without grouping monochrome pages and color pages together. However, in this modification, the divided print process is done while grouping color pages and monochrome pages together.

Figure 53:
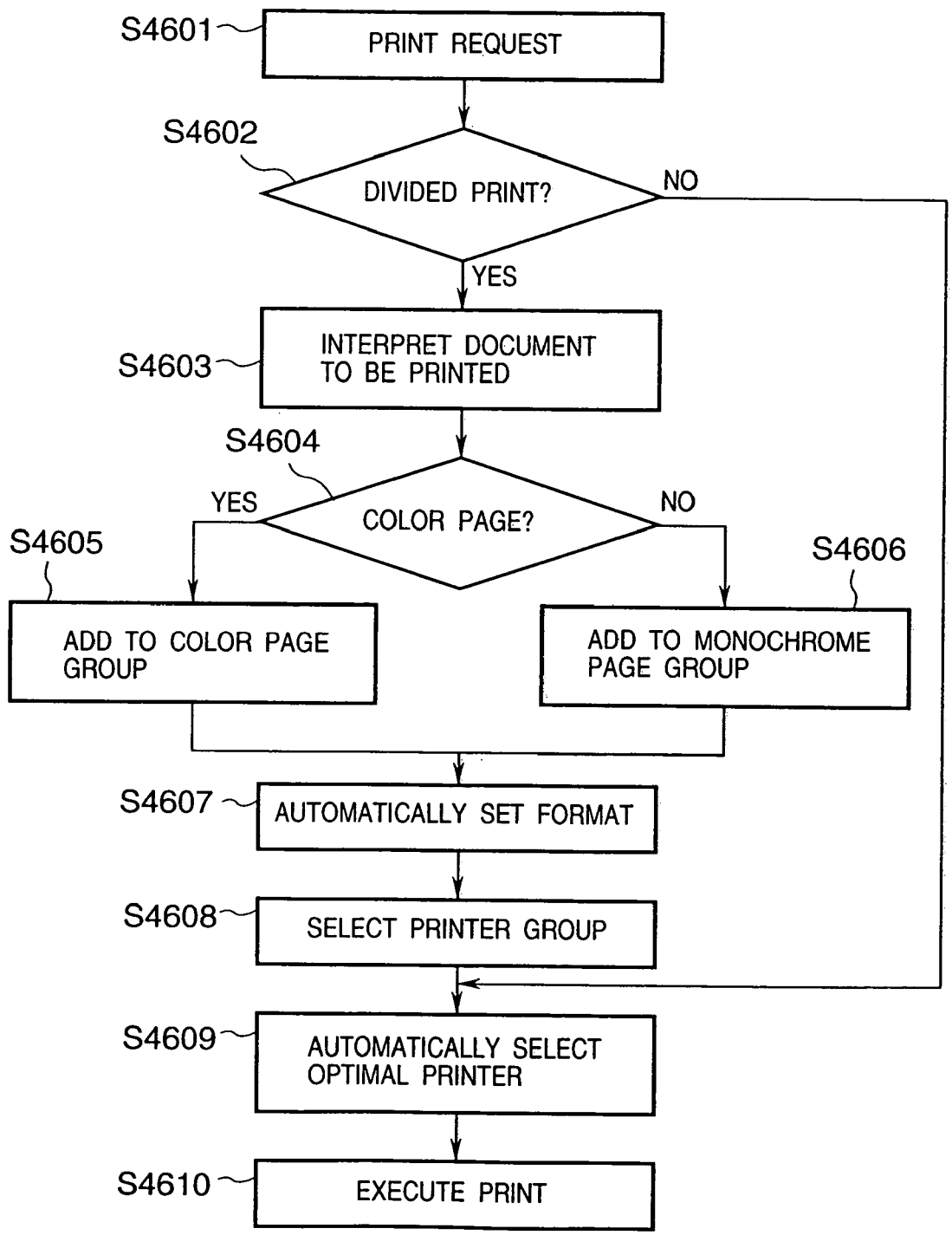
FIG. 53 is a flow chart showing another sequence of the divided print process.

The print process in this modification will be described below using the flow chart shown in FIG. 53. FIG. 53 shows the processes from reception of a print request from the client until determination of a printer that executes the print process as in those described with reference to FIG. 52.

In step S4601, a print request from the client is received by the Web server. It is checked in step S4602 if a document to be printed is to be divisionally printed. That is, it is checked with reference to the environment information file 4403 in the database 3414' if the document to be printed satisfies divided print conditions. For example, when the document to be printed has pages beyond those specified by the divided print conditions, it is determined that the document is to be divisionally printed.

On the other hand, if a divided print process is not done, the processes corresponding to, e.g., steps S3607 to S3609 (FIG. 50) in the 15th embodiment are done in step S4609 to determine an optimal printer, and a print process such as a generation process of a print file suitable for that printer, and the like is executed (step S4610).

In step S4603, the print data interpreter unit 3413 (FIG. 48) of the Web server interprets the received print request to specify the user who submitted the request and to detect if a document to be printed includes a color page. If a color page is included, the document is divided so that the color page is included in a color page group, and other pages (monochrome pages) are included in a monochrome page group, and the divided groups are stored in, e.g., the data storage unit of the Web server 3410 (FIG. 48) (steps S4604 to S4606).

In step S4607, the print format is automatically set based on the print history of the user with reference to the print information file 3502 in the database 3414'. This process is the same as that in step S3606 in the 15th embodiment. In step S4608, a printer group which includes a color printer if the document to be printed includes a color page is selected in consideration of the interpretation result (result (information such as the type of form, a printer to be preferentially used, and the like) of the print data interpreter unit 3413 in step S4603.

In step S4609, a color printer included in the printer group is selected for the color page group divided in step S4605, and a monochrome printer is selected for the monochrome page group divided in step S4606. In step S4610, a print process such as such as a generation process of print files suitable for the selected printers, and the like is executed.

[17th Embodiment]

Figure 54:
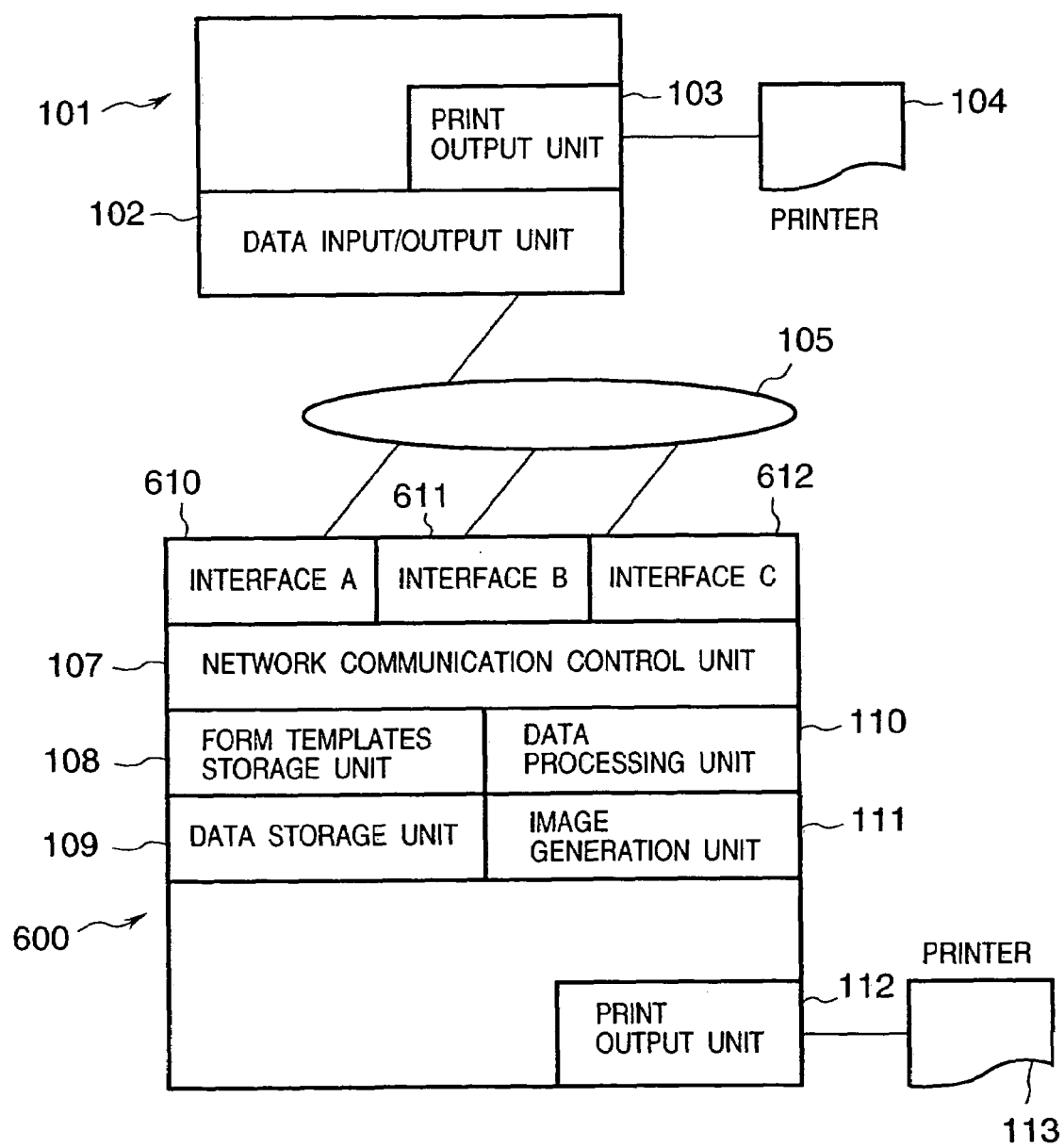
FIG. 54 is a software block diagram of a network print system according to the 17th embodiment of the present invention.

FIG. 54 is a software block diagram of a network print system according to an embodiment of the present invention. The same reference numerals in FIG. 54 denote the same parts as those in the network print system shown in FIG. 1, and a detailed description thereof will be omitted.

As can be seen from comparison between FIGS. 1 and 54, the arrangement in FIG. 54 is substantially the same as that in FIG. 1, except that a Web server 60 has a plurality of network interfaces 610 to 612. In FIG. 54, the Web server has three network interfaces, but the number of network interface is not particularly limited as long as the Web server has a plurality of network interfaces.

When a plurality of routes are available, a network route through which data actually passes depends on the setups of network devices such as routers that form the network. That is, one of the plurality of network interfaces 610 to 612 which the network route from the client to the Web server reaches is determined depending on the setups of the network devices.

On the other hand, the Web server can select one of the network interfaces 610 to 612, which outputs data from the Web server to the client, but the subsequent network route to the client is determined depending on the setups of the network devices.

In the network print system in this embodiment, routers and the like that define the network are set in advance so that data from the client arrives at a specific network interface of the Web server. Also, as for a route of data output from each network interface of the Web server, the devices that define the network are set so that the route of data coming from the client does not interfere with routes from other interfaces in terms of the network load.

Operation after the print button 210 has been pressed on the browser window shown in FIG. 2 will be explained below. Upon pressing the print button 210, print request data reaches a specific network interface of the Web server 600 via a network route which is set in advance. In the Web server, the data processing unit 110 interprets and processes the request data, and the image generation unit 111 generates an image, thus preparing reply data to the client.

The network communication control unit 107 selects a network interface for outputting reply data to the client other than that which has received the request data from the client, and sends back the data. With this control, print data is sent back along a route different from that for transferring the request from the client as the source of the request. Hence, even when the identical client successively generates other requests, these requests can be prevented from being interfered with by the reply data from the Web server.

(First Modification of 17th Embodiment)

Figure 55:
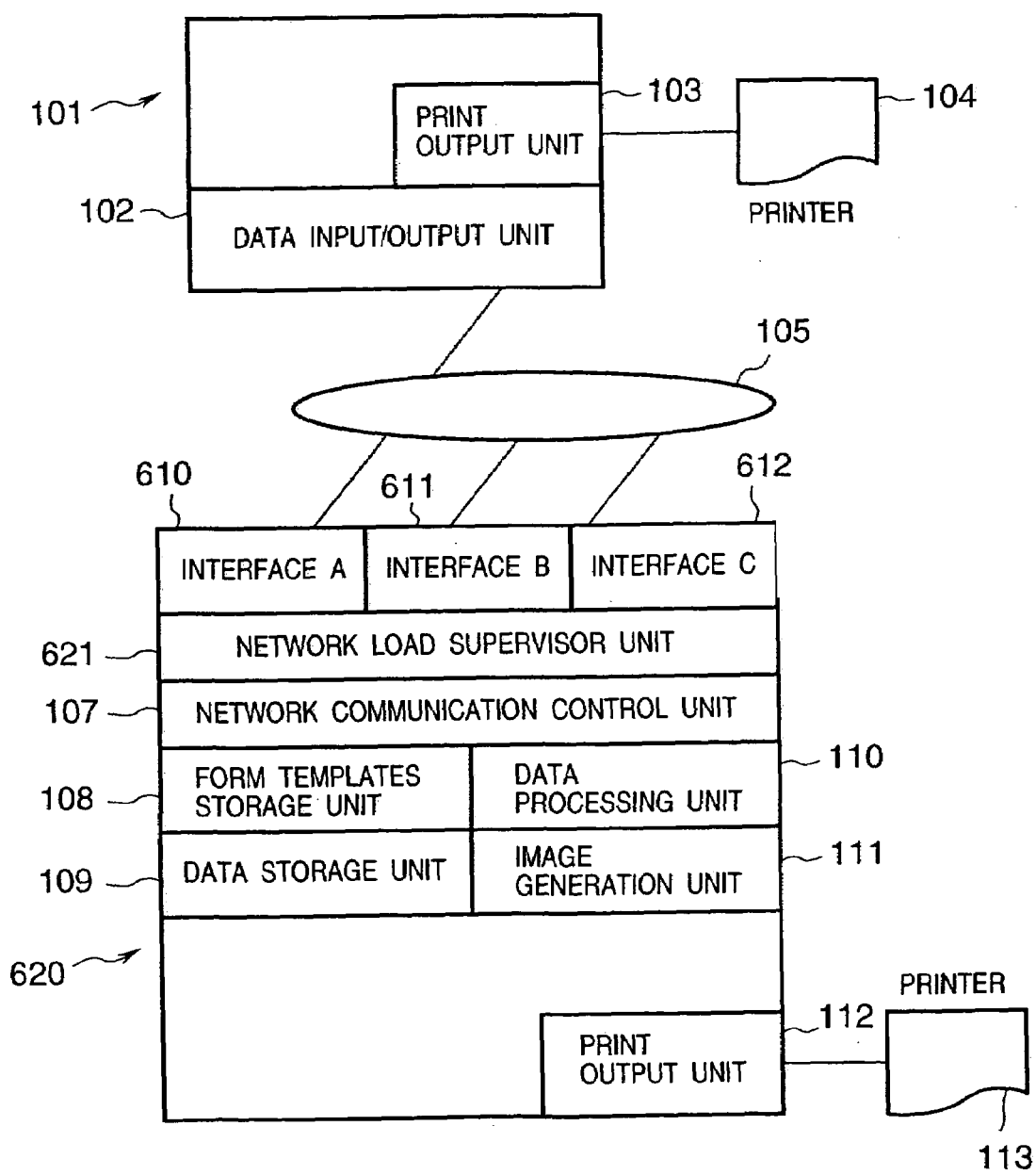
FIG. 55 is a software block diagram of a network print system according to a modification of the 17th embodiment of the present invention.

FIG. 55 is a software block diagram showing a modification of the network print system according to the 17th embodiment. FIG. 55 has an arrangement obtained by adding a network load supervisor unit 621 to the Web server in the arrangement of the network print system shown in FIG. 54. The network load supervisor unit 621 has a function of always supervising the loads on the plurality of network interfaces 610 to 612 of the Web server and informing the network communication control unit 107 of their status.

In this modification, the flow of the processes from reception of request data from the client until generation of reply data to the client are as described above using FIG. 54.

In this modification, upon outputting reply data from a Web server 620 to the client 101, the network communication control unit 107 inquires of the network load supervisor unit 621 as to the loads on the interfaces 610 to 612, and makes data transmission using the interface with the lightest load.

[Other Embodiments]

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of FIG. 5 or 6 that can implement the functions of the server in the above-mentioned embodiments to the system or apparatus, and reading out and executing the program code stored in the storage medium by a computer (or a CPU or MPU) of the system or apparatus. Also, the objects of the present invention can be achieved by supplying the program of the sequences shown in FIG. 10 or FIGS. 14 and 15 that can implement the functions of the Web server to the computer. Furthermore, the objects of the present invention can be achieved by supplying a program of the sequence of FIG. 12 that can implement the functions of the image generation server to the computer.

Moreover, the objects of the present invention are also achieved by supplying a storage medium, which records a program code of FIGS. 24, 25, 28, and 29 that can implement the functions of the server in the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

[Effects of Invention]

As described above, according to the present invention, an image of, e.g., form data generated using the Web browser of the client can be printed from either the client or server as a high-quality image.

Since print data is generated by the server, no program for special processes need be prepared at the client. For this reason, the client can have low processing power, and an inexpensive client can be provided.

Since the load on the server can be reduced, a smooth print process can be done without making the client wait. Also, the possibility of system down can be eliminated.

Also, the load on the server can be optimally distributed in accordance with processes done by the server.

Even when some functions of the server are suspended, all the processes need not be stopped. Also, when the suspended server recovers, the processes can be distributed without any special instruction from the user to that server. For this reason, a network print system, network server, and its control method, which are strong against troubles and can optimally distribute the load can be provided.

At the client, a print process can be done from a printer suitable for print data received from the server.

As described above, according to the present invention, since a file is saved at a location a general client cannot access, and the file is sent to the client that instructed generation of the file every time the file is generated, data can be prevented from being accessed by unspecified clients, and the latest file can be passed onto the client.

Since the server stores the previously generated data file, and returns the stored data file upon receiving a generation request of that file again, resources can be saved without any extra processes. Also, the processing speed can be improved.

Furthermore, the client can request generation of data, and can designate whether or not unspecified client can access the generated data.

The characteristic feature of the present invention is that encrypted data can be prevented from being decrypted by the basic function of the Web browser, and from being eavesdropped and decrypted en route to the true destination, thus assuring high security. With this feature, an unauthorized user cannot browse and alter data, and a desired print process can be safely done via the network.

This feature is effective even when data consists of a plurality of data types of data.

According to the present invention, since data can be decrypted only while a session is held, and a decryption key is generated in units of sessions, such key is insignificant for other sessions and print images, thus realizing a network print process with higher security.

With this feature, an unauthorized user cannot browse and alter data, and a desired print process can be safely done via the network.

According to the present invention, in a network print system connected via the Internet accessed by unspecified many users, the output format of a form print can be changed or a form print process can be disabled in correspondence with the authority level of each user, thus improving security of the print system.

According to the present invention, since a print process using a format whose time has expired can be denied, and the number of times of print of an important form can be restricted to deny extra print processes, a comfortable print environment can be realized by reducing wasteful print processes.

As many apparently widely different embodiments of the present invention can be made without departing from the spirit and scope thereof, it is to be understood that the invention is not limited to the specific embodiments thereof except as defined in the appended claims.

What is claimed is:

1. A network print system having:
   a client which issues a print request of a document composed of predetermined template data and variable data to be merged with the template data using a printer connected on a network, or a display request of a document to be printed; and
   a server which is connected to said client to be able to communicate therewith, generates print data on the basis of the print request or display data on the basis of the display request, and sends the generated data to said client,
   said server inhibiting generation of the print data or changing contents of print data to be generated on the basis of authority data registered in advance upon executing a process, based on the print request.

2. The system according to claim 1, wherein the change is made in units of items which form template data corresponding to the print or display request.

3. A network print system having:
   a client which issues a print request of a document composed of predetermined template data and variable data to be merged with the template data using a printer connected on a network, or a display request of a document to be printed; and
   a server which is connected to said client to be able to communicate therewith, generates print data on the basis of the print request or display data on the basis of the display request, and sends the generated data to said client,
   said server comprising:
   restriction information storage means for storing restriction conditions which disable a print or display process in units of template data, and
   said server inhibiting a process based on the print or display request when the print or display request satisfies a restriction condition.

4. The system according to claim 3, wherein the restriction condition is a date.

5. The system according to claim 3, wherein the restriction condition is an accumulated print count.

* * * * *

UNITED STATES PATENT AND TRADEMARK OFFICE
CERTIFICATE OF CORRECTION

PATENT NO. : 7,126,704 B2
APPLICATION NO. : 10/923678
DATED : October 24, 2006
INVENTOR(S) : Kiyotaka Miura et al.

It is certified that error appears in the above-identified patent and that said Letters Patent is hereby corrected as shown below:

TITLE PAGE:
Item (75) Inventors:
"Kiyotaka Miura, Kanagawa-ken (JP); Tsunehiro Tsukada, Kanagawa-ken (JP); Yasuyuki Tsukui, Kanagawa-ken (JP); Akira Ueda, Kanagawa-ken (JP); Takashi Matsushita, Kanagawa-ken (JP); Masaki Tamura, Kanagawa-ken (JP)" should read -- Kiyotaka Miura, Yokohama (JP); Tsunehiro Tsukada, Yokohama (JP); Yasuyuki Tsukui, Kawasaki (JP); Akira Ueda, Yokohama (JP); Takashi Matsushita, Yokohama (JP); Masaki Tamura, Kawasaki (JP) --.

Item (56) References Cited, U.S. Patent Documents "5,890,173 A 3/1999 Yoda...725/501.1 " should read -- 5,890,173 A 2/1999 Yoda....725/501.1 --.

DRAWINGS:
Sheet 27, Figure 27, "CLIENT" should read -- (CLIENT -- and "ACCESS" should read -- ACCESS) --; and
Sheet 39, Figure 39, "ENCEYPTED" should read --ENCRYPTED --.

COLUMN 2:
Line 34, "clients" should read -- client --.

COLUMN 3:
Line 35, "which instructed" should read -- which is instructed --.

COLUMN 6:
Lines 2, 18, 37 and 52, "able communicate" should read -- able to communicate --.

COLUMN 7:
Lines 1, 16 and 30, "able communicate" should read -- able to communicate --.

COLUMN 11:
Lines 54 and 56, "person" should read -- person's --.

COLUMN 12:
Line 40, "form" (second occurrence) should be deleted.

COLUMN 14:
Line 46, "accordance data." should read -- accordance with data. --.

COLUMN 15:
Line 39, "onto" should read -- on to --.

UNITED STATES PATENT AND TRADEMARK OFFICE
CERTIFICATE OF CORRECTION

PATENT NO. : 7,126,704 B2
APPLICATION NO. : 10/923678
DATED : October 24, 2006
INVENTOR(S) : Kiyotaka Miura et al.

It is certified that error appears in the above-identified patent and that said Letters Patent is hereby corrected as shown below:

COLUMN 22:
Line 42, "unit" should read -- units --; and
Line 46, "and subject" should read -- and is subject --.

COLUMN 40:
Line 4, "(result" should be deleted;
Line 12, "such as" (second occurrence) should be deleted; and
Line 31, "route" should read -- routes --.

Signed and Sealed this

Twelfth Day of June, 2007

JON W. DUDAS
*Director of the United States Patent and Trademark Office*